United States Patent
Xu et al.

(10) Patent No.: US 12,137,858 B2
(45) Date of Patent: Nov. 12, 2024

(54) BASE STATION AND WATER TANK

(71) Applicants: YUNJING INTELLIGENCE INNOVATION (SHENZHEN) CO., LTD., Shenzhen (CN); YUNJING INTELLIGENCE (SHENZHEN) CO., LTD., Shenzhen (CN)

(72) Inventors: Churui Xu, Shenzhen (CN); Ming Duan, Shenzhen (CN); Zhenkang Fang, Shenzhen (CN); Yafei Ding, Shenzhen (CN); Kunhuan She, Shenzhen (CN); Wanlong Qin, Shenzhen (CN)

(73) Assignees: YUNJING INTELLIGENCE INNOVATION (SHENZHEN) CO., LTD., Shenzhen (CN); YUNJING INTELLIGENCE (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 18/416,794

(22) Filed: Jan. 18, 2024

(65) Prior Publication Data

US 2024/0156321 A1 May 16, 2024

Related U.S. Application Data

(63) Continuation of application No. 18/171,388, filed on Feb. 20, 2023, now abandoned, which is a
(Continued)

(30) Foreign Application Priority Data

| Aug. 3, 2021 | (CN) | ......................... 202110889012.4 |
| Aug. 3, 2021 | (CN) | ......................... 202121799137.X |
| Aug. 3, 2021 | (CN) | ......................... 202121799561.4 |

(51) Int. Cl.
*A47L 11/40* (2006.01)
*B08B 3/02* (2006.01)
(Continued)

(52) U.S. Cl.
CPC ............ *A47L 11/4091* (2013.01); *B08B 3/02* (2013.01); *B08B 13/00* (2013.01);
(Continued)

(58) Field of Classification Search
CPC .. A47L 11/4091; A47L 2201/028; B08B 3/02; B08B 13/00; B08B 1/165; B08B 2203/027
(Continued)

(56) References Cited

U.S. PATENT DOCUMENTS

| 2018/0368646 | A1* | 12/2018 | Buehler | ............... A47L 11/4016 |
| 2019/0069748 | A1 | 3/2019 | Blumhardt et al. | |
| 2020/0297179 | A1* | 9/2020 | Fang | ................... A47L 11/4069 |

FOREIGN PATENT DOCUMENTS

| CN | 202128316 U | 2/2012 |
| CN | 102885576 B | 2/2015 |

(Continued)

*Primary Examiner* — Tinsae B Ayalew

(57) ABSTRACT

A water tank is provided for communicating with a cleaning system on a base station body of a base station and outside of the base station. The water tank includes a clean water cavity configured to hold clean water, a clean water input channel configured to be communicated with the clean water cavity and an external water source outside the base station, a clean water output channel configured to be communicated with the clean water cavity and the cleaning system on the base station body, a sewage cavity configured to hold sewage, a sewage input channel configured to be communicated with the cleaning system on the base station body (Continued)

and the sewage cavity, and a sewage output channel configured to be communicated with the sewage cavity and outside of the base station.

18 Claims, 32 Drawing Sheets

Related U.S. Application Data continuation of application No. PCT/CN2022/092806, filed on May 13, 2022.

(51) Int. Cl.
 *B08B 13/00* (2006.01)
 *B08B 1/16* (2024.01)
(52) U.S. Cl.
 CPC ......... *A47L 2201/028* (2013.01); *B08B 1/165* (2024.01); *B08B 2203/027* (2013.01)
(58) Field of Classification Search
 USPC ....................................................... 134/57 R
 See application file for complete search history.

(56) References Cited

FOREIGN PATENT DOCUMENTS

| | | |
|---|---|---|
| CN | 108994715 B | 12/2018 |
| CN | 208698607 U | 4/2019 |
| CN | 109748364 A | 5/2019 |
| CN | 110367885 A | 10/2019 |
| CN | 210749048 U | 6/2020 |
| CN | 111839375 A | 10/2020 |
| CN | 111973072 A | 11/2020 |
| CN | 211862713 U | 11/2020 |
| CN | 110367885 B | 5/2021 |
| CN | 112914442 A | 6/2021 |
| CN | 113017511 A | 6/2021 |
| CN | 213551582 U | 6/2021 |
| CN | 113116218 A | 7/2021 |
| EP | 1762165 A2 | 3/2007 |
| EP | 1762165 A3 | 2/2012 |
| EP | 3542695 A1 | 9/2019 |

\* cited by examiner

BASE STATION AND WATER TANK

CROSS REFERENCE TO RELATED APPLICATION

The present disclosure is a Continuation Applications of U.S. application Ser. No. 18/171,388, titled "Base Station and Water Tank" and filed on Feb. 20, 2023, the entirety of which is hereby incorporated herein by reference for all purposes.

TECHNICAL FIELD

The present disclosure relates to the technical field of cleaning robots, and in particular to a base station and a water tank.

BACKGROUND

Currently, more and more cleaning robots have entered people's lives. In order to facilitate the use of the cleaning robots, base station is provided to service the cleaning robots, and the base station has increasingly become an inseparable supporting device for the cleaning robots. The base station generally includes a clean water tank and a sewage tank that can be taken out from the base station. The clean water tank and the sewage tank are respectively communicated with a cleaning system of the base station, to supply clean water to the cleaning system or receive sewage discharged from the cleaning system. It requires users to manually add clean water to the clean water tank or pour out the sewage from the sewage tank. For some users, this will not make them cumbersome and even bring them the fun of doing it by themself, but for other users, this will be a burden and will affect their using experience.

SUMMARY

The object of the present disclosure is to provide a base station which may improve the using experience of users.

Another object of the present disclosure is to provide a water tank, when being installed in a base station body of the base station, automatic water feeding and automatic drainage may be realized, which brings convenience to users.

A further object of the present disclosure is to provide a base station which is capable of realizing automatic water feeding and automatic drainage, which brings convenience to users.

In order to achieve the above object, the present disclosure provides a base station for cleaning a cleaning robot, and the base station comprises:
- a base station body defined with a cleaning system, the cleaning system receives clean water for cleaning a member to be cleaned of the cleaning robot and discharges sewage generated by the cleaning;
- a first waterway system comprising a first water tank, the first water tank is removably installed in the base station body, and is configured to manually add clean water and/or remove sewage, the first water tank is defined with a first cavity, and in case the first water tank is installed in the base station body, the first cavity is communicated with the cleaning system for supplying clean water to the cleaning system and/or receiving sewage generated by the cleaning system;
- a second waterway system comprising a waterway channel defined on the base station, the waterway channel is configured for receiving clean water delivered from the outside of the base station by an external waterway and transporting the clean water to the cleaning system, and/or for receiving sewage from the cleaning system and discharging the sewage to the outside of the base station;
- both or either one of the first waterway system and the second waterway system supply clean water to the cleaning system and/or receive sewage generated by the cleaning system.

The base station provided by the present disclosure includes a first waterway system, the first waterway system includes a removable first water tank, and the first water tank is configured to supply clean water to the cleaning system and/or receive sewage generated by the cleaning system; and, the base station also includes a second waterway system, the second waterway system is communicated to the outside of the base station through a waterway channel that is configured for water delivering, so that the second waterway system is capable of supplying clean water to the cleaning system and/or receiving sewage generated by the cleaning system. That is to say, the base station of the present disclosure can either use a regular water tank to feed clean water to the cleaning system and/or receive sewage discharged from the cleaning system, or use the second waterway system to automatically feed water and/or automatically drain sewage, as such, it is not necessary for users to manually add clean water or remove sewage, which lightens the burden of some users. Therefore, the base station of the present disclosure may meet individual needs of different users and different needs of a same user, which effectively improves the using experience.

In order to achieve the above object, the present disclosure further provides a base station for cleaning the cleaning robot, the base station comprises:
- a base station body, the base station body is provided with a cleaning system and a water tank accommodating space, the cleaning system is configured for receiving clean water to clean a member to be cleaned of the cleaning robot and discharging sewage generated by the cleaning, and the cleaning system comprises a cleaning area and a water delivery channel communicated to the cleaning area;
- a first waterway system comprising a first water tank, the first water tank is provided with a first cavity and a first channel communicating with the first cavity;
- a second waterway system comprising a second water tank, the second water tank is provided with a second cavity, and a second channel and a third channel respectively communicated with the second cavity;
- the first water tank and the second water tank are selectively installed in the water tank accommodating space;
- when the first water tank is installed in the water tank accommodating space, the first channel is coupled to the water delivery channel to communicate the first cavity with the cleaning area;
- when the second water tank is installed in the water tank accommodating space, the second channel is coupled to the water delivery channel to communicate the second cavity with the cleaning area, and the third channel is configured to couple to external waterway.

The base station of the present disclosure can either use the first water tank to feed clean water to the cleaning system and/or receive sewage discharged from the cleaning system, or use the second water tank to automatically feed water and/or automatically drain sewage for the base station, as such, it is not necessary for users to manually add clean water or remove sewage, which lightens the burden of some users. Therefore, the base station of the present disclosure may meet individual needs of different users and different needs of a same user, which effectively improves the using experience.

In order to achieve the above-mentioned object, the present disclosure provides a water tank for communicating with a cleaning system on a base station body of the base station. The water tank is provided with a clean water cavity, a sewage cavity, a clean water input channel, a clean water output channel, a sewage input channel, and a sewage output channel; the clean water cavity receives clean water delivered from the outside of the base station through the clean water input channel, and is communicated with the cleaning system on the base station body through the clean water output channel to deliver clean water to the cleaning system; the sewage cavity is communicated with the cleaning system on the base station body through the sewage input channel to receive sewage generated by the cleaning system, and discharge sewage to the outside of the base station through the sewage output channel.

The water tank of the present disclosure when being installed in the base station body for use, clean water from the waterway outside the base station is delivered to the clean water cavity through the clean water input channel, and sewage in the sewage cavity is discharged to the outside of the base station through the sewage output channel, thereby realizing an automatic water feeding and an automatic drainage. As such, there is no need for users to manually replenish clean water and pour out sewage, which brings convenience to users. Moreover, the present disclosure also utilizes the clean water cavity and the sewage cavity for temporary water storage while realizing the automatic water feeding and automatic drainage, which effectively guarantees the reliability of the water supply for the base station of the present disclosure, and is also beneficial to improve the convenience of use.

In order to achieve the above-mentioned further object, the present disclosure provides a base station for cleaning cleaning members of a cleaning robot. The base station comprises a base station body and the water tank described above, the base station body is provided with a cleaning system, the clean water output channel and the sewage input channel of the water tank are respectively communicated with the cleaning system to deliver clean water to the cleaning system and receive the sewage generated by the cleaning system.

The base station of the present disclosure when being used, clean water from the waterway outside the base station is delivered to the clean water cavity through the clean water input channel, and sewage in the sewage cavity is discharged to the outside of the base station through the sewage output channel, thereby realizing an automatic water feeding and an automatic drainage. As such, there is no need for users to manually replenish clean water and pour out sewage, which brings convenience to users. Moreover, the present disclosure also utilizes the clean water cavity and the sewage cavity for temporary water storage while realizing the automatic water feeding and automatic drainage, which effectively guarantees the reliability of the water supply for the base station of the present disclosure, and is also beneficial to improve the convenience of use.

In order to achieve the above-mentioned further object, the present disclosure further provides a base station for cleaning cleaning members of the cleaning robot. The base station is provided with a cleaning system, a clean water input channel, and a sewage output channel, the clean water input channel is configured for receiving clean water delivered from the outside of the base station and supplying the clean water to the cleaning system, and the sewage output channel is configured for discharging the sewage generated by the cleaning system out of the base station.

The base station of the present disclosure when being used, clean water from the waterway outside the base station is delivered to the cleaning system through the clean water input channel, and sewage generated by the cleaning system is discharged to the outside of the base station through the sewage output channel, thereby realizing an automatic water feeding and an automatic drainage of the base station. As such, there is no need for users to manually replenish clean water and pour out sewage, which brings convenience to users.

The present disclosure also provides a base station for cleaning the cleaning robot, and the base station comprises:
 a base station body defined with a cleaning system, the cleaning system receives clean water to clean a member to be cleaned of the cleaning robot and discharges sewage generated by the cleaning; and
 a waterway system configured to couple with the cleaning system to deliver clean water to the cleaning system and receive sewage discharged from the cleaning system.

The cleaning system of the base station of the present disclosure is configured to receive clean water to clean the members to be cleaned of the cleaning robot and discharge the sewage generated by the cleaning, and the waterway system is configured to transport clean water to the cleaning system and receive the sewage discharged from the cleaning system, such that there is no need for users to manually clean the cleaning robot, which is beneficial to improve the using experience.

BRIEF DESCRIPTION OF THE DRAWINGS

FIG. 13A to FIG. 24C respectively show schematic diagrams of the base station being compatible with manual water feeding and automatic water feeding according to various embodiments, in which:

FIGS. 13A and 13B respectively show schematic diagrams of different usage states of either a first sewage tank or a second sewage tank being placed at a same position in the base station body according to the embodiments of the present disclosure.

FIGS. 23A and 23B respectively show schematic diagrams of different usage states of either the first water tank or the second water tank being placed at a same position in the base station body according to the embodiments of the present disclosure.

FIGS. 24A to 24C respectively show schematic diagrams of different usage states of both or either one of the first water tank and the second water tank being placed at different positions in the base station body according to the embodiments of the present disclosure.

FIGS. 25A-36C respectively show structural schematic diagrams of the base station being compatible with manual water feeding and automatic water feeding according to various embodiments, in which:

FIGS. 25A and 25B respectively show schematic diagrams of different usage states of either a first clean water tank or a second clean water tank being placed at a same position in the base station body according to the embodiments of the present disclosure.

FIGS. 36A-36C respectively show schematic diagrams of different usage states of both or either one of the first water tank and the second water tank being placed at different positions in the base station body according to the embodiments of the present disclosure.

DETAILED DESCRIPTION

Figure 1A:
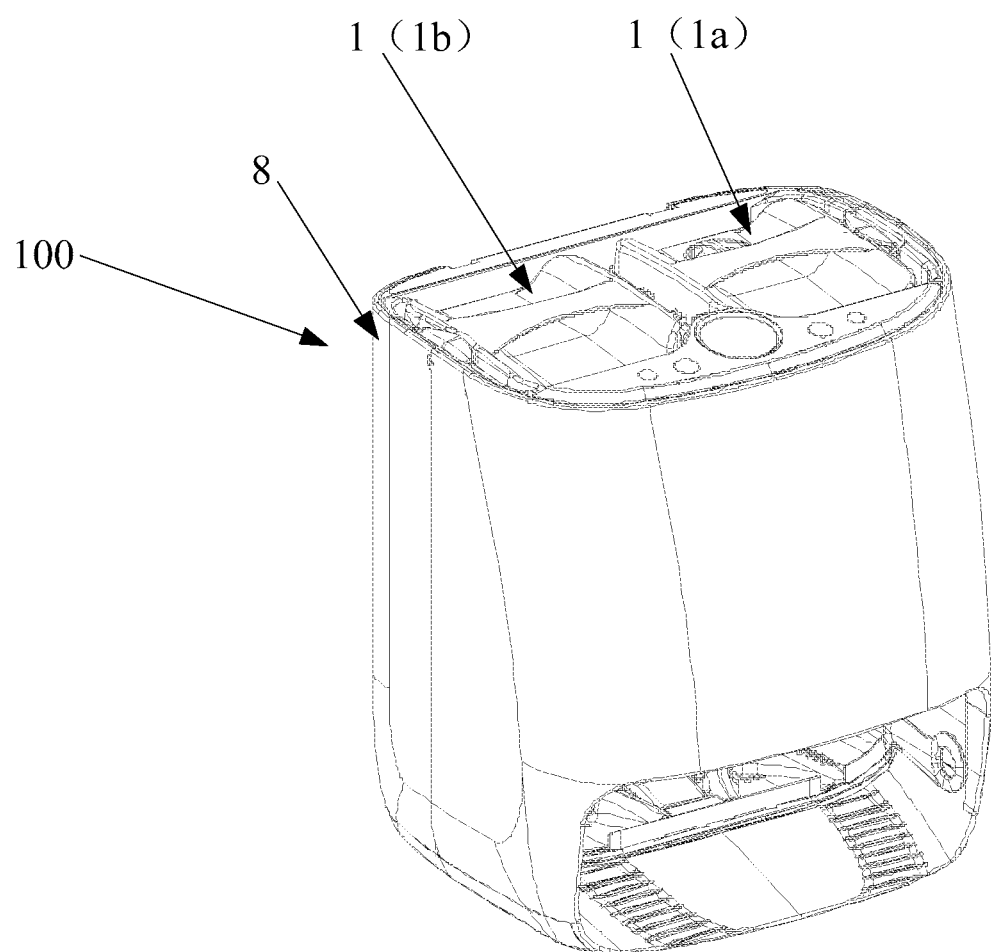
FIG. 1A shows a perspective view of a base station according to an embodiment of the present disclosure, wherein the base station is installed with a first water tank.

In order to explain the technical content, structural features, and effects achieved by the present disclosure, detailed descriptions are given below with reference to the embodiments and the accompanying drawings.

Referring to FIG. 1A to FIG. 11, an exemplary embodiment of the present disclosure discloses a base station for cleaning members to be cleaned of the cleaning robot. The members to be cleaned may be cleaning members (such as moping members), wheels, or even the body of the cleaning robot, etc., which is not limited in the disclosure. The base station 100 includes a base station body 8, a first waterway system 110, and a second waterway system 120, wherein:

the base station body 8 is provided with a cleaning system 9, and the cleaning system 9 receives clean water to clean the members to be cleaned of the cleaning robot (not shown) and discharges the sewage generated during the cleaning process. The members to be cleaned of the cleaning robot include but are not limited to mopping members, in some other embodiments, the members to be cleaned of the cleaning robot may also include driving wheels, housing of the cleaning body, and the like. The structure of the cleaning system 9 is not an innovation of the present disclosure, and will not be described in detail herein. The cleaning system 9 may be in various forms that can be thought of by those skilled in the art, as long as it can receive the clean water from the first waterway system 110 or the second waterway system 120, and discharge the generated sewage to the first waterway system 110 or the second waterway system 120.

The first waterway system 110 includes a first water tank 1 which is detachably installed in the base station body 8. The first water tank 1 is configured to need to be manually added with clean water and/or removed with sewage. In other words, the first water tank 1 is a regular water tank when using (it cannot be automatically fed with water and/or automatically discharged of sewage during using), it requires users to manually add clean water to it or remove the sewage therein, generally before or after it being used. FIGS. 1A-1H show a regular first water tank 1, the first water tank 1 is provided with a coverable opening C, through which clean water may be added or sewage may be removed. The operations of adding clean water and/or pouring out sewage are commonly performed after the water tank 1 is taken out from the base station body 8.

It should be noted that "automatically fed with water" described in the embodiments of the present disclosure means that external water can enter the water tank without intervention from users, and "automatically discharged of sewage" means that the water in the water tank can be automatically discharged without intervention from users. Of course, a power device may be used to provide the power for inputting external water into the water tank and for discharging the water in the water tank outside.

Figure 10:
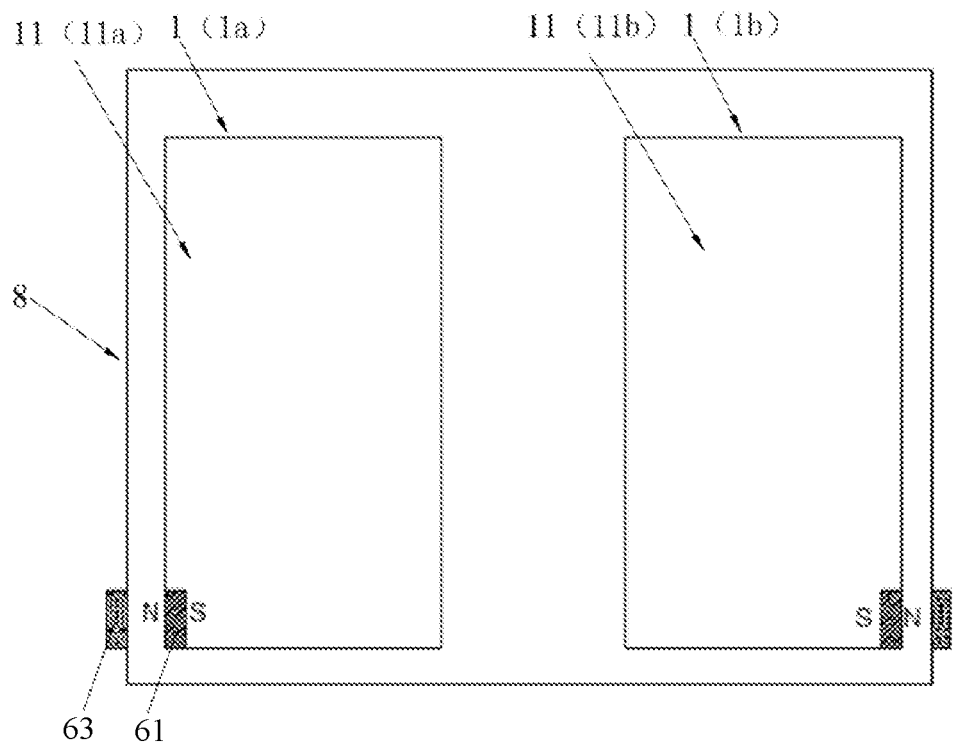
FIG. 10 shows a schematic diagram of detecting the first water tank by using a first magnetic member and a Hall sensor according to an embodiment of the present disclosure.

The first water tank 1 is defined with a first cavity 11 (as shown in FIG. 10). When the first water tank 1 is installed in the base station body 8, the first cavity 11 communicates with the cleaning system 9 to provide the cleaning system 9 with clean water and/or receive sewage generated by the cleaning system 9.

Figure 1B:
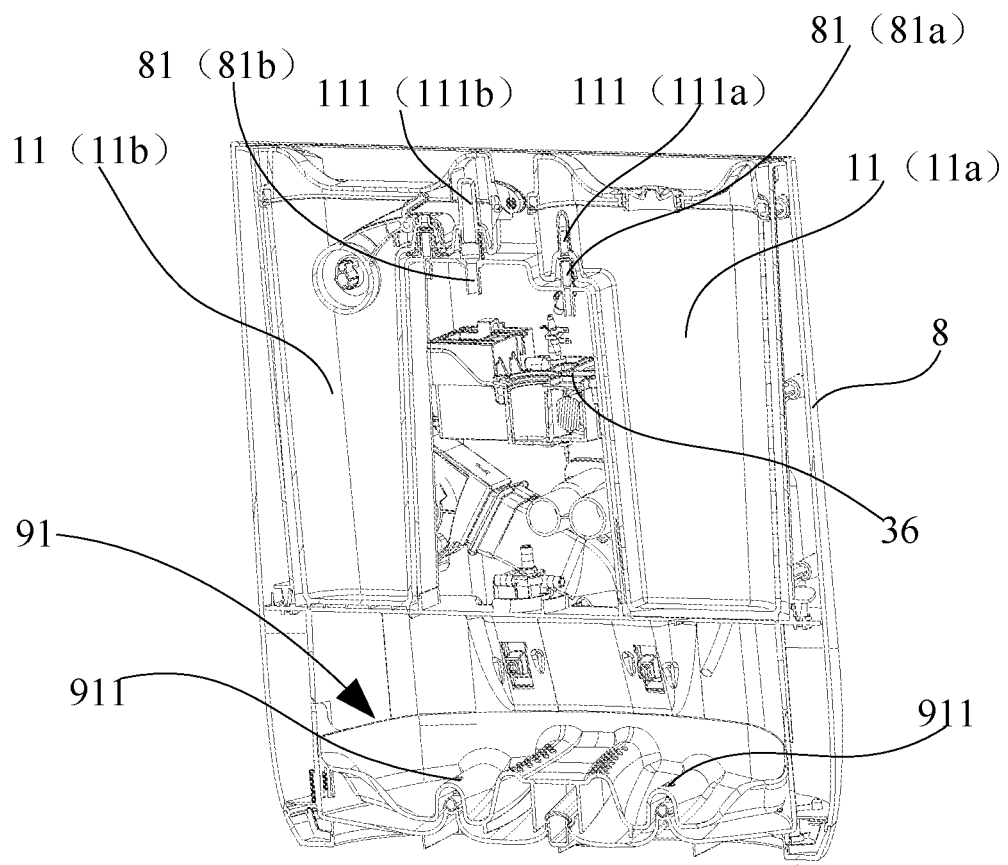
FIG. 1B shows a cross-sectional view of a base station according to an embodiment of the present disclosure, wherein the base station is installed with the first water tank.
Figure 1C:
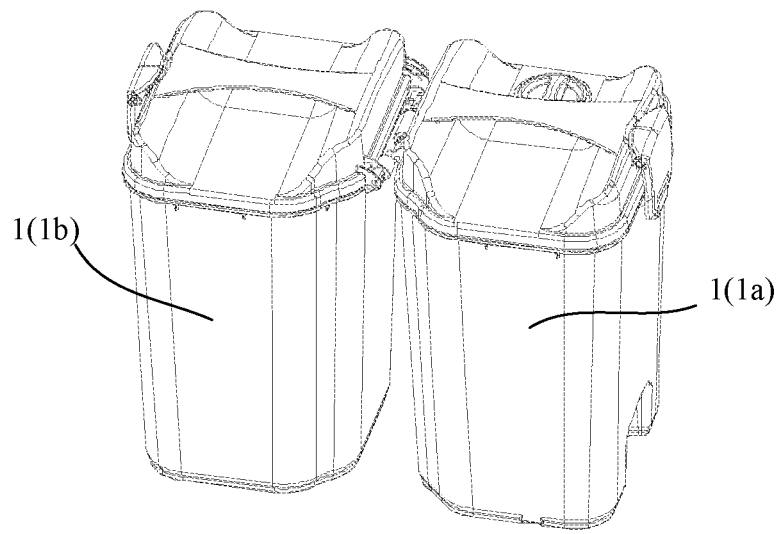
FIG. 1C shows a first structural schematic diagram of a first water tank according to an embodiment of the present disclosure.
Figure 1D:
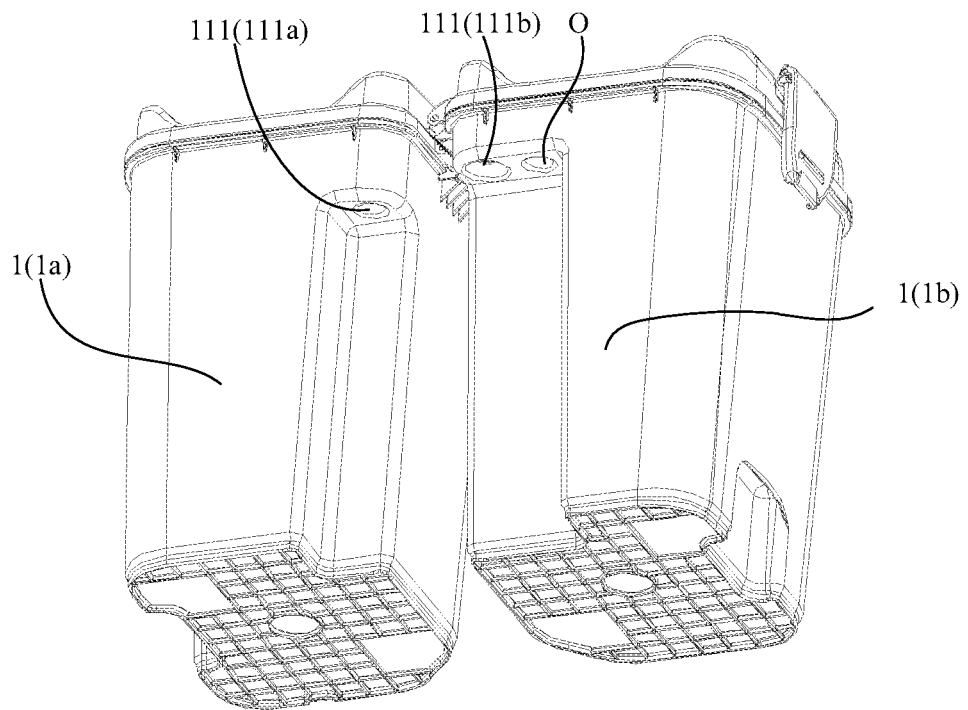
FIG. 1D shows a second structural schematic diagram of the first water tank according to an embodiment of the present disclosure.
Figure 1E:
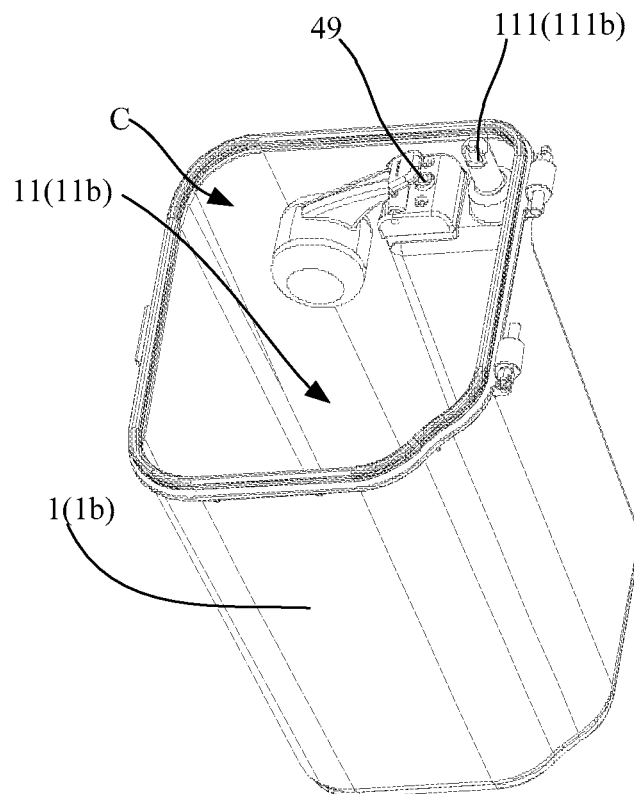
FIG. 1E shows a structural schematic diagram of a sewage tank of the first water tank according to an embodiment of the present disclosure.
Figure 1F:
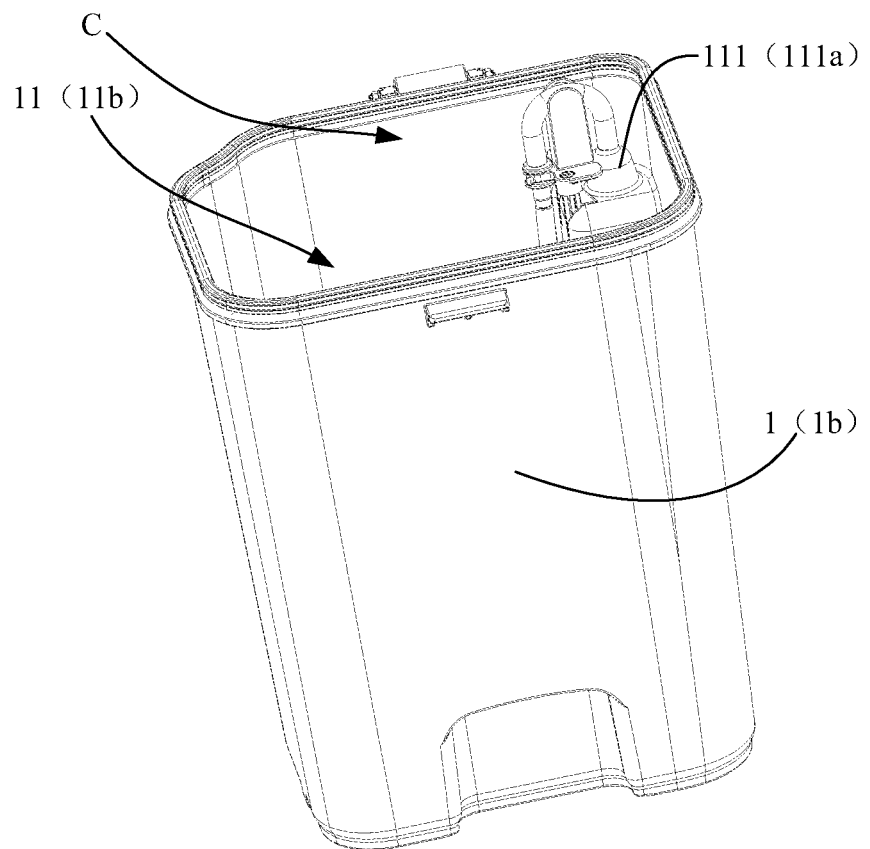
FIG. 1F shows a structural schematic diagram of a clean water tank of the first water tank according to an embodiment of the present disclosure.
Figure 1G:
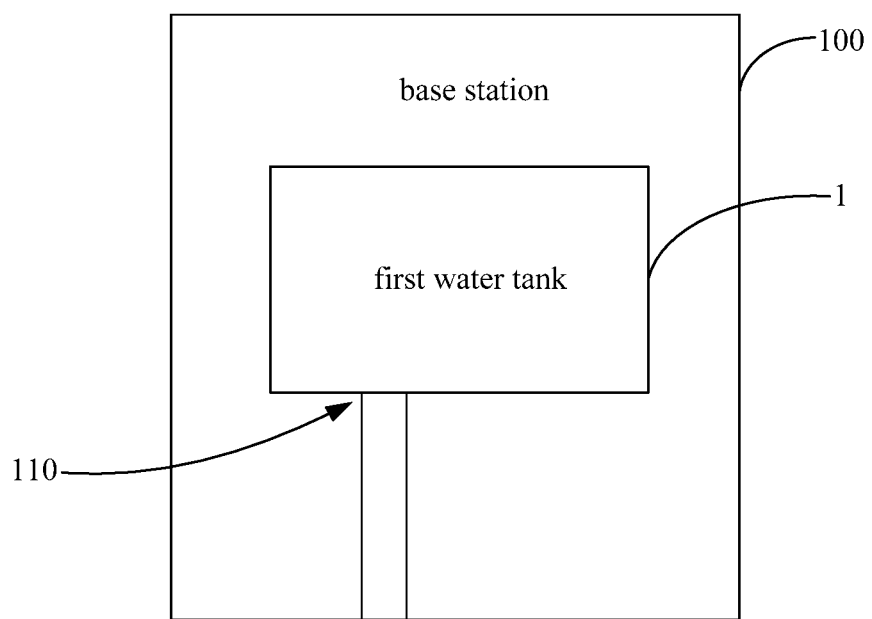
FIG. 1G shows a schematic diagram of a base station installed with a first water tank according to an embodiment of the present disclosure.
Figure 1H:
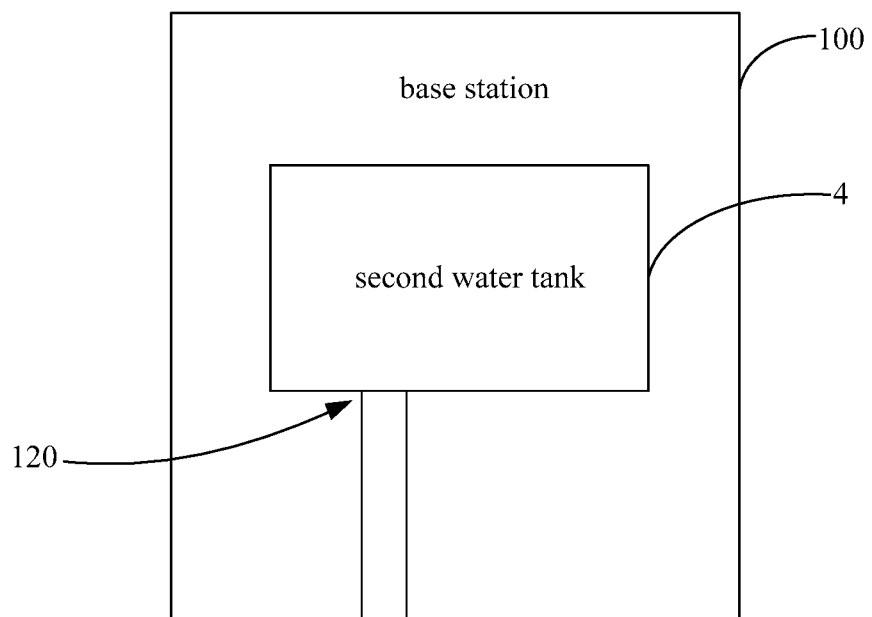
FIG. 1H shows a schematic diagram of a base station installed with a first water tank according to an embodiment of the present disclosure.
Figure 2:
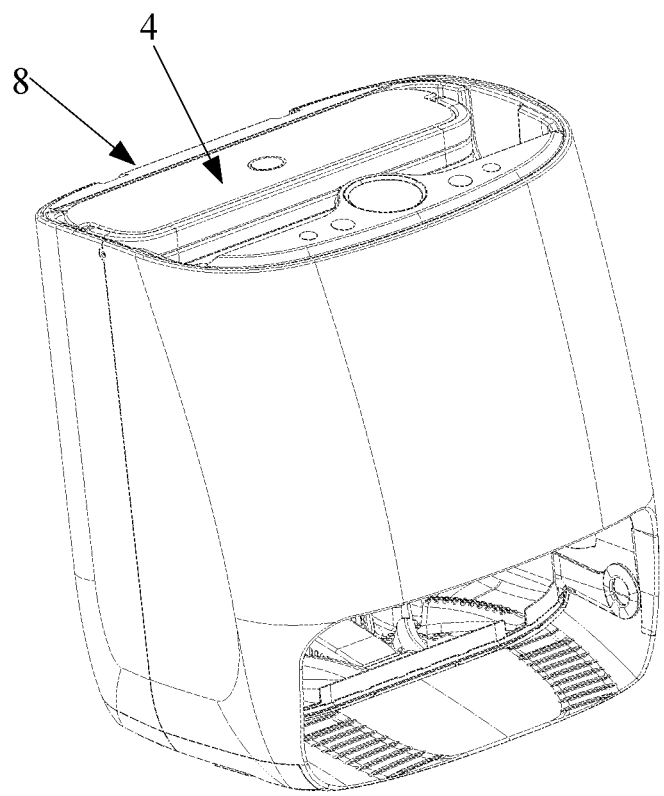
FIG. 2 shows another perspective view of the base station according to an embodiment of the present disclosure, wherein the base station is installed with a second water tank.
Figure 4:
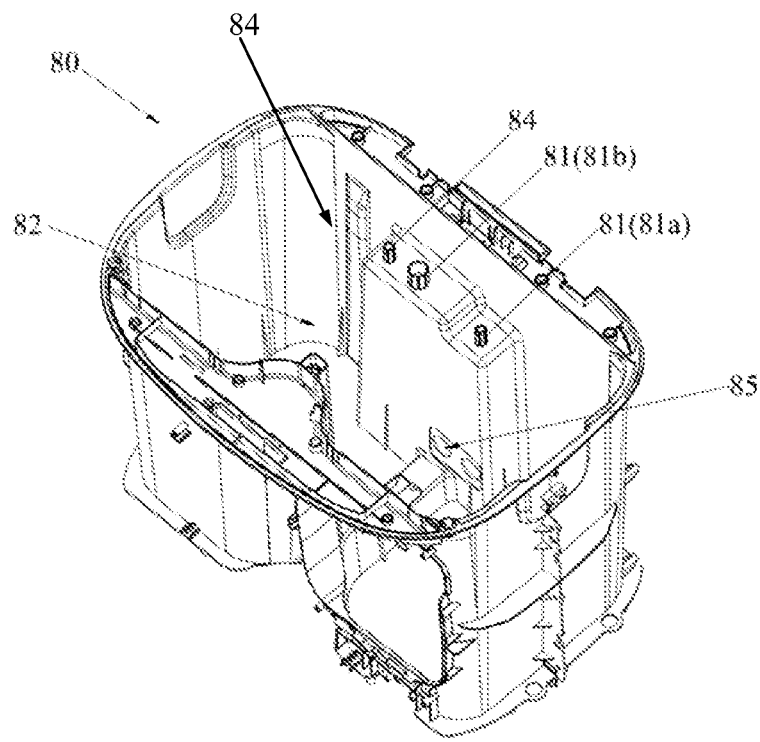
FIG. 4 shows a perspective view of a base station bracket according to an embodiment of the present disclosure.

As for how the first cavity 11 of the first water tank 1 communicates with the cleaning system 9, it is not limited in the present disclosure, as long as the first cavity 11 can be communicated with the cleaning system 9. Referring to FIG. 1B and FIG. 4, in an exemplary example, the first water tank 1 is provided with a first interface 111, the cleaning system 9 includes a second interface 81 arranged on the base station body 8, when the first water tank 1 is installed in the base station body 8, the first interface 111 of the first water tank 1 is coupled to the second interface 81 of the base station body 8 to realize a communication between the first cavity 11 and the cleaning system 9. In some embodiments, the base station body 8 includes a base station bracket 80, and the second interface 81 is defined on the base station bracket 80. It should be understood that, the first interface 111 of the first water tank 1 may be coupled to the second interface 81 of the base station body 8 in different ways. For example, the second interface 81 is inserted into the first interface 111, or, the first interface 111 is inserted into the second interface 81. In an exemplary embodiment, the second interface 81 is penetrated into the first cavity 11 from the first interface 111. By this way, clean water or sewage does not directly flow through the first interface 111, that is, fluid only contacts the inner wall surface of the second interface 81 but not the inner wall surface of the first interface 111. In some other embodiments, the first water tank 1 may also be provided with through holes and pipes that communicate with the first cavity 11 so as to communicate with the cleaning system 9, and may also be provided with structure such as a valve at the interface or the pipe to control the on-off of the waterway system, which is not limited in the present disclosure.

Figure 8A:
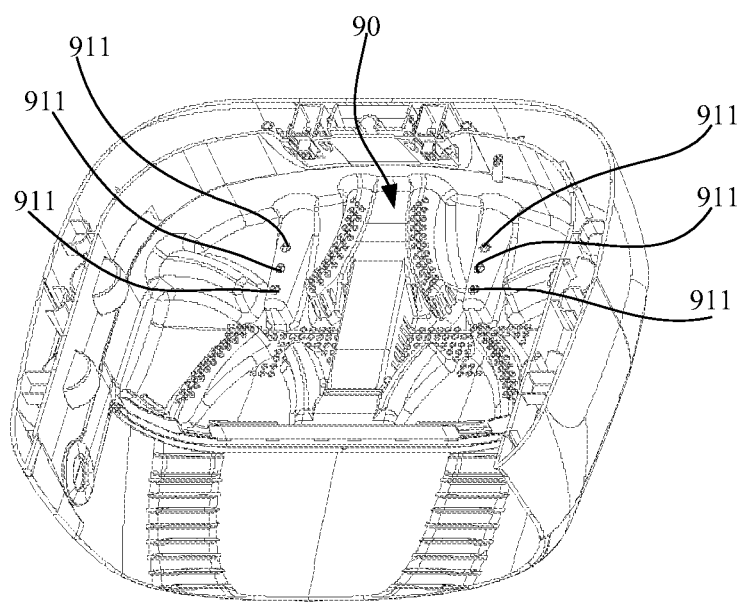
FIG. 8A shows a schematic diagram of a cleaning area with cleaning ribs of a base station according to an embodiment of the present disclosure.
Figure 8B:
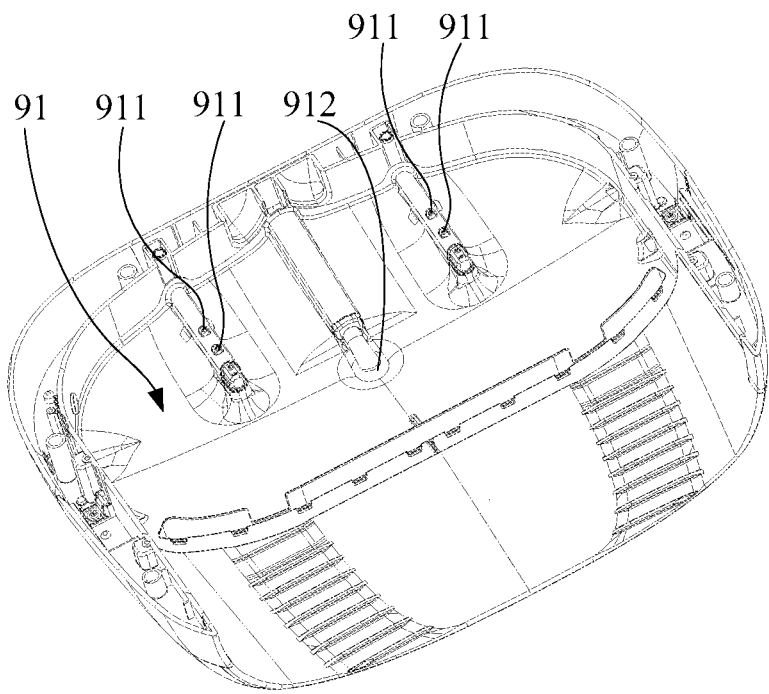
FIG. 8B shows a schematic diagram of the cleaning area with the cleaning ribs being removed from the base station according to an embodiment of the present disclosure.

As shown in FIG. 8B, the cleaning system 9 may include a cleaning area 91 arranged on the base station body 8, and a water delivery channel (not shown in the Figure) communicating with the cleaning area 91. The first water tank 1 is provided with a first channel communicating with the first cavity 11. When the first water tank 1 is installed in the base station body 8, the first channel is coupled to the water delivery channel so as to communicate the first cavity 11 and the cleaning area 91.

In some embodiments, the water delivery channel of the base station body 8 may include a clean water delivery channel 82; the first cavity 11 includes a first clean water cavity 11a, and the first channel includes a first clean water channel; when the first water tank 1 is installed in the base station body 8, the first clean water channel is coupled to the clean water delivery channel 82 so as to communicate the first clean water cavity 11a and the cleaning area, such that the first clean water cavity 11a is capable of delivering clean water to the cleaning area. In an exemplary embodiment, the cleaning area 91 may be provided with a water spray hole 911, the clean water in the water tank may flow to the water spray hole 911 through the clean water delivery channel 82, and finally be sprayed from the water spray hole 911 to the cleaning area 91.

In some embodiments, the water delivery channel of the base station body 8 may include a sewage delivery channel 93; the first cavity 11 includes a first sewage cavity 11b, and the first channel includes a first sewage channel; when the first water tank 1 is installed in the base station body 8, the first sewage channel is coupled to the sewage delivery channel 93 so as to communicate the first sewage cavity 11b with the cleaning area, such that the first sewage cavity 11b is capable of receiving the sewage discharged from the cleaning area 91. In an exemplary embodiment, as shown in FIG. 8A, the cleaning area 91 may be provided with a cleaning rib 92. When the cleaning robot self-cleans in the base station 100, the cleaning rib 92 may remain in contact with the members to be cleaned (such as mopping members) of the cleaning robot to scraping off the dirt of the members to be cleaned. The specific structure of the cleaning area 91 will be described below. In some embodiments, as shown in FIG. 8B, the cleaning area 91 may be provided with a drainage hole 912, sewage generated after the base station performing cleaning to the cleaning robot (for example, after the mopping member of the cleaning robot is cleaned) may be discharged from the drainage hole 912, and then is transported to the first sewage cavity 11b through the sewage delivery channel 83.

It should be understood that the first channel may be defined in various forms, for example, the above-mentioned interface, through hole, pipe, etc.; the water delivery channel may also be defined in various forms; as long as the communication between the first cavity 11 and the cleaning system 9 can be realized by the coupling of the first channel and the water delivery channel.

Referring to FIGS. 1A-1H and FIG. 10, in an exemplary embodiment, the first water tank 1 includes a first clean water tank 1a and a first sewage tank 1b which are independent of each other, and the first clean water tank 1a is defined with the first clean water cavity 11a for storing clean water, the first sewage tank 1b is defined with the first sewage cavity 11b for storing sewage. Of course, in another exemplary embodiment, the first clean water cavity 11a for storing clean water and the first sewage cavity 11b for storing sewage may both be defined in only one first water tank 1. In a further exemplary embodiment, the base station may also include only the first water tank 1 capable of providing clean water, or only the first water tank 1 capable of receiving sewage.

Figure 9A:
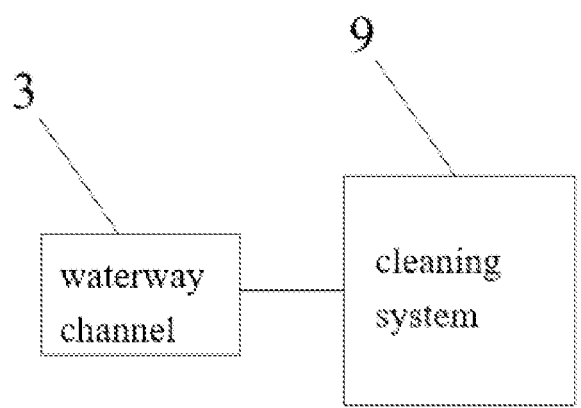
FIGS. 9A and 9B show schematic diagrams of a second waterway system and a cleaning system according to an embodiment of the present disclosure.
Figure 9B:
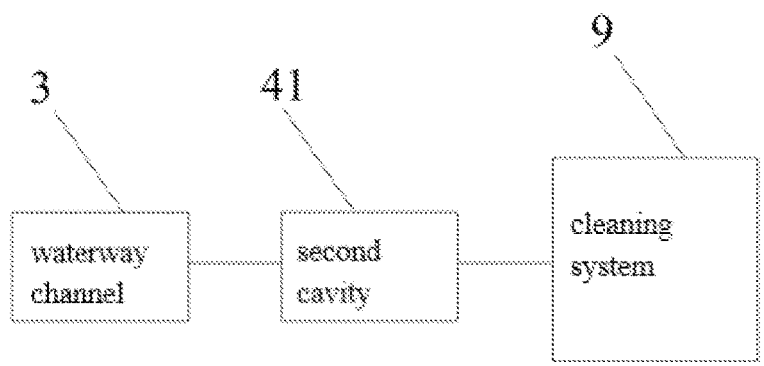
Figure 9C:
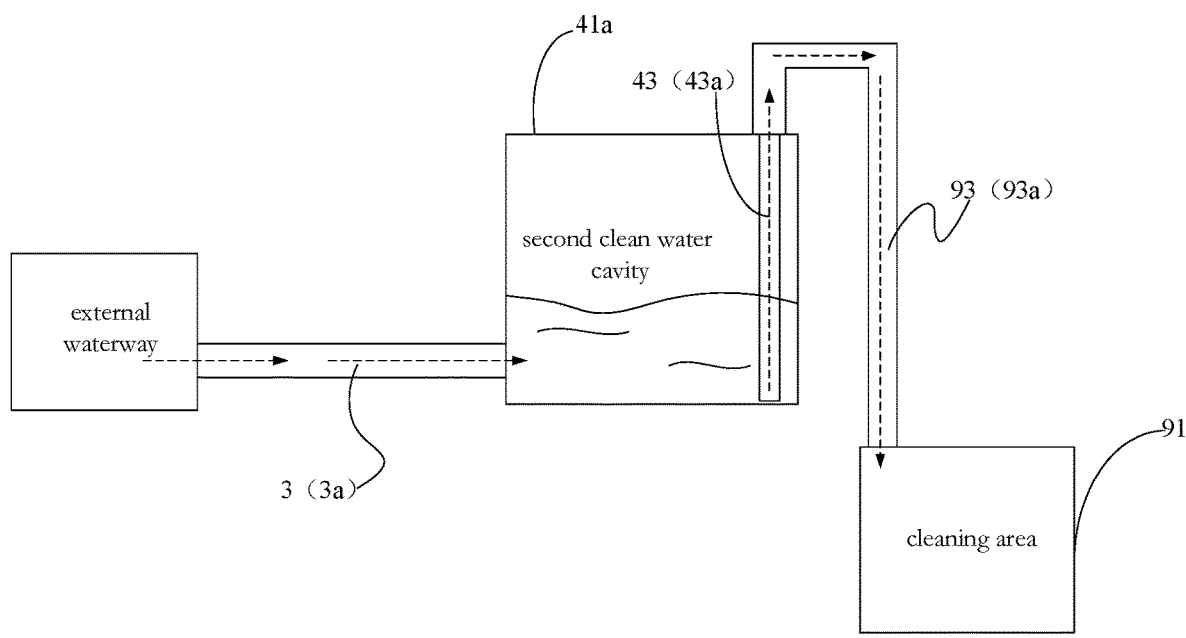
FIG. 9C shows a schematic diagram of water supplying for the second waterway system and the cleaning system according to an embodiment of the present disclosure.
Figure 9D:
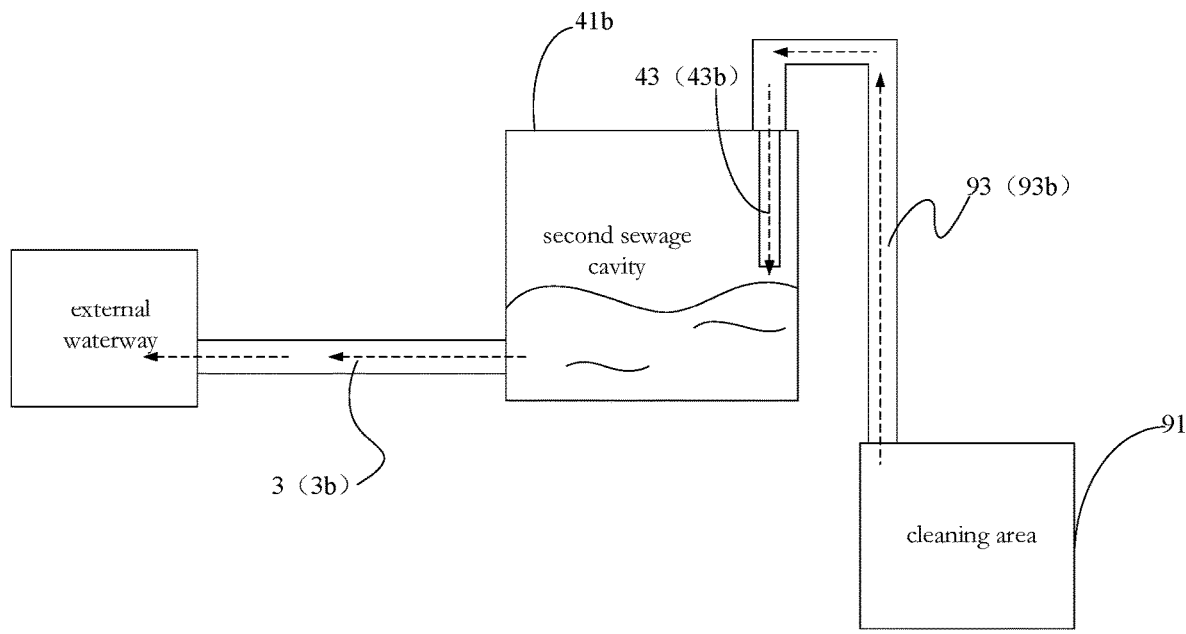
FIG. 9D shows a schematic diagram of drainage for the second waterway system and the cleaning system according to an embodiment of the present disclosure.

Referring to FIGS. 9A and 9D, the second waterway system includes a waterway channel 3 which is configured to communicate with the external waterway, so that clean water from the external waterway (such as a tap water pipe) can pass through the waterway channel 3 to enter the cleaning system in the base station body 8, such that the clean water in the external waterway can be delivered to the cleaning system. And/or, the sewage generated by the cleaning system of the base station body 8 can be discharged to an external waterway (e.g., a drainage pipe, which can be connected to a sewer) through the waterway channel 3. In an exemplary embodiment, as shown in FIGS. 9A-9G, the base station 100 may be connected to a tap water end (not shown in the Figure) through an external water delivery pipe 101, and may be connected to a sewer through an external sewage pipe 102. The waterway channel 3 is configured to receive clean water from an external waterway (e.g., a tap water pipe) outside the base station and deliver the clean water to the cleaning system 9. And/or, the waterway channel 3 is configured to receive the sewage generated by the cleaning system 9 and discharge the sewage to the outside of the base station. In various embodiments, the second waterway system may only be used to be fed with water (supplied with clean water), or only be used to be discharged of water (drained of sewage), or not only be used to be fed with water but also be discharged of sewage. Of course, the second waterway system may also be possible to choose working modes among being used to be fed with water, discharged of sewage, and the both, as long as it is capable of realizing the communication between the cleaning system 9 and the outside of the base station to transport water. In some other embodiments, in order to realize that the external clean water is delivered to the base station 100, the external clean water may directly flow to the base station 100 under the external water pressure, or a power device (such as a pump) may be used to transport the external clean water to the base station 100. In order to realize that the sewage in the base station 100 is automatically discharged to the outside, a power device (such as a pump) may be used to pump the sewage to the outside. By using the second waterway system to carry out water supply and/or drainage, there is not need for users to manually add clean water to the water tank or manually remove the sewage in the water tank, thereby reducing the burden of some users.

Figure 7A:
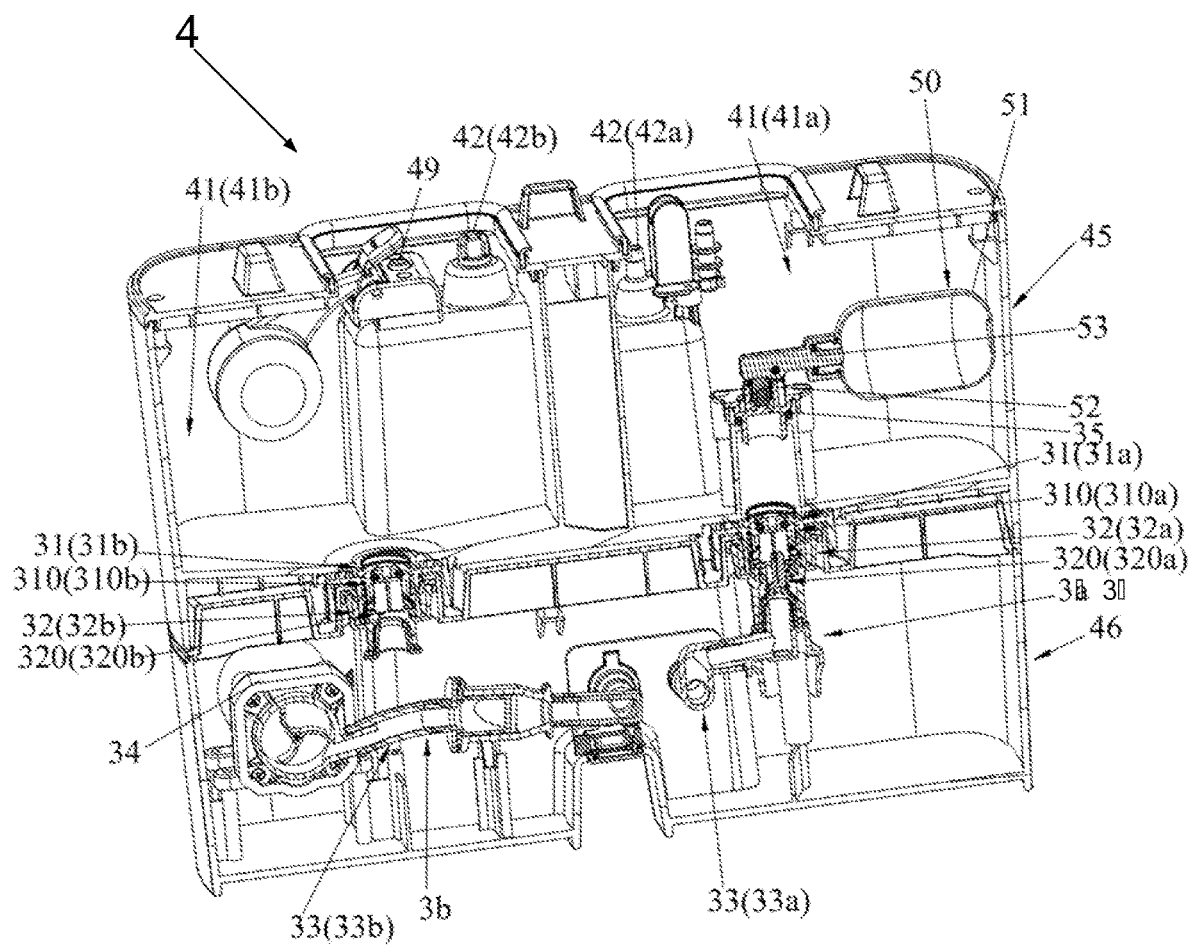
FIG. 7A shows a first cross-sectional view of the second water tank according to an embodiment of the present disclosure.
Figure 7B:
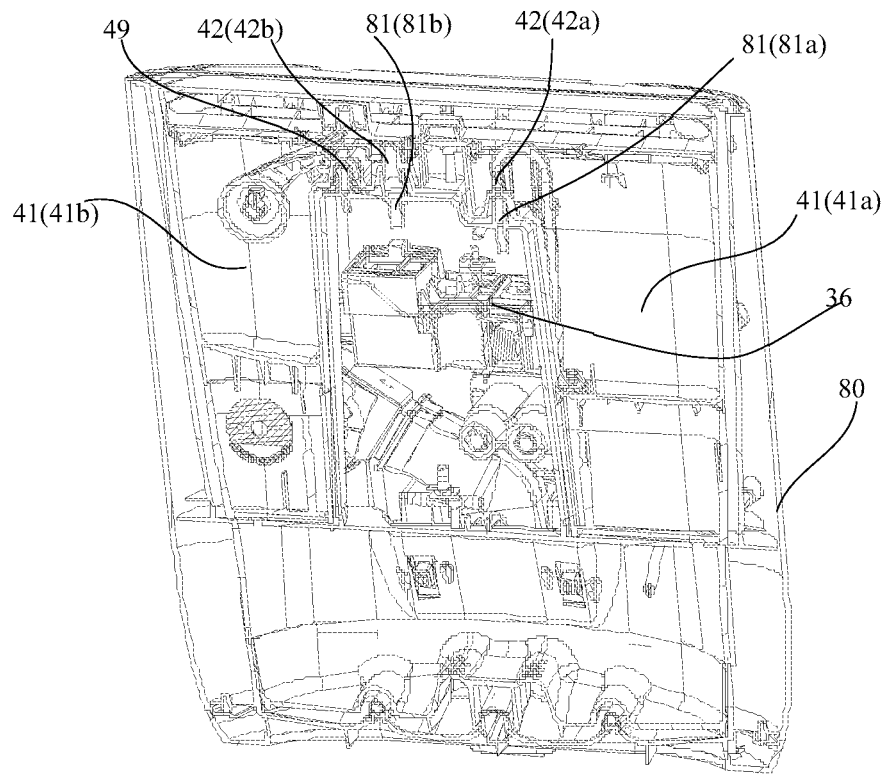
FIG. 7B shows a second cross-sectional view of the second water tank according to an embodiment of the present disclosure.

Referring to FIGS. 7A-7B, and 8B, in some embodiments, the second waterway system further includes a second cavity 41, the second cavity 41 is configured to receive and store clean water from the waterway channel 3, and provide clean water to the cleaning system 9; and/or, the second cavity 41 is configured to receive and store the sewage generated by the cleaning system 9, and output the sewage to the waterway channel 3. By the arrangement of the second cavity 41, clean water and/or sewage may be temporary stored in the second cavity 41 accompanying with the second waterway system performing automatic water feeding and/or water discharge, which effectively guarantees the reliability of using the base station of the present disclosure, and is also conducive to improve the convenience of use.

Referring to FIGS. 2, 7A-7B, and 8A-8B, the second waterway system includes a second water tank 4, the second cavity 41 may be defined in the second water tank 4, and the second water tank 4 is removably installed in the base station body 8. At least part of the waterway channel 3 is arranged on the second water tank 4. When the second water tank 4 is installed in the base station body 8, the second cavity 41 is communicated with the cleaning system 9. Since the second cavity 41 is defined in the second water tank 4, a channel that can communicate with the second cavity 41 is needed to be arranged on the second water tank 4. Specifically, the waterway channel 3 may be integrally arranged on the second water tank 4. When the second water tank 4 is installed in the base station body 8, the waterway channel 3 on the second water tank 4 may be configured to be directly communicated with external waterway. Of course, in some other embodiments, the waterway channel 3 may also be partially set on the second water tank 4 and partially set on the base station body 8, when the second water tank 4 is installed in the base station body 8, the part of the waterway channel 3 on the water tank 4 is coupled with the part of the waterway channel 3 on the base station body 8 to define an integral waterway channel 3. Since the second cavity 41 is defined in the second water tank 4, it is easy to be taken out for cleaning and other operations.

In some embodiments, the cleaning system 9 includes the cleaning area 91 and a water delivery channel 93 communicating with the cleaning area 91. The second water tank 4 is provided with a second channel and a third channel (i.e., the waterway channel 3) that communicate with the second cavity 41. When the second water tank 4 is installed in the base station body 8, the second channel is coupled to the water delivery channel to communicate with the second cavity 41 and the cleaning area, and the third channel is configured to communicate with external waterway.

In some embodiments, as shown in FIG. 9C, the water delivery channel 93 includes a clean water delivery channel 93a, the second cavity 41 includes a second clean water cavity 41a, the second channel 43 includes a second clean water channel 43a, and the third channel includes a third clean water channel 3a. When the second water tank 4 is installed in the base station body 8, the second clean water channel 43a is coupled to the clean water delivery channel 93a to communicate the second clean water cavity 41a and the cleaning area 91, then the second clean water cavity 41a is capable of delivering clean water needed for cleaning to the cleaning area 91 (the dashed arrow in FIG. 9C shows the clean water flow path), and the third clean water channel 3a is configured to communicate with external waterway to receive clean water from an external water source and deliver the clean water to the second clean water cavity 41a.

In some embodiments, as shown in FIG. 9D, the water delivery channel 93 includes a sewage delivery channel 93b, the second cavity 41 includes a second sewage cavity 41b, the second channel 43 includes a second sewage channel 43b, and the third channel includes a third sewage channel 3b. When the second water tank 4 is installed in the base station body 8, the second sewage channel 43b is coupled to the sewage delivery channel 93b to communicate the second sewage cavity 41b and the cleaning area, then the second sewage cavity 41b is capable of receiving the sewage discharged from the cleaning area 91 (the dashed arrow in FIG. 9D shows the sewage flow path), and the third sewage channel 3b is configured to couple with external waterway to output the sewage in the second sewage cavity 41b to the external waterway.

It should be understood that the second channel 43 may be in various forms, for example, it may be an interface, a through hole, or a pipe, etc.; the water delivery channel may also be in various forms; as long as the communication between the second cavity 41 and the cleaning system 9 can be realized by the coupling of the second channel and the water delivery channel. The third channel 3 may also have different structures, as long as it can be directly or indirectly coupled to the external waterway.

In some embodiments, the third sewage channel 3b may be provided with a first power device 34 which is configured to provide a power for outputting the water in the second sewage cavity 41b to external waterway. The first power device 34 may include, but is not limited to, a pump.

As shown in FIG. 1B, in case the base station includes the first water tank 1 and the second water tank 4 either of which is installed in the base station body 8, the first water tank 1 communicates with the water delivery channel of the cleaning system 9 by way of the first channel, and the second water tank 4 communicates with the water delivery channel of the cleaning system 9 by way of the second channel. In some embodiments, the water delivery channel is provided with a second power device 36, when the first water tank 1 or the second water tank 4 is installed in the base station body 8, the second power device 36 is configured to provide power for delivering the clean water in the first water tank 1 or the second water tank 4 to the cleaning area, or for transporting the sewage in the cleaning area to the first water tank 1 or the second water tank 4. Referring to FIGS. 7A and 7B, specifically, the second water tank 4 is defined with the second clean water cavity 41a for storing clean water and the second sewage cavity 41b for storing sewage, that is, one water tank has the function of both storing clean water and storing sewage. Of course, in order to realize either or both the function of automatic water feeding and automatic water discharging, the second water tank 4 may also include a second clean water tank and a second sewage tank that are independent of each other, the second clean water tank is defined with a second clean water cavity for storing clean water, and the second sewage tank is defined with a second sewage cavity for storing sewage. The base station may also include only one second clean water tank or only one second sewage tank.

Referring to FIGS. 3, 4, 7A, and 7B, in an exemplary embodiment, the second water tank 4 is provided with a third interface 42 that communicates with the second cavity 11. When the second water tank 4 is installed in the base station body 8, the third interface 42 is coupled to the second interface 81 of the cleaning system 9 to make the second cavity 41 communicate with the cleaning system 9. It should be understood that, the third interface 42 on the second water tank 4 and the second interface 81 on the base station body 8 may be coupled in different ways. For example, the third interface 42 is inserted into the second interface 81, or, the second interface 81 is inserted into the third interface 42. In an exemplary embodiment, the second interface 81 is penetrated into the second cavity 41 through the third interface 42. In this way, clean water or sewage will not directly flow through the third interface 42, that is, fluid does not contact with the inner wall surface of the third interface 42, but only contacts with the inner wall surface of the second interface 81. The second water tank 4 may also include structures such as through holes, pipes and/or valves arranged on the second water tank 4 to facilitate the communication between the second cavity 41 and the cleaning system 9, for example, using a valve to control the on-off of the waterway, and so on. The present disclosure is not limited to this, as long as the second cavity 41 can communicate with the cleaning system 9 in the base station body 8.

Figure 6:
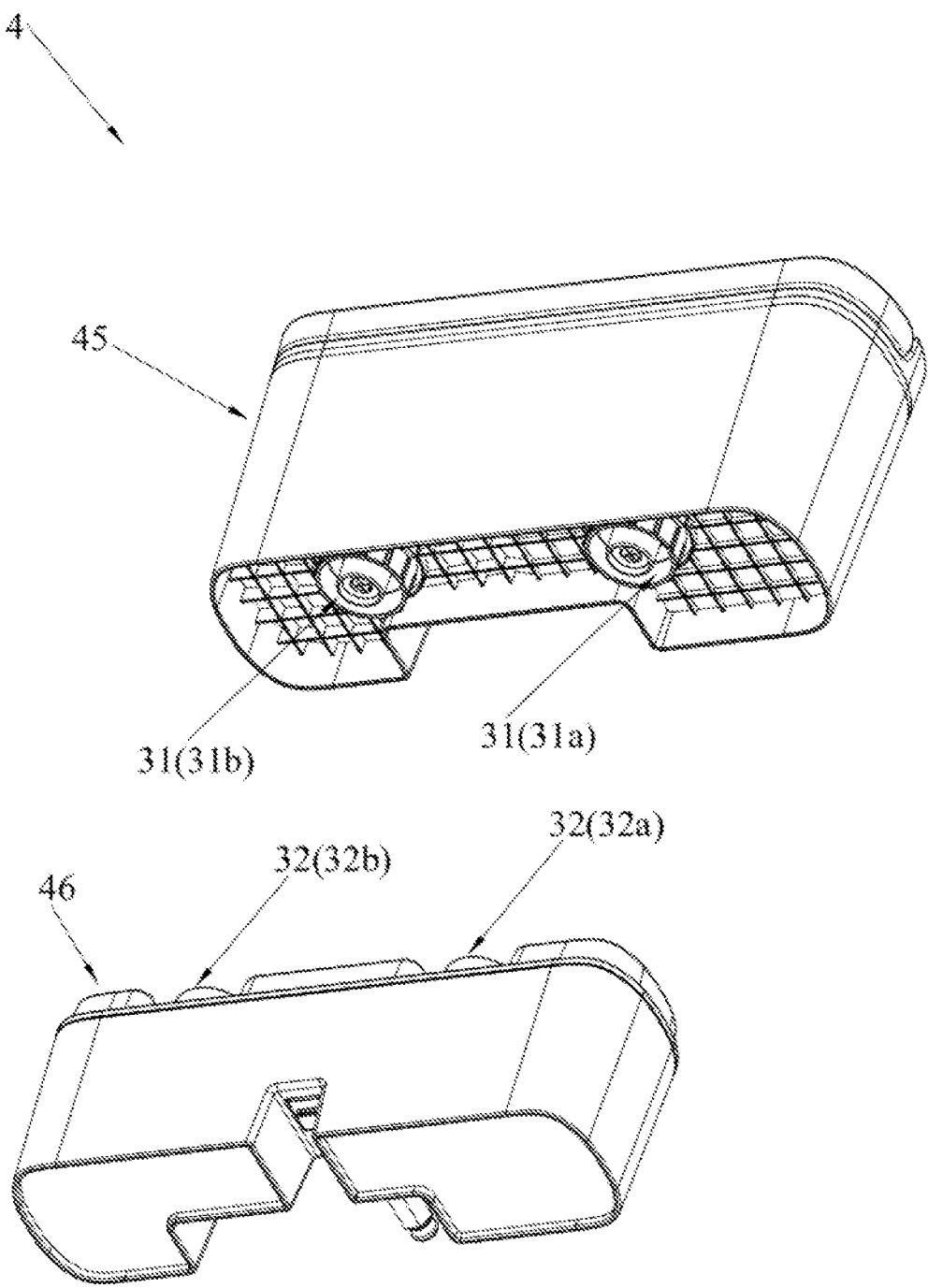
FIG. 6 shows an exploded view of the second water tank according to an embodiment of the present disclosure.

Referring to FIGS. 6, and 7A-7B, in an exemplary embodiment, the second water tank 4 includes a first tank body 45 and a second tank body 46 separable with each other, the second cavity 41 is defined in the first tank body 45, and the waterway channel 3 is defined on both the first tank body 45 and the second tank body 46. When the first tank body 45 and the second tank body 46 are coupled together, the portion of the waterway channel 3 located at the first tank body 45 and the portion of the waterway channel 3 located at the second tank body 46 are coupled with each other.

In some embodiments, the waterway channel 3 includes a fourth interface 31 arranged on the first tank body 45, a fifth interface 32 and a delivery pipeline 33 arranged in the second tank body 46, and the fourth interface 31 communicates with the second cavity 41, the fifth interface 32 is located at one end of the delivery pipeline 33, and the other end of the delivery pipeline 33 is configured to connect with external waterway. When the first tank body 45 and the second tank body 46 are coupled together, the fourth interface 31 and the fifth interface 32 are coupled to communicate the second cavity 41 with the delivery pipeline 33.

In some embodiments, the fourth interface 31 includes a first check valve structure 310, the fifth interface 32 includes a second check valve structure 320, and the first check valve structure 310 and the second check valve structure 320 are configured to: dock and push with each other to an open state when the first tank body 45 is docked to the second tank body 46, and automatically reset to a closed state when the first tank body 45 and the second tank body 46 are separated.

Figure 3:
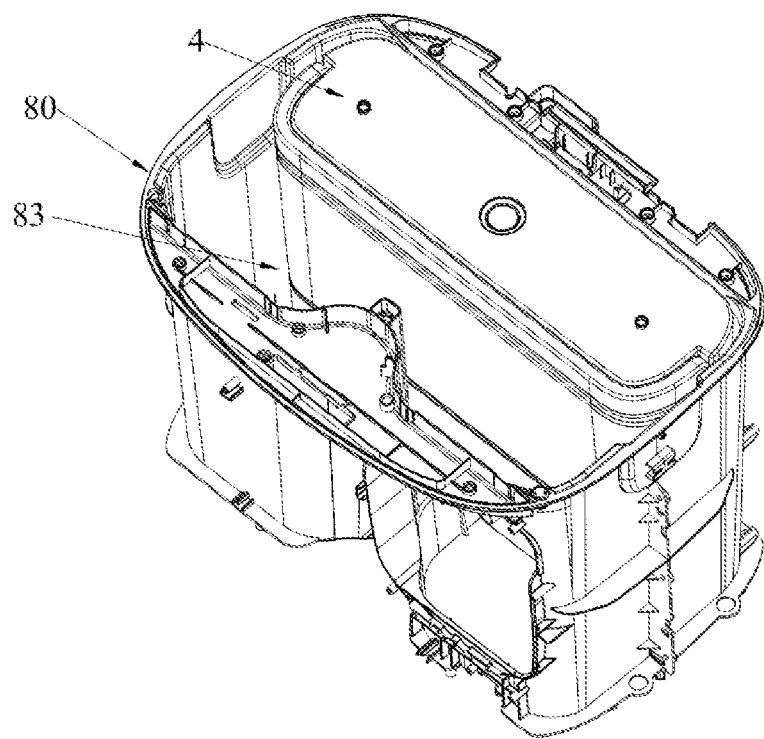
FIG. 3 shows a perspective view of a base station bracket and the second water tank according to an embodiment of the present disclosure.
Figure 5:
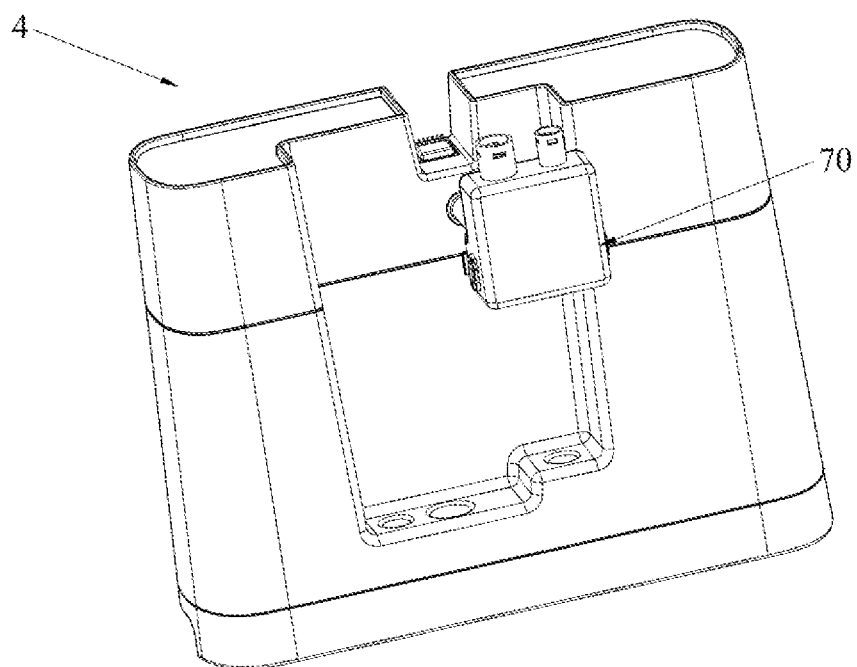
FIG. 5 shows a perspective view of the second water tank and an adapter according to an embodiment of the present disclosure.

Referring to FIGS. 3 and 5, in order to facilitate the communication with external waterway, a separable adapter 70 may be arranged to a corresponding port of the waterway channel 3, of course, the adapter 70 may also be regarded as a component of the second water tank 4. In this embodiment, the second water tank 4 is first installed in the base station body 8, and then the adapter 70 is connected to the second water tank 4.

In addition, the second tank body 46 in this embodiment may be regarded as a component of the base station body 8, correspondingly the first tank body 45 is the second water tank 4.

Referring to FIGS. 1A to 4, either the first water tank 1 or the second water tank 4 is installed at a same position in the base station body 8. By installing the first water tank 1 and the second water tank 4 at the same position in the base station body 8, it is beneficial to achieve a balance between the size of the base station and the water tank capacity, and users can install the second water tank 4 with the function of automatic water feeding and automatic sewage draining or the first water tank 1 without the function of automatic water feeding and automatic sewage draining to the base station body 8, which is conducive to reuse of the base station body 8 since there is no need to provide a respective base station for each water tank, which is conducive to saving the costs.

In order to facilitate the installation of the first water tank 1 and the second water tank 4, a water tank accommodating space 82 may be defined in the base station body 8. Specifically, the water tank accommodating space 82 is defined in the base station bracket 80.

As shown in FIGS. 3 and 4, when the first water tank 1 and/or the second water tank 4 is installed in the water tank accommodating space 82, the water tank accommodating space 82 includes an water tank installing space 84 occupied by the first water tank 1 and/or the second water tank 4, and an accessory placing space 83 that is not occupied by the first water tank 1 and/or the second water tank 4, for example, the cleaning members of the cleaning robot may be placed in the accessory placing space 83. In this way, the base station is capable of receiving extra accessories, so that users can quickly find the accessories when need to use the accessories.

Figure 12:
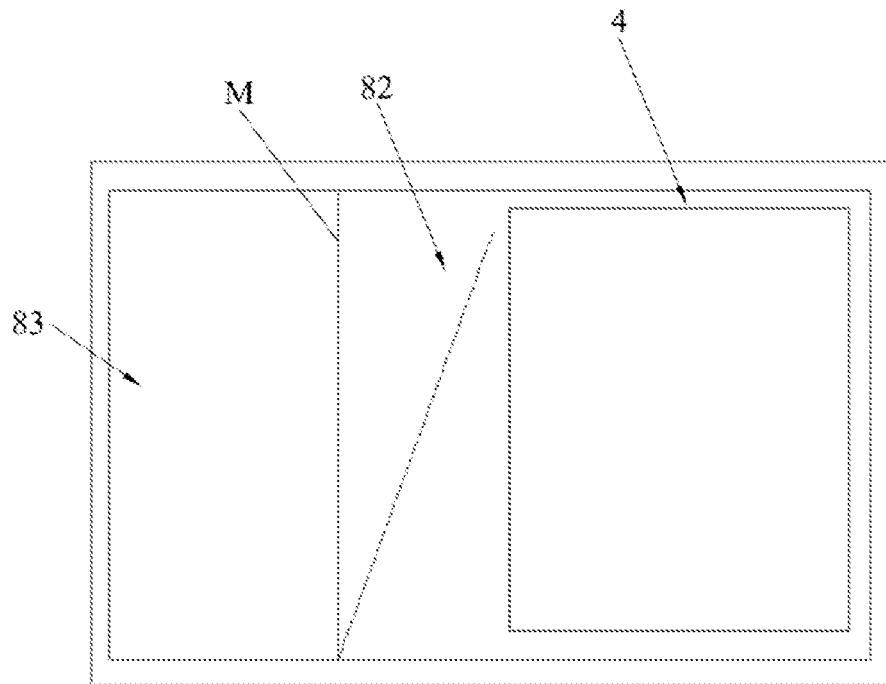
FIG. 12 is a schematic diagram showing the relationship among a water tank accommodating space, an accessory placing space, a partition door, and the second water tank in the base station according to an embodiment of the present disclosure.

Further referring to FIG. 12, the water tank accommodating space 82 is provided with a partition door M that separates the accessory placing space 83 from the water tank installing space 84, and the end of the partition door M that is opposite to the open end of the accessory placing space 83 is in swingable connection with the base station body 8. When being installed in the water tank accommodating space 82, the first water tank 1 and/or the second water tank 4 is spaced from the partition door M, so that the partition door M is capable of swinging towards the first water tank 1 and/or the second water tank 4. By the arrangement of the partition door M, the accessories placed in the accessory placing space 83 may be prevented from sliding to the installing position of the first water tank 1 and/or the second water tank 4 to avoid affecting the installation of the first water tank 1 and/or the second water tank 4. In addition, it is also possible to prevent the first water tank 1 and/or the second water tank 4 from touching with the accessories. And, by virtue of the swingable partition door M, it is convenient to further open the accessory placing space 83 to place accessories to the accessory placing space 83 or take out the accessories from the accessory placing space 83.

In an exemplary embodiment, either the first water tank 1 or the second water tank 4 is installed in the water tank accommodating space 82, namely, in the water tank installing space 84. In case the first water tank 1 is installed in the water tank accommodating space 82, there is a small interval or no interval between the first water tank 1 and the partition door M, and the partition door M will be restricted to be opened, so, only after the first water tank 1 is taken out from the accessory placing space 83, the partition door M is possible to be opened a larger angle to enlarge the accessory placing space 83 for the accessories to be conveniently placed in or taken out from the accessory placing space 83. In case the second water tank 4 is installed in the water tank accommodating space 82, there is a relative large interval between the second water tank 4 and the partition door M, so the partition door M is capable of being opened towards the second water tank 4 to enlarge the accessory placing space 83 to allow the accessories to be conveniently placed in or taken out from the accessory placing space 83.

The cleaning system 9 includes the water delivery channel 93. The first water tank 1 is defined with the first cavity 11 and the first channel 12 communicating with the first cavity 11. When the first water tank 1 is installed in the water tank accommodating space 82, the first channel 12 is coupled with the water delivery channel, causing the first cavity 11 communicating with the cleaning system 9. The second water tank 4 is defined with the second cavity 41 and the second channel communicating with the second cavity 41. When the second water tank 4 is installed in the water tank accommodating space 82, the second channel is coupled with the water delivery channel, causing the second cavity 41 communicating with the cleaning system 9.

Figure 9E:
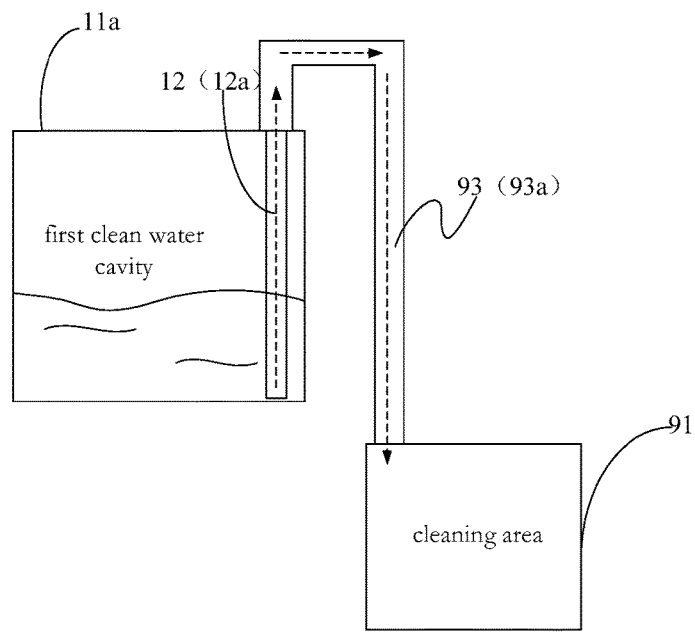
FIG. 9E shows a schematic diagram of supplying clean water for the first waterway system and the cleaning system according to an embodiment of the present disclosure.

In some embodiments, as shown in FIG. 9E, the water delivery channel 93 includes a clean water delivery channel 93a, the first cavity 11 includes a first clean water cavity 11a, and the first channel 12 includes a first clean water channel 12a, when the first water tank 1 is installed in the base station body 8, the first clean water channel 12a is coupled to the clean water delivery channel 93a, causing the first clean water cavity 11a communicating with the cleaning area 91, then the first clean water cavity 11a is capable of delivering clean water to the cleaning area 91 (the dashed arrow in FIG. 9E shows the clean water flow path).

Figure 9F:
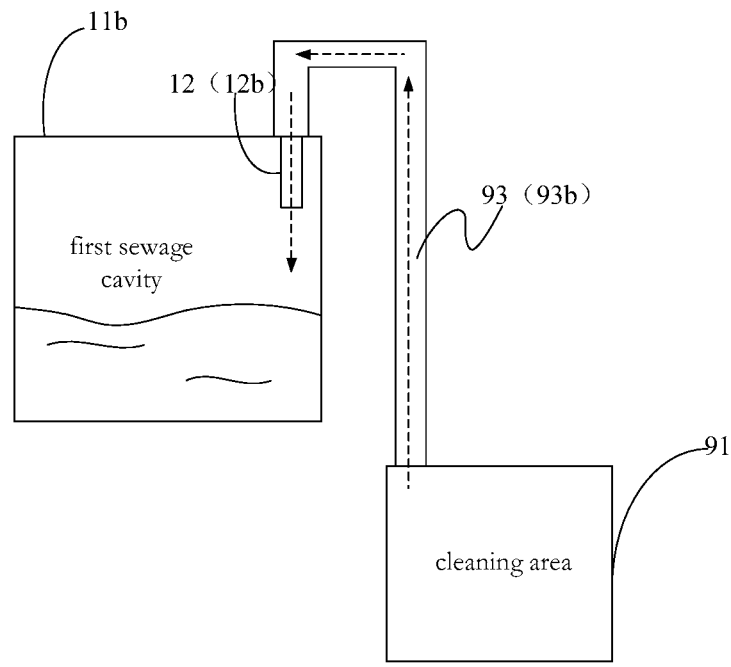
FIG. 9F shows a schematic diagram of receiving sewage for the first waterway system and the cleaning system according to an embodiment of the present disclosure.
Figure 9G:
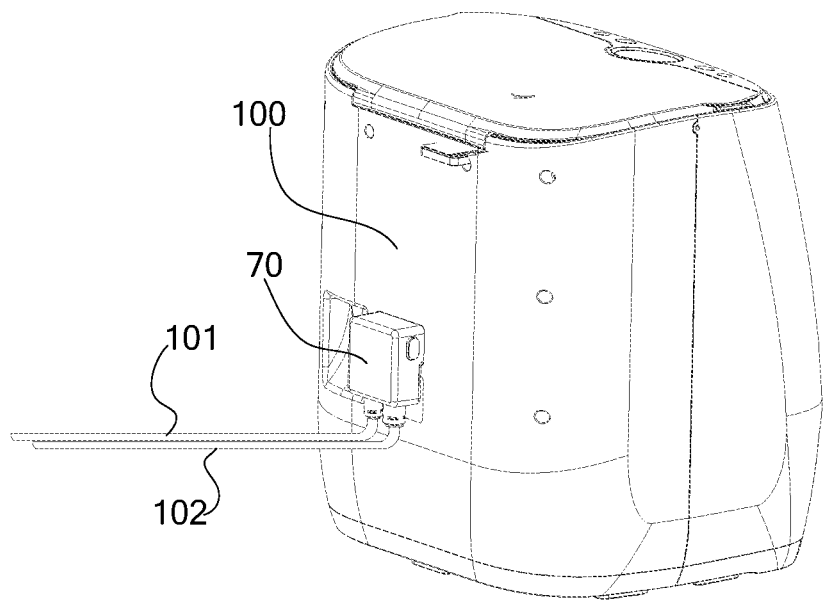
FIG. 9G shows a schematic diagram of a state in which the base station is coupled with an external water pipe according to an embodiment of the present disclosure.

In some embodiments, as shown in FIG. 9F, the water delivery channel 93 includes a sewage delivery channel 93b, the first cavity 11 includes a first sewage cavity 11b, and the first channel 12 includes a first sewage channel 12b. When the first water tank 1 is installed in the base station body 8, the first sewage channel 12b is coupled with the sewage delivery channel 93b, causing the first sewage cavity 11b communicating the cleaning area 91, then the sewage generated in the cleaning area 91 is capable of being transported to the first sewage cavity 11b (the dashed arrow in FIG. 9F shows the sewage flow path).

In some embodiments, as shown in FIG. 9C, the water delivery channel 93 includes a clean water delivery channel 93a, the second cavity 41 includes a second clean water cavity 41a, the second channel 43 includes a second clean water channel 43a, and the third channel 3 includes a third clean water channel 3a. When the second water tank 4 is installed in the base station body 8, the second clean water channel 43a is coupled with the clean water delivery channel 93a, causing the second clean water cavity 41a communicating with the cleaning area 91, then the second clean water cavity 41a is capable of delivering clean water to the cleaning area 91 (the dashed arrow in FIG. 9C shows the clean water flow path).

In some embodiments, as shown in FIG. 9D, the water delivery channel 93 includes a sewage delivery channel 93b, the second cavity 41 includes a second sewage cavity 41b, the second channel 43 includes a second sewage channel 43b, and the third channel 3 includes a third sewage channel 3b. When the second water tank 4 is installed in the base station body 8, the second sewage channel 43b is coupled with the sewage delivery channel 93b, causing the second sewage cavity 41b communicating with the cleaning area, then the second sewage channel 41b is capable of receiving sewage discharged from the cleaning area 91 (the dashed arrow in FIG. 9D shows the sewage flow path).

Referring to FIGS. 3 to 5 and FIGS. 9C and 9D, the second water tank 4 is provided with the third channel 3 that communicates with the second cavity 41, the base station body 8 is provided with a mounting port communicating with the water tank accommodating space 82, when the second water tank 4 is installed in the water tank accommodating space 82, the third channel corresponds to the mounting port and is coupled to the external waterway through the mounting port, so as to receive clean water from an external water source and deliver it to the second cavity 41, or discharge the sewage in the second cavity 41 outside. By the arrangement of the mounting port, the second water tank 4 may be conveniently coupled to the external waterway.

Further, the mounting port may be detachably assembled with the adapter 70, the adapter 70 is configured to connect with the third channel, such that the third channel can be coupled to the external waterway through the adapter 70.

The first water tank 1 includes the first clean water tank 1a and the first sewage tank 1b, and the second water tank 4 is provided with both the second clean water cavity 41a for storing clean water and the second sewage cavity 41b for storing sewage, during using, both the first clean water tank 1a and the first sewage tank 1b may be selected to be placed in the water tank accommodating space 82, or the second water tank 4 may be selected to be placed in the water tank accommodating space 82 for automatically performing water feeding and sewage discharging.

It should be noted that the above mentioned "same position" does not refer to locating at a completely consistent position, but when either of the first water tank 1 and the second water tank 4 is placed in the base station body 8, there is an overlap of the space occupied by the first water tank 1 and the second water tank 4.

Of course, the first water tank 1 and the second water tank 4 may both be installed in the base station body 8, at different positions of the base station body 8; or, either the first water tank 1 or the second water tank 4 is installed in the base station body 8, at different positions of the base station body 8.

It should be understood that, there are various possibilities for either the first water tank 1 or the second water tank 4 to be installed at a same position in the base station body 8; or there are various possibilities for both or either one of the first water tank 1 and the second water tank 4 to be installed at different positions in the base station body 8. The following are examples of either the first water tank 1 or the second water tank 4 being installed at a same position in the base station body 8:

either the first clean water tank 1a or the second clean water tank is installed at a same position in the base station body 8;
  either the first sewage tank 1b or the second sewage tank is installed at a same position in the base station body 8;
  either the first clean water tank 1a or the second clean water tank is installed at a same position in the base station body 8, and either the first sewage tank 1b or the second sewage tank is installed at a same position in the base station body 8;
  the first water tank 1 includes a first clean water cavity 11a for storing clean water and a first sewage cavity 11b for storing sewage, the second water tank 4 includes a second clean water cavity 41*a* for storing clean water and a second sewage cavity 41*b* for storing sewage, and either the first water tank 1 or the second water tank 4 is installed at a same position in the base station body 8;

the first water tank 1 includes a first clean water cavity 11*a* for storing clean water and a first sewage cavity 11*b* for storing sewage, the first water tank 1 is placed in the base station body 8; or, the second clean water tank and/or the second sewage tank is placed at a same position in the base station body 8;

the second water tank 4 includes a second clean water cavity 41*a* for storing clean water and a second sewage cavity 41*b* for storing sewage, the second water tank 4 is placed in the base station body 8; or, the first clean water tank 1*a* and/or the first sewage tank 1*b* is placed at a same position in the base station body 8.

It should be noted that the second cavity 41 does not necessarily be formed in the water tank, it may also be formed in the base station body 8. The first water tank 1 and the base station body 8 may respectively define a first cavity 11 for realizing different functions, and it is not excluded that the first water tank 1 and the base station body 8 are both provided with a second cavity 41 that realizes a same function.

In case the second cavity 41 is defined in the base station body 8, the first water tank 1 may be installed in the second cavity 41, or may be installed at a position different from the second cavity 41 in the base station body 8, which is not limited herein.

Figure 27A:
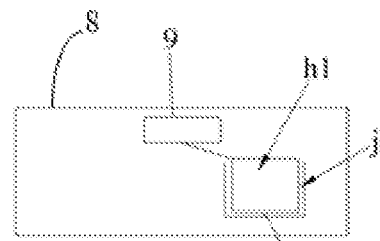
FIGS. 27A and 27B respectively show schematic diagrams of different usage states of the first clean water tank being removably placed in a second clean water cavity defined in the base station body according to the embodiments of the present disclosure.
Figure 27B:
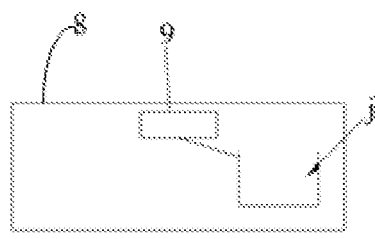

Referring to FIGS. 27A and 27B, in some embodiments, the cleaning system 9 includes a clean water delivery channel, the second waterway system includes a clean water chamber j and a clean water input channel communicating with the clean water chamber j, the clean water chamber j and the clean water input channel are arranged in the base station body 8, the clean water chamber j is communicated to the clean water delivery channel to provide clean water to the cleaning system 9, and the clean water input channel is configured to couple with the external waterway to deliver clean water from external water source to the clean water chamber j. In this way, there is no need to provide a specialized water tank, and the clean water chamber j and the clean water input channel arranged in the base station main body 8 can be used to realize the automatic water feeding for the base station.

Further, the clean water chamber j may receive a clean water tank h, the clean water tank h is provided with a clean water cavity h1 and a clean water channel communicating with the clean water cavity h1; when the clean water tank h is accommodated in the clean water chamber j, the clean water channel and the clean water delivery channel are coupled to communicate the clean water cavity h1 and the cleaning system 9. In this way, the base station can not only feed clean water to the cleaning system 9 by a regular water tank, but also can realize the automatic water feeding of the base station by the clean water chamber j and the clean water input channel in the base station body 8, which realizes a compatibility effect.

Figure 15A:
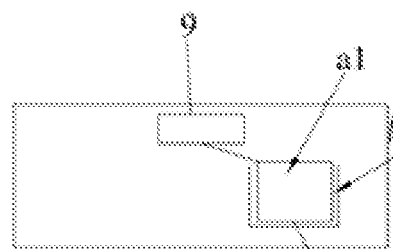
FIGS. 15A and 15B respectively show schematic diagrams of different usage states of the first sewage tank being removably placed in a second sewage cavity defined in the base station body according to the embodiments of the present disclosure.
Figure 15B:
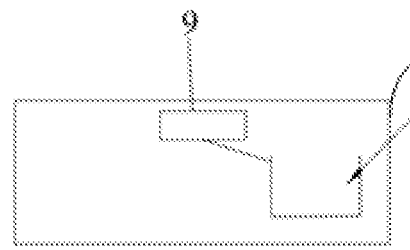

Referring to FIGS. 15A-15B, the cleaning system 9 includes a sewage delivery channel; the second waterway system includes a sewage chamber c and a sewage output channel communicated with the sewage chamber c, and the sewage chamber c and the sewage output channel are arranged in the base station body 8; the sewage chamber c communicates with the sewage delivery channel to receive the sewage discharged from the cleaning system 9; the sewage output channel is configured to couple with the external waterway to discharge the sewage in the sewage chamber c. In this way, there is no need to provide a specialized water tank, and the sewage chamber c and the sewage output channel arranged in the base station body 8 can be used to realize the automatic water discharge for the base station.

Further, the sewage chamber c may receive a sewage tank a, the sewage tank a is provided with a sewage cavity a1 and a sewage channel communicating with the sewage cavity a1; when the sewage tank a is accommodated in the sewage chamber c, the sewage channel and the sewage delivery channel are coupled to communicate the sewage cavity a1 with the cleaning system 9. In this way, the base station can not only receive the sewage discharged from the cleaning system 9 by the regular water tank, but also realize automatic water discharge by the sewage chamber c and the sewage output channel arranged in the base station body 8, which realizes a compatibility effect.

Of course, the second waterway system is not limited to including the second cavity 41. For example, in some other embodiments, the second waterway system may be coupled to the cleaning system 9 through the waterway channel 3, such that the second cavity 41 for temporarily storing clean water and/or sewage is no longer needed.

In some embodiments, the waterway channel 3 includes a clean water input channel, and the clean water input channel is arranged in the base station body 8; the clean water input channel is communicated with the cleaning system 9, and is configured to couple with external waterway for receiving clean water from external water source and delivering the clean water to the cleaning system 9. In this way, there is no need to provide the second clean water cavity 41*a* for temporarily storing clean water.

In some embodiments, the waterway channel 3 includes a sewage output channel arranged in the base station body 8; the sewage output channel is communicated with the cleaning system 9, and is configured to couple with external waterway for discharging the sewage produced by the cleaning system 9. In this way, there is no need to provide the second sewage cavity 41*b* for temporarily storing sewage.

In addition, when the second waterway system includes both the automatic water feeding system and the automatic drainage system, one of the systems may adopt a solution of including the second cavity 41, and the other may adopt a solution of not including the second cavity 41; or, the two systems of the second waterway system may both adopt the solution of including the second cavity 41, or both adopt the solution of not including the second cavity 41, for example, the waterway channel 3 is coupled to the cleaning system 9 and also coupled to the second cavity 41.

The waterway channel 3 mentioned above is not limited to the specific form presented in the above embodiments. According to various embodiments, no matter the waterway channel 3 is arranged only on the base station body 8, only on the second water tank 4, or both on the first water tank 4 and the base station body 8, or some other cases, there may be various forms, as long as the purpose of inputting clean water from the waterway outside the base station or discharging sewage to the outside can be achieved. For example, the waterway channel 3 may only include a through hole or an interface defined on the second water tank 4 or the base station body 8, and the through hole or interface allows the external waterway to communicate with the second cavity 41 (for example, an end of the external waterway may penetrate into the second cavity 41 through the through hole or the interface directly, in this case, liquid will not flow directly through the through hole or the interface; of course, the end of the external waterway may also be coupled with the through hole or the interface in other ways); or the waterway channel 3 may include a structure such as a pipe arranged on the second water tank 4 and/or the base station body 8; or, the waterway channel 3 may include a structure such as a check valve or a joint arranged at the through hole, the interface, or the pipe, through which the waterway channel 3 is coupled with external pipes, etc.

Referring to FIGS. 7A-7B, in some embodiments, the waterway channel 3 is provided with a pump 34, and the pump 34 is configured to provide power for the second cavity 41 to receive clean water from external waterway or to discharge the sewage in the second cavity 41 to the outside. Corresponding to various embodiments of the waterway channel 3, the pump 34 may be arranged in various ways, for example, the pump 34 may be arranged on the second water tank 4 or on the base station body 8. In an illustrative embodiment, the pump 34 is arranged on a delivery pipeline 33 on a second tank body 46 of the second water tank 4. The pump 34 may be different types of pump, such as a vane pump.

It should be noted that, in various embodiments, the first waterway system and the second waterway system may be coupled to a same position of the cleaning system 9, or may be coupled to different positions of the cleaning system 9, which is not limited in the present disclosure.

In order to make the base station be compatible with automatic water feeding and manual water feeding, and/or be compatible with automatic sewage drainage and manual sewage drainage, either or both the first waterway system and the second waterway system may supply clean water to the cleaning system 9 and/or receive the sewage generated by the cleaning system 9 (that is, at least the following situations are included: either of the two for water feeding, either of the two for sewage draining, either of the two for water feeding and sewage draining, both of the two for water feeding, both of the two for sewage draining, and both of the two for water feeding and sewage draining; when either of the two is for water feeding or both of the two are for water feeding, the first waterway system or the second waterway system may be used to achieve sewage draining, and when either of the two is for sewage draining or both of the two are for sewage draining, the first waterway system or the second waterway system may be used to achieve water feeding). Generally, one of the first waterway system and the second waterway system supplies clean water and/or receive sewage. Of course, in case the base station has both the second waterway system and the first waterway system (correspondingly the first water tank 1 is not taken out), it is not excluded that both the second waterway system and the first waterway system supply clean water to the cleaning system 9 and/or receive the sewage generated by the cleaning system 9.

As for the base station possessing compatible effect, when it is to be used, the various situations of the first waterway system and the various situations of the second waterway system mentioned above may be combined to realize water feeding and sewage draining.

According to various embodiments, the first waterway system may include a manual water feeding system and a manual drainage system, or include either the manual water feeding system or the manual drainage system; the second waterway system may include an automatic water feeding system and an automatic drainage system, or include either the automatic water feeding system or the automatic drainage system; as long as either or both the first waterway system and the second waterway system can supply clean water to the cleaning system (compatible with manual water feeding and automatic water feeding); and/or, either or both the first waterway system and the second waterway system can receive the sewage generated by the cleaning system (compatible with manual sewage draining and automatic sewage draining).

Figure 13A:
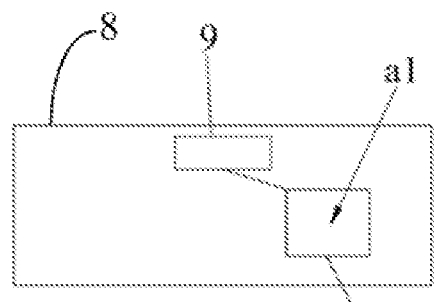
Figure 13B:
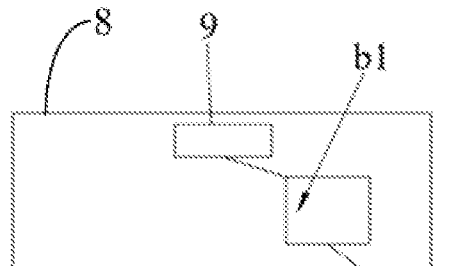

Regardless of whether the water feeding is compatible, only in terms of compatibility with manual sewage draining and automatic sewage draining, there may be at least the following situations:

(1) Referring to FIGS. 13A-13B, the manual drainage system includes a first sewage cavity a1 defined in a first sewage tank a for receiving sewage from the cleaning system 9;

the automatic drainage system includes a second sewage cavity b1 defined in a second sewage tank b for receiving sewage from the cleaning system 9, and the second sewage cavity b1 is communicated to the outside through a waterway channel;

either the first sewage tank a or the second sewage tank b is placed at a same position in the base station body.

Since one of the first sewage tank a and the second sewage tank b is placed at a same position in the base station body, while achieving compatibility with manual sewage drainage and automatic sewage drainage, it is also capable of avoiding additional or excessive occupation of the space of the base station body.

Figure 14A:
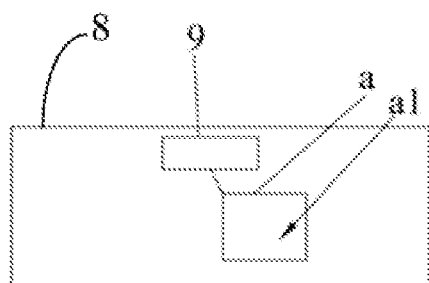
FIGS. 14A-14C respectively show schematic diagrams of different usage states of both or either one of the first sewage tank and the second sewage tank being placed at different positions in the base station body according to the embodiments of the present disclosure.
Figure 14B:
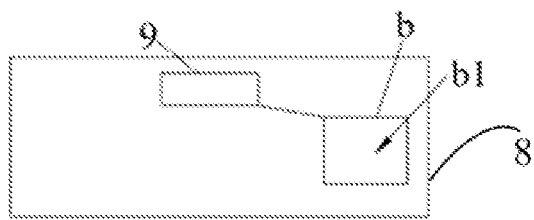
Figure 14C:
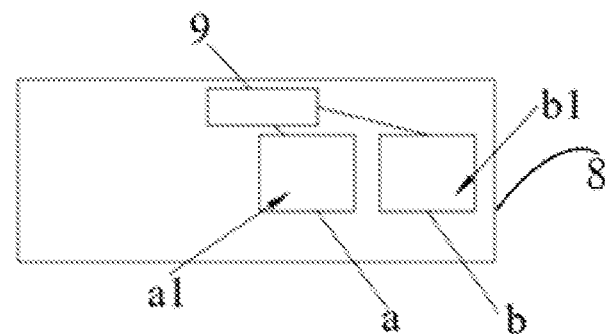

(2) Referring to FIGS. 14A-14C, the manual drainage system includes a first sewage cavity a1 defined in the first sewage tank a for receiving sewage from the cleaning system 9;

the automatic drainage system includes a second sewage cavity b1 defined in the second sewage tank b for receiving sewage from the cleaning system 9, and the second sewage cavity b1 is communicated to the outside through a waterway channel;

both or either one of the first sewage tank a and the second sewage tank b is placed at different positions in the base station body; when both the first sewage tank a and the second sewage tank b are placed in the base station body, both or either one of the first sewage tank a and the second sewage tank b may perform sewage draining according to the situation.

According to various situations, it can be set as follows: the first sewage tank a is kept in communication with the cleaning system 9 once it is placed in the base station body, or the first sewage tank a is controlled to or not to be communicated with the cleaning system 9 when it is placed in the base station body; and/or, the second sewage tank b is kept in communication with the cleaning system 9 once it is placed in the base station body, or the second sewage tank b is controlled to or not to be communicated with the cleaning system 9 when it is placed in the base station body.

Since the first sewage tank a and the second sewage tank b are placed at different positions in the base station body, the first sewage tank a and the second sewage tank b are capable of being always placed in the base station body (except the situation of needing to be taken out), such that the first sewage tank a or the second sewage tank b does not need to be specially stored. According to the situation, sewage draining can be carried out by both the first sewage tank a and the second sewage tank b, either one of the first sewage tank a and the second sewage tank b, or switchable between both sewage tanks and either one sewage tank.

(3) Referring to FIGS. 15A-15B, the manual drainage system includes a first sewage cavity a1 defined in the first sewage tank a for receiving sewage from the cleaning system 9;

the automatic drainage system includes a second sewage cavity c defined in the base station body for receiving sewage from the cleaning system 9, and the second sewage cavity c is communicated to the outside through a waterway channel;

the first sewage tank a is removably placed in the second sewage cavity c, and sewage draining is carried out by either the manual drainage system or the automatic drainage system.

Since the first sewage tank a is removably placed in the second sewage cavity c, while achieving compatibility with manual sewage drainage and automatic sewage drainage, it is also capable of avoiding additional or excessive occupation of the space of the base station body.

Figure 16A:
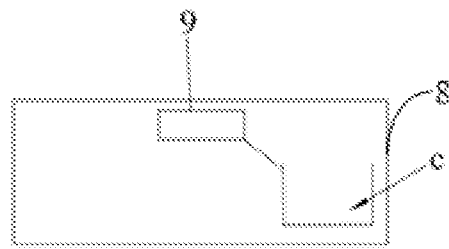
FIGS. 16A and 16B respectively show schematic diagrams of different usage states of the first sewage tank being placed at a position in the base station body different from the location of the second sewage cavity according to the embodiments of the present disclosure.
Figure 16B:
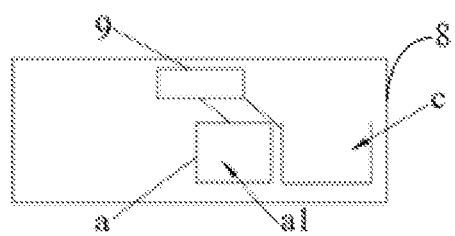

(4) Referring to FIGS. 16A-16B, the manual drainage system includes a first sewage cavity a1 defined in the first sewage tank a for receiving sewage from the cleaning system 9;

the automatic drainage system includes a second sewage cavity c defined in the base station body for receiving sewage from the cleaning system 9, and the second sewage cavity c is communicated to the outside through a waterway channel;

the first sewage tank a is placed at a position different from that of the second sewage cavity c in the base station body;

when the first sewage tank a is placed in the base station body, sewage draining can be carried out by both or either one of the manual drainage system and the automatic drainage system according to the situation;

in case sewage draining is carried out by the automatic drainage system, the first sewage tank a may not be placed in the base station body.

According to various situations, it can be set as follows: the first sewage tank a is kept in communication with the cleaning system 9 once it is placed in the base station body, or the first sewage tank a is controlled to or not to be communicated with the cleaning system 9 when it is placed in the base station body; and/or, the second sewage cavity c is kept in communication with the cleaning system 9 all the time, or the second sewage cavity c can be controlled to or not to be communicated with the cleaning system 9.

Since the first sewage tank a and the second sewage cavity c are arranged at different positions in the base station body, the first sewage tank a may be always placed in the base station body (except the situation of needing to be taken out), and there is no need to specially store the first sewage tank a. Sewage draining can be carried out by both or either one of the first sewage tank a and the second sewage tank c, or switchable between both and either one.

Figure 17A:
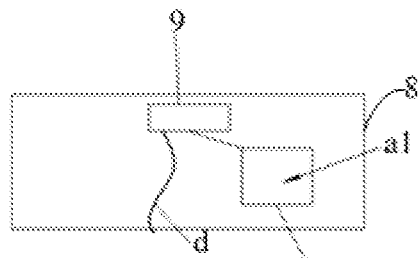
FIGS. 17A and 17B respectively show schematic diagrams of different usage states of a manual drainage system including the first sewage tank and an automatic drainage system directly communicating to the outside and the cleaning system through a waterway channel according to the embodiments of the present disclosure.
Figure 17B:
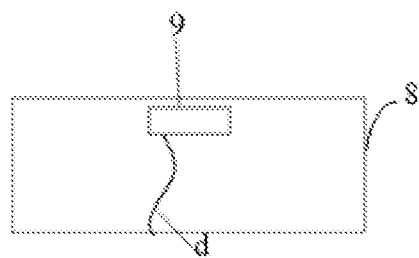

(5) Referring to FIGS. 17A-17B, the manual drainage system includes a first sewage cavity a1 defined in the first sewage tank a for receiving sewage from the cleaning system 9;

the automatic drainage system directly communicates the outside and the cleaning system 9 through a waterway channel d, that is, a second sewage cavity is not included;

when the first sewage tank a is placed in the base station body, sewage draining can be carried out by both or either one of the manual drainage system and the automatic drainage system according to the situation;

in case sewage draining is carried out by the automatic drainage system, the first sewage tank a may not be placed in the base station body.

According to various situations, it can be set as follows: the first sewage tank a is kept in communication with the cleaning system 9 once it is placed in the base station body, or the first sewage tank a is controlled to or not to be communicated with the cleaning system 9 when it is placed in the base station body; and/or, the waterway channel d is controlled to or not to be communicated with the cleaning system 9.

Since the automatic drainage system directly communicates the outside and the cleaning system 9 through the waterway channel d, it is capable of avoiding extra or excessive occupation of the base station body space while achieving compatibility with manual sewage drainage and automatic sewage drainage. In addition, according to different situations, the first sewage tank a may be always placed in the base station body (except the situation of needing to be taken out), such that there is no need to specially store the first sewage tank a. In addition, sewage draining can be carried out by both or either one of the automatic drainage system and the manual drainage system, or switchable between both and either one.

Figure 18A:
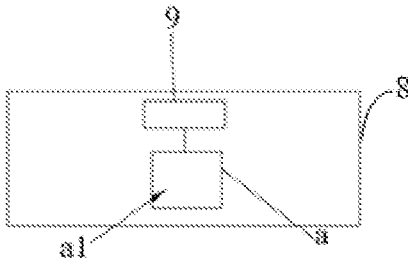
FIGS. 18A and 18B respectively show schematic diagrams of different usage states of either the first sewage tank or the second water tank being placed at a same position in the base station body according to the embodiments of the present disclosure.
Figure 18B:
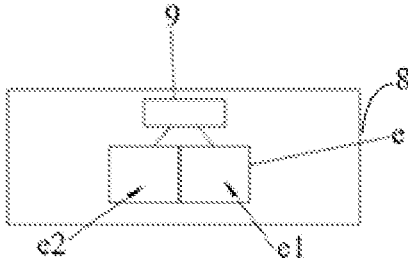

(6) Referring to FIGS. 18A-18B, the manual drainage system includes a first sewage cavity a1 defined in the first sewage tank a for receiving sewage from the cleaning system 9;

the automatic drainage system includes a second sewage cavity e1 defined in a second water tank e for receiving sewage from the cleaning system 9, the second sewage cavity e1 is communicated to the outside through a waterway channel, and the second water tank e also includes a second clean water cavity e2 which is a part of the automatic water feeding system, the second clean water cavity e2 is communicated to the outside through a waterway channel;

either the first sewage tank a or the second water tank e is placed at a same position in the base station body.

In case the second water tank e is placed in the base station body, the automatic water feeding system may perform water feeding and the automatic drainage system may perform sewage draining. Of course, other situations are not excluded, for example, water feeding may also be carried out by the manual water feeding system.

Since one of the first sewage tank a and the second water tank e is placed at a same position in the base station body, while achieving compatibility with the manual drainage and automatic drainage, it is capable of avoiding additional or excessive occupation of the base station body space.

Figure 19A:
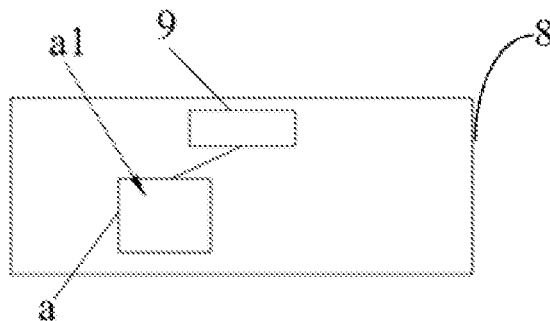
FIGS. 19A-19C respectively show schematic diagrams of different usage states of both or either one of the first sewage tank and the second water tank being placed at different positions in the base station body according to the embodiments of the present disclosure.
Figure 19B:
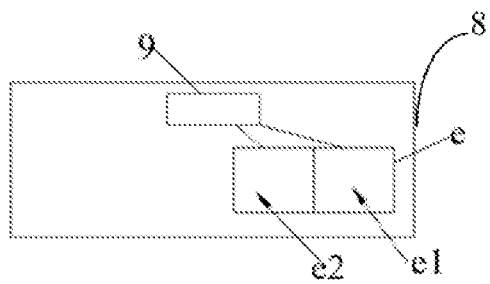
Figure 19C:
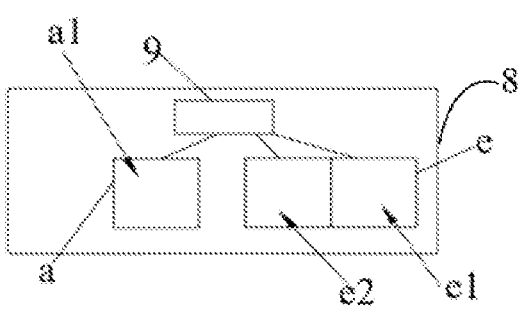

(7) Referring to FIGS. 19A-19C, the manual drainage system includes a first sewage cavity a1 defined in the first sewage tank a for receiving sewage from the cleaning system 9;

the automatic drainage system includes a second sewage cavity e1 defined in the second water tank e for receiving sewage from the cleaning system 9, the second sewage cavity b1 is communicated to the outside through a waterway channel, and the second water tank e also includes a second clean water cavity e2 which is a part of the automatic water feeding system, the second clean water cavity e2 is communicated to the outside through a waterway channel;

both or either one of the first sewage tank a and the second water tank e are placed at different positions in the base station body; when both the first sewage tank a and the second water tank e are placed in the base station body, sewage draining may be carried out by both or either one of them according to the situation.

According to various situations, it may be set as follows: the first sewage tank a is kept in communication with the cleaning system 9 once it is placed in the base station body, or the first sewage tank a is controlled to or not to be communicated with the cleaning system 9 when it is placed in the base station body; and/or, the second sewage cavity e1 is kept in communication with the cleaning system 9 once it is placed in the base station body or is controlled to or not to be communicated with the cleaning system 9 when it is placed in the base station body. The second clean water cavity e2 is kept in communication with the cleaning system 9 once it is placed in the base station body or is controlled to or not to be communicated with the cleaning system 9 when it is placed in the base station body.

Since the first sewage tank a and the second water tank e are placed at different positions in the base station body, the first sewage tank a and the second water tank e may be always placed in the base station body (except the situation of needing to be taken out), such that there is no need to specially store the first sewage tank a or the second water tank e. In addition, sewage draining can be carried out by both or either one of the first sewage tank a and the second water tank e, or switchable between both and either one according to the situation.

Figure 20A:
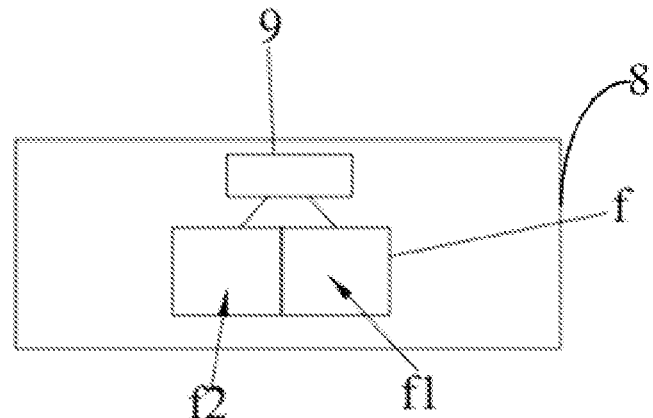
FIGS. 20A-20C respectively show schematic diagrams of different usage states of the first water tank and the second sewage tank being placed at different positions in the base station body according to the embodiments of the present disclosure.
Figure 20B:
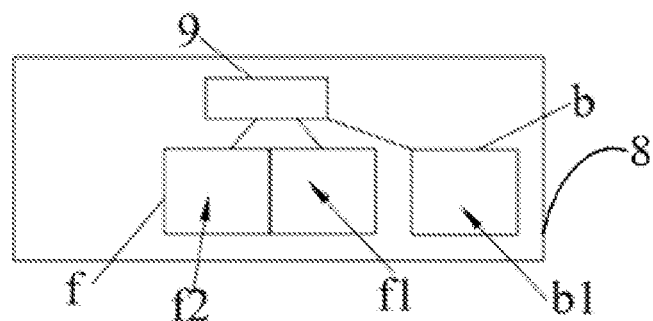
Figure 20C:
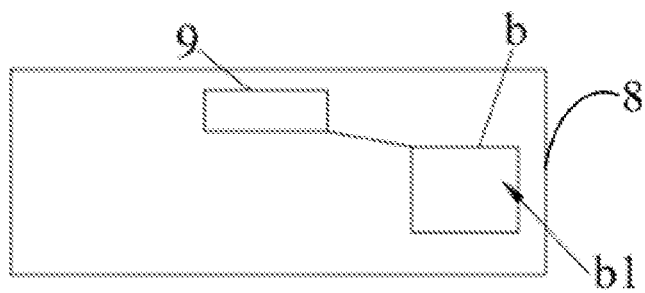

(8) Referring to FIGS. 20A-20C, the manual drainage system includes a first sewage cavity f1 defined in a first water tank f for receiving sewage from the cleaning system 9, and the first water tank f also includes a first clean water cavity f2 for supplying clean water to the cleaning system 9. The first clean water cavity f2 is a part of the manual water feeding system;

the automatic drainage system includes a second sewage cavity b1 defined in the second sewage tank b for receiving sewage from the cleaning system 9, and the second sewage cavity b1 communicates to the outside through a waterway channel;

the first water tank f and the second sewage tank b are placed at different positions in the base station body;

when the second sewage tank b is placed in the base station body, sewage draining may be carried out by both or either one of the manual drainage system and the automatic drainage system, according to actual situation;

in case sewage draining is carried out by the manual drainage system, the second sewage tank b may not be placed in the base station body.

According to various situations, it may be set as follows: the first sewage cavity f1 is kept in communication with the cleaning system 9 once the first water tank f is placed in the base station body, or the first sewage cavity f1 is controlled to or not to be communicated with the cleaning system 9 when the first water tank f is placed in the base station body; and/or, the second sewage tank b is kept in communication with the cleaning system 9 once it is placed in the base station body, or the second sewage tank b is controlled to or not to be communicated with the cleaning system 9 when it is placed in the base station body. The first clean water cavity f2 is kept in communication with the cleaning system 9 once the first water tank f is placed in the base station body or is controlled to or not to be communicated with the cleaning system 9 when the first water tank f is placed in the base station body.

Since the first water tank f and the second sewage tank b are placed at different positions in the base station body, according to different situations, the first water tank f and/or the second sewage tank b may be always placed in the base station body (except the situation of needing to be taken out), there is no need to specially store the second sewage tank b. In addition, it is also possible to arrange sewage draining to be carried out by both or either one of the automatic drainage system and the manual drainage system, or switchable between both and either one.

Figure 21A:
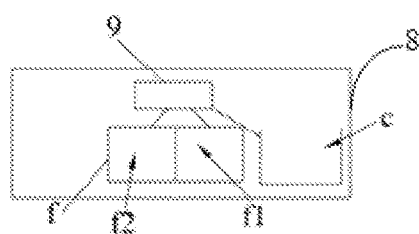
FIGS. 21A and 21B respectively show schematic diagrams of different usage states of the first water tank being placed at a position in the base station body different from the location of the second sewage cavity according to the embodiments of the present disclosure.
Figure 21B:
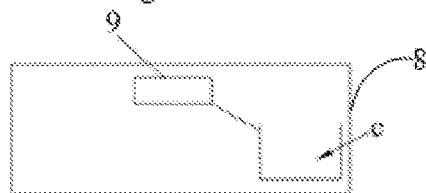

(9) Referring to FIGS. 21A-21B, the manual drainage system includes a first sewage cavity f1 defined in the first water tank f for receiving sewage from the cleaning system 9; the first water tank f also includes a first clean water cavity f2 for supplying clean water to the cleaning system 9, and the first clean water cavity f2 is a part of the manual water feeding system;

the automatic drainage system includes a second sewage cavity c defined in the base station body for receiving sewage from the cleaning system 9, and the second sewage cavity c is communicated to the outside through a waterway channel;

the first water tank f is placed at a position in the base station body different from the position of the second sewage cavity c in the base station body;

when the first water tank f is placed in the base station body, sewage draining may be carried out by both or either one of the manual drainage system and the automatic drainage system according to the situation;

in case sewage draining is carried out by the automatic drainage system, the first water tank f may not be placed in the base station body.

According to various situations, it may be set as follows: the first sewage cavity f1 is kept in communication with the cleaning system 9 once the first water tank f is placed in the base station body, or the first sewage cavity f1 is controlled to or not to be communicated with the cleaning system 9 when the first water tank f is placed in the base station body; and/or, the second sewage cavity c may be kept in communication with the cleaning system 9 all the time, or may be controlled to or not to be communicated with the cleaning system 9. The first clean water cavity f2 is kept in communication with the cleaning system 9 once the first water tank f is placed in the base station body, or is controlled to or not to be communicated with the cleaning system 9 when the first water tank f is placed in the base station body.

Since there are manual drainage system and automatic drainage system in the base station body, sewage draining may be carried out by both or either one of the automatic drainage system and the manual drainage system, or switchable between both and either one. Since the first water tank f and the second sewage cavity c are arranged at different positions in the base station body, the first water tank f may be always placed in the base station body (except the situation of needing to be taken out), and there is no need to specially store the first water tank f.

Figure 22A:
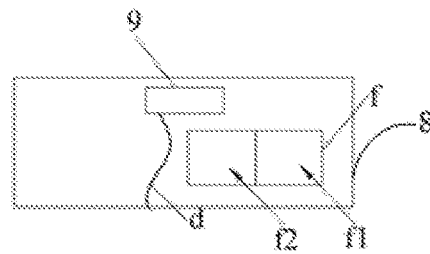
FIGS. 22A and 22B respectively show schematic diagrams of different usage states of the manual drainage system including the first sewage cavity defined in the first water tank and the automatic drainage system directly communicating to the outside and the cleaning system through a waterway channel according to the embodiments of the present disclosure.
Figure 22B:
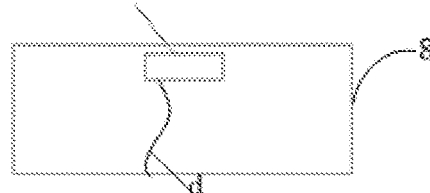

(10) Referring to FIGS. 22A-22B, the manual drainage system includes a first sewage cavity f1 defined in the first water tank f for receiving sewage from the cleaning system 9; the first water tank f also includes a first clean water cavity f2 for supplying clean water to the cleaning system 9, and the first clean water cavity f2 is a part of the manual water feeding system;

the automatic drainage system directly communicates the outside and the cleaning system 9 through a waterway channel d;

the first water tank f may be placed in the base station body, and sewage draining may be carried out by both or either one of the manual drainage system and the automatic drainage system according to the situation;

in case sewage draining is carried out by the automatic drainage system, the first water tank f may not be placed in the base station body.

According to various situations, it may be set as follows: the first sewage cavity f1 is kept in communication with the cleaning system 9 once the first water tank f is placed in the base station body, or the first sewage cavity f1 is controlled to or not to be communicated with the cleaning system 9 when the first water tank f is placed in the base station body; and/or the waterway channel d is controlled to or not to be communicated with the cleaning system 9. The first clean water cavity f2 is kept in communication with the cleaning system 9 once the first water tank f is placed in the base station body, or is controlled to or not to be communicated with the cleaning system 9 when the first water tank f is placed in the base station body.

Since the automatic drainage system directly communicates the outside and the cleaning system 9 through the waterway channel d, it is capable of avoiding extra or excessive occupation of the space of the base station body while achieving compatibility with manual drainage and automatic drainage. In addition, according to different situations, the first water tank f may be always placed in the base station body (except the situation of needing to be taken out), and there is no need to specially store the first water tank f. Also, sewage draining may be carried out by both or either one of the automatic drainage system and the manual drainage system, or switchable between both and either one.

Figure 23A:
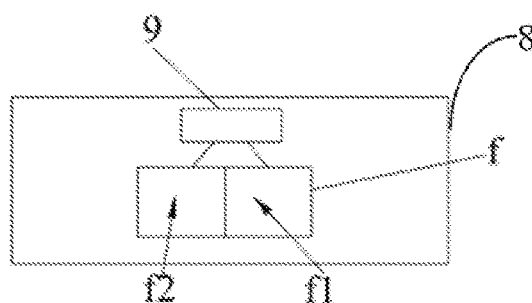
Figure 23:
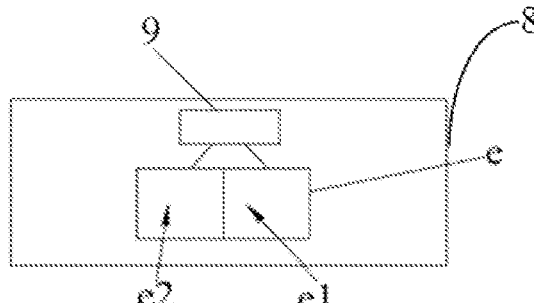

(11) Referring to FIGS. 23A-23B, the manual drainage system includes a first sewage cavity f1 defined in the first water tank f for receiving sewage from the cleaning system 9; the first water tank f also includes a first clean water cavity f2 for supplying clean water to the cleaning system 9, and the first clean water cavity f2 is a part of the manual water feeding system;

the automatic drainage system includes a second sewage cavity e1 defined in the second water tank e for receiving sewage from the cleaning system 9, and the second sewage cavity e1 communicates to the outside through a waterway channel. The second water tank e also includes a second clean water cavity e2 which is a part of the automatic water feeding system, and the second clean water cavity e2 is communicated to the outside through a waterway channel;

either the first water tank f or the second water tank e is placed at a same position in the base station body.

Since one of the first water tank f and the second water tank e is placed at a same position in the base station body, while achieving compatibility with manual water feeding and drainage and automatic water feeding and drainage, additional or excessive occupation of the base station body space may be avoided.

Figure 24A:
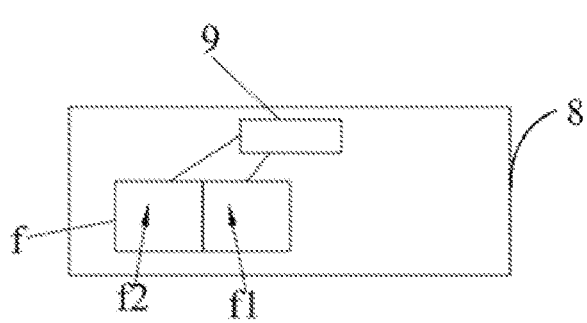
Figure 24B:
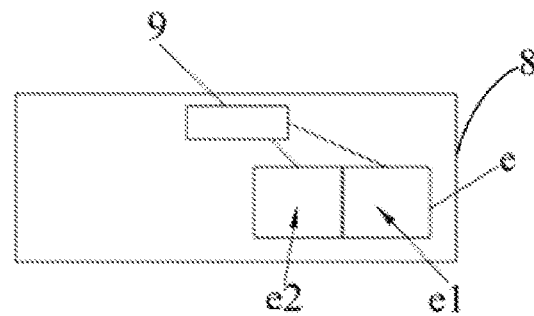
Figure 24C:
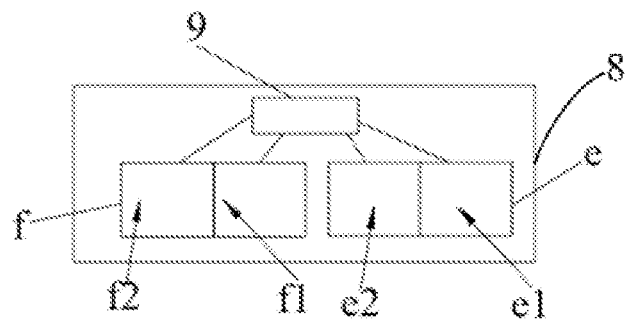

(12) Referring to FIGS. 24A-24C, the manual drainage system includes a first sewage cavity f1 defined in the first water tank f for receiving sewage from the cleaning system 9; the first water tank f also includes a first clean water cavity f2 for supplying clean water to the cleaning system 9. The first clean water cavity f2 is a part of the manual water feeding system;

the automatic drainage system includes a second sewage cavity e1 defined in the second water tank e for receiving sewage from the cleaning system 9, and the second sewage cavity e1 communicates to the outside through a waterway channel. The second water tank e also includes a second clean water cavity e2 which is a part of the automatic water feeding system, and the second clean water cavity e2 is communicated to the outside through a waterway channel;

both or either one of the first water tank f and the second water tank e are placed at different positions in the base station body.

It should be understood that the above-mentioned implementation measures for the compatibility of the manual drainage and automatic drainage in the base station are only illustrative, not exhaustive, and there may be other implementation measures. For example, the automatic drainage system may include more than one subsystem, for example, include both the second sewage cavity for receiving sewage and the waterway channel which is directly communicated to the cleaning system 9 and the outside of the base station. In addition, in case the base station is compatible with manual drainage and automatic drainage, clean water supply to the cleaning system 9 may be carried out by only the manual water feeding system, only the automatic water feeding system (there are many manners), or compatible with both the manual and automatic water feeding systems (both or either one for water feeding).

Figure 25A:
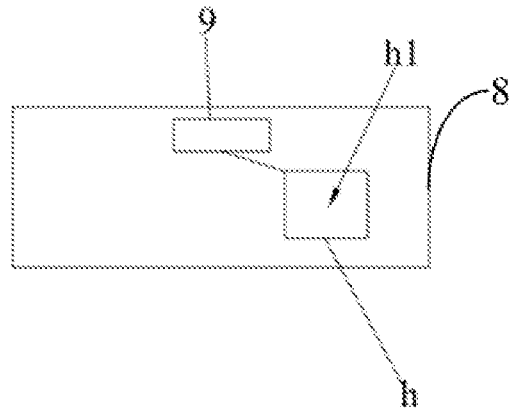
Figure 25B:
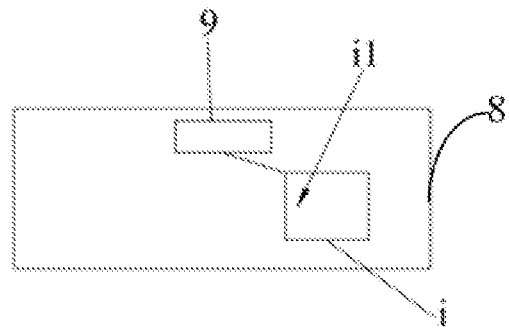

Regardless of whether the sewage drainage is compatible, only in terms of compatibility with manual water feeding and automatic water feeding, there may be at least the following implementations according to various embodiments:

(1) Referring to FIGS. 25A-25B, the manual water feeding system includes a first clean water cavity h1 defined in a first clean water tank h for supplying clean water to the cleaning system 9;

the automatic water feeding system includes a second clean water cavity i1 defined in a second clean water tank i for supplying clean water to the cleaning system 9, and the second clean water cavity i1 is communicated to the outside through a waterway channel;

either the first clean water tank h or the second clean water tank i is placed at a same position in the base station body.

Since one of the first clean water tank h and the second clean water tank i is placed at a same position in the base station body, while achieving compatibility with manual water feeding and automatic water feeding, additional or excessive occupation of the base station body space may be avoided.

Figure 26A:
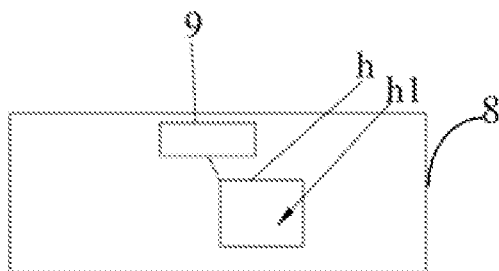
FIGS. 26A-26C respectively show schematic diagrams of different usage states of both or either one of the first clean water tank and the second clean water tank being placed at different positions in the base station body according to the embodiments of the present disclosure.
Figure 26B:
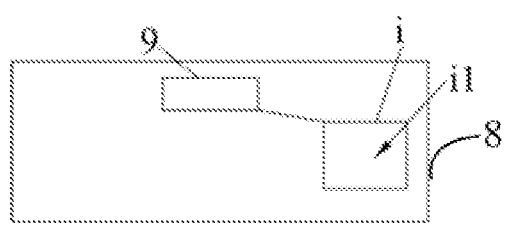
Figure 26C:
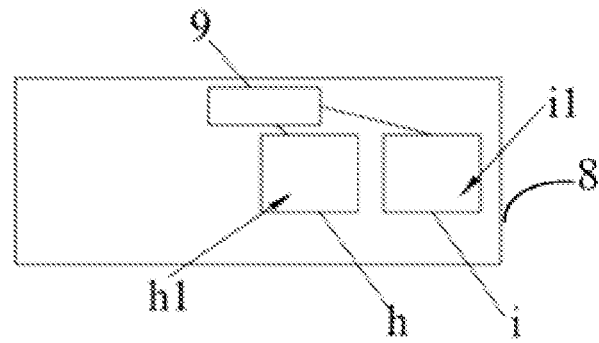

(2) Referring to FIGS. 26A-26C, the manual water feeding system includes a first clean water cavity h1 defined in the first clean water tank h for supplying clean water to the cleaning system 9;

the automatic water feeding system includes a second clean water cavity i1 defined in the second clean water tank i for supplying clean water to the cleaning system 9, and the second clean water cavity i1 is communicated to the outside through a waterway channel;

both or either one of the first clean water tank h and the second clean water tank i are placed at different positions in the base station body; when both of them are placed in the base station body, water feeding may be carried out by both or either one of them according to the situation.

According to various situations, it may be set as follows: the first clean water tank h is kept in communication with the cleaning system 9 once it is placed in the base station body, or is controlled to or not to be communicated with the cleaning system 9 when it is placed in the base station body; and/or, the second clean water tank i is kept in communication with the cleaning system 9 once it is placed in the base station body, or the second clean water tank i is controlled to or not to be communicated with the cleaning system 9 when it is placed in the base station body.

Since the first clean water tank h and the second clean water tank i are placed at different positions in the base station body, the first clean water tank h and the second clean water tank i may be always placed in the base station body (except the situation of needing to be taken out), there is no need to specially store the first clean water tank h or the second clean water tank i. And, according to the situation, water feeding can be carried out by both or either one of the first clean water tank h and the second clean water tank i, or switchable between both and either one.

(3) Referring to FIGS. 27A-27B, the manual water feeding system includes a first clean water cavity h1 defined in the first clean water tank h for supplying clean water to the cleaning system 9;

the automatic water feeding system includes a second clean water cavity j defined in the base station body for supplying clean water to the cleaning system 9, and the second clean water cavity j is communicated to the outside through a waterway channel;

the first clean water tank h is removably placed in the second clean water cavity j, and either the manual water feeding system or the automatic water feeding system feeds water.

Since the first clean water tank h is removably placed in the second clean water cavity j, it may avoid extra or excessive occupation of the base station body space while achieving compatibility with manual water feeding and automatic water feeding.

Figure 28A:
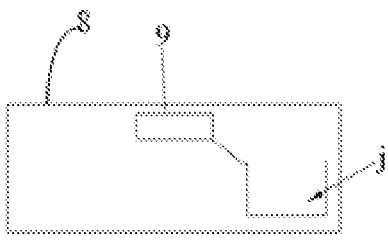
FIGS. 28A and 28B respectively show schematic diagrams of different usage states of the first clean water tank being placed at a position in the base station body different from the location of the second clean water cavity according to the embodiments of the present disclosure.
Figure 28B:
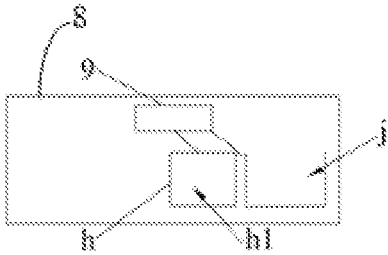

(4) Referring to FIGS. 28A-28B, the manual water feeding system includes a first clean water cavity h1 defined in the first clean water tank h for supplying clean water to the cleaning system 9;

the automatic water feeding system includes a second clean water cavity j defined in the base station body for supplying clean water to the cleaning system 9, and the second clean water cavity j is communicated to the outside through a waterway channel;

the first clean water tank h is placed at a position different from the second clean water cavity j in the base station body;

when the first clean water tank h is placed in the base station body, both or either one of the manual water feeding system and the automatic water feeding system may be arranged to feed water according to the situation;

in case water feeding is carried out by the automatic water feeding system, the first clean water tank h may not be placed in the base station body.

According to various situations, it may be set as follows: the first clean water tank h is kept in communication with the cleaning system 9 once it is placed in the base station body, or is controlled to or not to be communicated with the cleaning system 9 when it is placed in the base station body; and/or the second clean water cavity j may be kept in communication with the cleaning system 9 all the time, or may be controlled to or not to be communicated with the cleaning system 9.

Since the first clean water tank h and the second clean water cavity j are arranged at different positions in the base station body, the first clean water tank h may be always placed in the base station body (except the situation of needing to be taken out), and there is no need to specially store the first clean water tank h. And, water feeding can be carried out by either one of the two, or switchable between both and either one according to the situation.

Figure 29A:
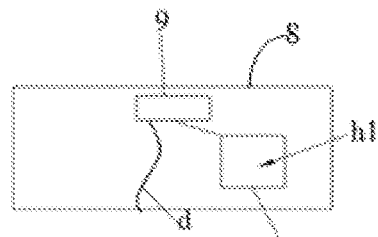
FIGS. 29A and 29B respectively show schematic diagrams of different usage states of the manual water feeding system including the first clean water tank and the automatic water feeding system directly communicating to the outside and the cleaning system through a waterway channel according to the embodiments of the present disclosure.
Figure 29B:
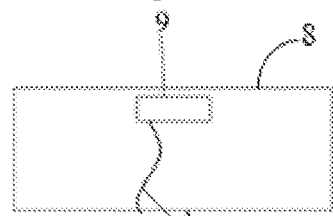

(5) Referring to FIGS. 29A-29B, the manual water feeding system includes a first clean water cavity h1 defined in the first clean water tank h for supplying clean water to the cleaning system 9;

the automatic water feeding system directly communicates the outside and the cleaning system 9 through a waterway channel d, that is, a second clean water cavity is not included;

when the first clean water tank h is placed in the base station body, both or either one of the manual water feeding system and the automatic water feeding system may be arranged to feed water according to the situation;

in case water feeding is carried out by the automatic water feeding system, the first clean water tank h may not be placed in the base station body.

According to various situations, it may be set as follows: the first clean water tank h is kept in communication with the cleaning system 9 once it is placed in the base station body, or the first clean water tank h is controlled to or not to be communicated with the cleaning system 9 when it is placed in the base station body; and/or the waterway channel d is controlled to or not to be communicated with the cleaning system 9.

Since the automatic water feeding system directly communicates the outside and the cleaning system 9 through the waterway channel d, it can avoid extra or excessive occupation of the base station body space while realizing compatibility with manual water feeding and automatic water feeding. In addition, according to different situations, the first clean water tank h may be always placed in the base station body (except the situation of needing to be taken out), so that there is no need to specially store the first clean water tank h. In addition, water feeding can be carried out by both or either one of the automatic water feeding system and the manual water feeding system, or switchable between both and either one according to the situation.

Figure 30A:
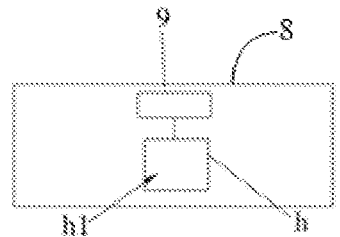
FIGS. 30A and 30B respectively show schematic diagrams of different usage states of either the first clean water tank or the second water tank being placed at a same position in the base station body according to the embodiments of the present disclosure.
Figure 30B:
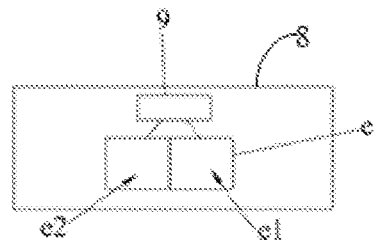

(6) Referring to FIGS. 30A-30B, the manual water feeding system includes a first clean water cavity h1 defined in the first clean water tank h for supplying clean water to the cleaning system 9;

the automatic water feeding system includes a second clean water cavity e2 defined in the second water tank e for providing clean water to the cleaning system 9, and the second clean water cavity e2 is communicated to the outside through a waterway channel. The second water tank e also includes a second sewage cavity e1 which is a part of the automatic drainage system, and the second sewage cavity e1 is communicated to the outside through a waterway channel;

either the first clean water tank h or the second water tank e is placed at a same position in the base station body.

when the second water tank e is placed in the base station body, the automatic water feeding system may perform water feeding, and the automatic drainage system may perform sewage draining; of course, other situations are not excluded, for example, sewage drainage may also be carried out by the manual drainage system.

Since either the first clean water tank h or the second water tank e is placed at a same position in the base station body, while achieving compatibility with manual water feeding and automatic water feeding, extra or excessive occupation of the base station body space may be avoided.

Figure 31A:
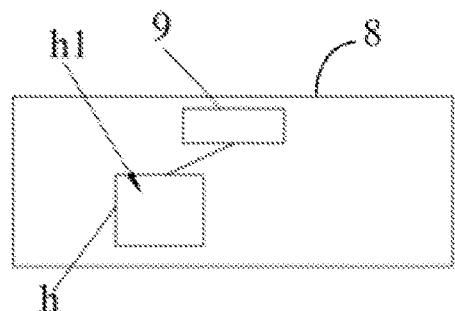
FIGS. 31A-31C respectively show schematic diagrams of different usage states of both or either one of the first clean water tank and the second water tank being placed at different positions in the base station body according to the embodiments of the present disclosure.
Figure 31B:
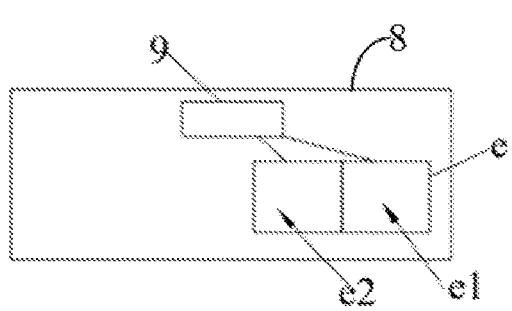
Figure 31C:
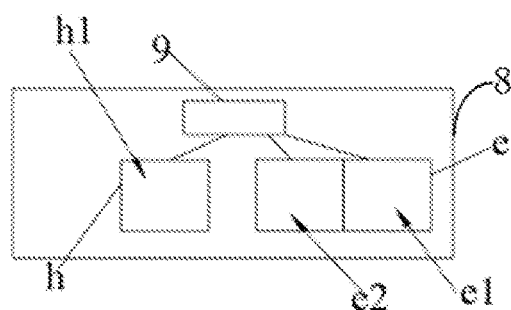

(7) Referring to FIGS. 31A-31C, the manual water feeding system includes a first clean water cavity h1 defined in the first clean water tank h for supplying clean water to the cleaning system 9;

the automatic water feeding system includes a second clean water cavity e2 defined in the second water tank e for supplying clean water to the cleaning system 9, and the second clean water cavity e2 is communicated to the outside through a waterway channel. The second water tank e also includes a second sewage cavity e1 which is a part of the automatic drainage system, and the second sewage cavity e1 is communicated to the outside through a waterway channel;

both or either one of the first clean water tank h and the second water tank e are placed at different positions in the base station body; when both of them are placed in the base station body, both or either one of them may perform water feeding according to the situation.

According to various situations, it may be set as follows: the first clean water tank h is kept in communication with the cleaning system 9 once it is placed in the base station body, or the first clean water tank h is controlled to or not to be communicated with the cleaning system 9 when it is placed in the base station body; and/or, the second clean water cavity e2 is kept in communication with the cleaning system 9 or is controlled to or not to be communicated with the cleaning system 9 when the second water tank e is placed in the base station body. The second sewage cavity e1 is kept in communication with the cleaning system 9 or is controlled to or not to be communicated with the cleaning system 9 when the second water tank e is placed in the base station body.

Since the first clean water tank h and the second water tank e are placed at different positions in the base station body, the first clean water tank h and the second water tank e may be always placed in the base station body (except the situation of needing to be taken out), and there is no need to specially store the first clean water tank h or the second water tank e. And, water feeding can be carried out by both or either one of them, or switchable between both and either one according to the situation.

Figure 32A:
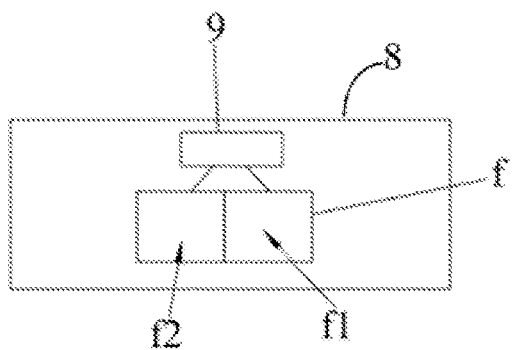
FIGS. 32A-32C respectively show schematic diagrams of different usage states of the first water tank and the second clean water tank being placed at different positions in the base station body according to the embodiments of the present disclosure.
Figure 32B:
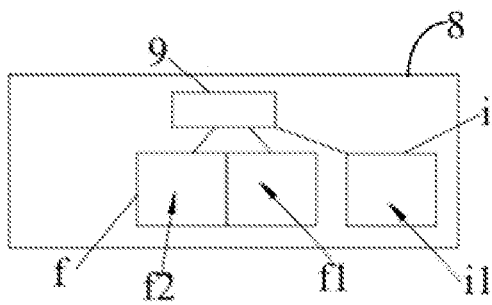
Figure 32C:
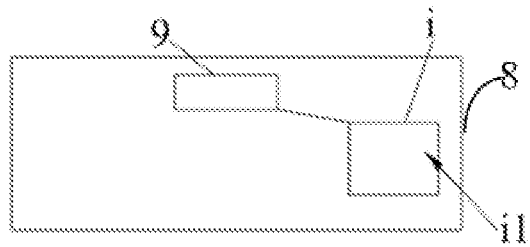

(8) Referring to FIGS. 32A-32C, the manual water feeding system includes a first clean water cavity f2 defined in the first water tank f for supplying clean water to the cleaning system 9, and the first water tank f also includes a first sewage cavity f1 for receiving sewage from the cleaning system 9, and the first sewage cavity f1 is a part of the manual drainage system;

the automatic water feeding system includes a second clean water cavity i1 defined in the second clean water tank i for supplying clean water to the cleaning system 9, and the second clean water cavity i1 is communicated to the outside through a waterway channel;

the first water tank f and the second clean water tank i are placed at different positions in the base station body;

the second clean water tank i is placed in the base station body, both or either one of the manual water feeding system and the automatic water feeding system may work according to the situation;

in case water feeding is carried out by the manual water feeding system, the second clean water tank i may not be placed in the base station body.

According to various situations, it may be set as follows: the first clean water cavity f2 is kept in communication with the cleaning system 9 once the first water tank f is placed in the base station body, or the first clean water cavity f2 is controlled to or not to be communicated with the cleaning system 9 when the first water tank f is placed in the base station body; and/or, the second clean water tank i is kept in communication with the cleaning system 9 once it is placed in the base station body, or the second clean water tank i is controlled to or not to be communicated with the cleaning system 9 when it is placed in the base station body. The first sewage cavity f1 is kept in communication with the cleaning system 9 or is controlled to or not to be communicated with the cleaning system 9 when the first water tank f is placed in the base station body.

Since the first water tank f and the second clean water tank i are placed at different positions in the base station body, according to different situations, the second clean water tank i and/or the first water tank f may be always placed in the base station body (except the situation of needing to be taken out), there is no need to specially store the second clean water tank i or the first water tank f in the case it is not placed in the base station body. In addition, water feeding can be carried out by both or either one of the automatic water feeding system and the manual water feeding system, or switchable between both and either one.

Figure 33A:
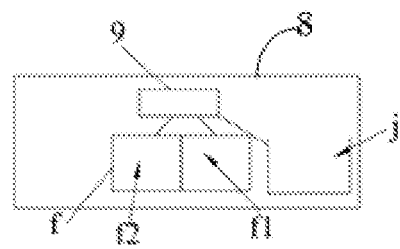
FIGS. 33A and 33B respectively show schematic diagrams of different usage states of the first water tank being placed at a position in the base station body different from the location of the second clean water cavity according to the embodiments of the present disclosure.
Figure 33B:
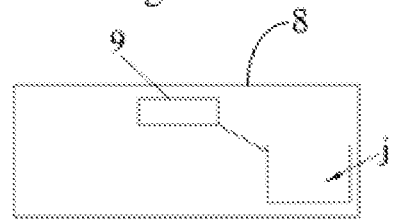

(9) Referring to FIGS. 33A-33B, the manual water feeding system includes a first clean water cavity f2 defined in the first water tank f for supplying clean water to the cleaning system 9, and the first water tank f also includes a first sewage cavity f1 for receiving the sewage from the cleaning system 9. The first sewage cavity f1 is a part of the manual drainage system;

the automatic water feeding system includes a second clean water cavity j defined in the base station body for supplying clean water to the cleaning system 9, and the second clean water cavity j is communicated to the outside through a waterway channel;

the first water tank f is placed at a position in the base station body that is different from that of the second clean water cavity j;

when the first water tank f is placed in the base station body, both or either one of the manual water feeding system and the automatic water feeding system may be arranged to feed water according to the situation;

in case water feeding is carried out by the automatic water feeding system, the first water tank f may not be placed in the base station body.

According to various situations, it may be set as follows: the first clean water cavity f2 is kept in communication with the cleaning system 9 once the first water tank f is placed in the base station body, or the first clean water cavity f2 is controlled to or not to be communicated with the cleaning system 9 when the first water tank f is placed in the base station body; and/or, the second clean water cavity j may be kept in communication with the cleaning system 9 all the time, or may be controlled to or not to be communicated with the cleaning system 9. The first sewage cavity f1 is kept in communication with the cleaning system 9 or is controlled to or not to be communicated with the cleaning system 9 when the first water tank f is placed in the base station body.

Since there are both the manual water feeding system and the automatic water feeding system in the base station body, according to the situation, water feeding can be carried out by both or either one of the automatic water feeding system and the manual water feeding system, or switchable between both and either one. Since the first water tank f and the second clean water cavity j are located at different positions in the base station body, the first water tank f may be configured to be always placed in the base station body (except the situation of needing to be taken out), such that there is no need to specially store the first water tank f.

Figure 34A:
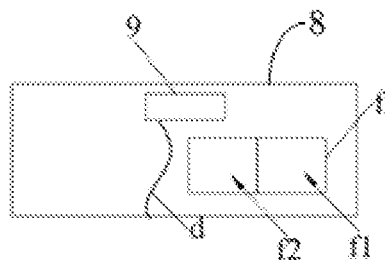
FIGS. 34A and 34B respectively show schematic diagrams of different usage states of the manual water feeding system including a first clean water cavity defined in the first water tank and the automatic water feeding system directly communicating to the outside and the cleaning system through a waterway channel according to the embodiments of the present disclosure.
Figure 34B:
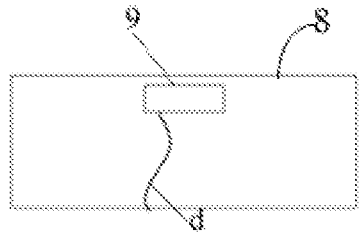

(10) Referring to FIGS. 34A-34B, the manual water feeding system includes a first clean water cavity f2 defined in the first water tank f for supplying clean water to the cleaning system 9, and the first water tank f also includes a first sewage cavity f1 for receiving the sewage from the cleaning system 9. The first sewage cavity f1 is a part of the manual drainage system;

the automatic water feeding system directly communicates the outside and the cleaning system 9 through a waterway channel d;

when the first water tank f is placed in the base station body, both or either one of the manual water feeding system and the automatic water feeding system may be arranged to feed water according to the situation;

in case water feeding is carried out by the automatic water feeding system, the first water tank f may not be placed in the base station body.

According to various situations, it may be set as follows: the first clean water cavity f2 is kept in communication with the cleaning system 9 once the first water tank f is placed in the base station body, or the first clean water cavity f2 is controlled to or not to be communicated with the cleaning system 9 when the first water tank f is placed in the base station body; and/or, the waterway channel d is controlled to or not to be communicated with the cleaning system 9. The first sewage cavity f1 is kept in communication with the cleaning system 9 or is controlled to or not to be communicated with the cleaning system 9 when the first water tank f is placed in the base station body.

Since the automatic water feeding system directly communicates the outside and the cleaning system 9 through the waterway channel d, it may avoid extra or excessive occupation of the base station body space while realizing compatibility with manual water feeding and automatic water feeding. In addition, according to different situations, the first water tank f may be always placed in the base station body (except the situation of needing to be taken out), such that there is no need to specially store the first water tank f. In addition, water feeding can be carried out by both or either one of the automatic water feeding system and the manual water feeding system, or switchable between both and either one according to the situation.

Figure 35A:
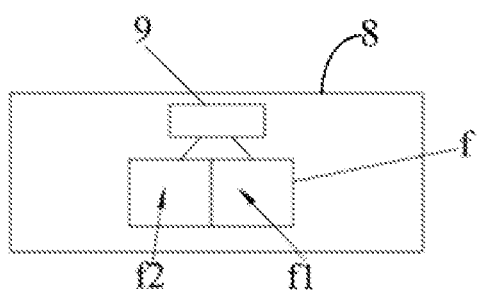
FIGS. 35A and 35B respectively show schematic diagrams of different usage states of either the first water tank or the second water tank being placed at a same position in the base station body according to the embodiments of the present disclosure.
Figure 35B:
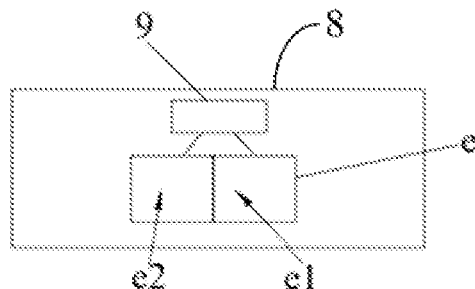

(11) Referring to FIGS. 35A-35B, the manual water feeding system includes a first clean water cavity f2 defined in the first water tank f for supplying clean water to the cleaning system 9, and the first water tank f also includes a first sewage cavity f1 for receiving the sewage from the cleaning system 9. The first sewage cavity f1 is a part of the manual drainage system;

the automatic water feeding system includes a second clean water cavity e2 defined in the second water tank e for supplying clean water to the cleaning system 9, and the second clean water cavity e2 is communicated to the outside through a waterway channel. The second water tank e also includes a second sewage cavity e1 which is a part of the automatic drainage system, and the second sewage cavity e1 is communicated to the outside through a waterway channel;

either the first water tank f or the second water tank e is placed at a same position in the base station body.

Since one of the first water tank f and the second water tank e is placed at a same position in the base station body, while achieving compatibility with manual water feeding and drainage and automatic water feeding and drainage, extra or excessive occupation of the base station body space may be avoided.

Figure 36A:
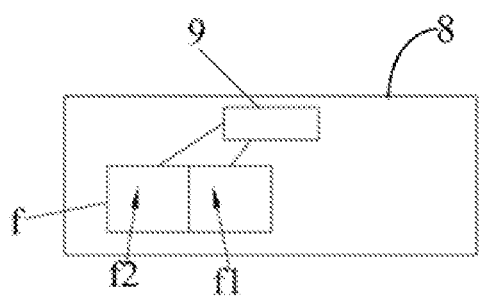
Figure 36B:
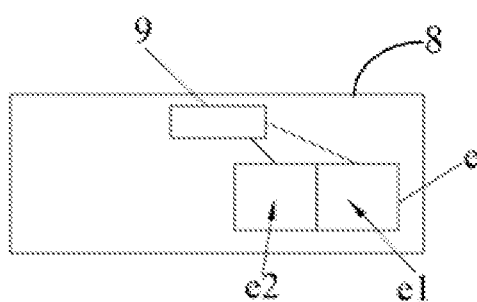
Figure 36C:
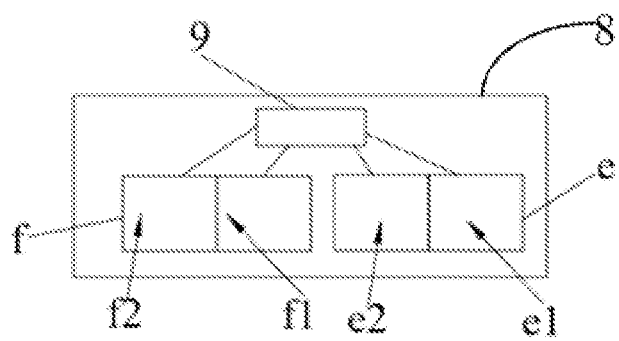

(12) Referring to FIGS. 36A-36C, the manual water feeding system includes a first clean water cavity f2 defined in the first water tank f for supplying clean water to the cleaning system 9, the first water tank f also includes a first sewage cavity f1 for receiving the sewage delivered from the cleaning system 9, and the first sewage cavity f1 is a part of the manual drainage system;

the automatic water feeding system includes a second clean water cavity e2 defined in the second water tank e for supplying clean water to the cleaning system 9, the second clean water cavity e2 is communicated to the outside through a waterway channel, the second water tank e also includes a second sewage cavity e1 which is a part of the automatic drainage system, and the second sewage cavity e1 is communicated to the outside through the waterway channel;

both or either one of the first water tank f and the second water tank e are placed at different positions in the base station body.

It should be understood that the above-mentioned implementation measures for realizing compatibility with manual water feeding and automatic water feeding are only illustrative, not exhaustive, and there may be other implementation measures. For example, the automatic water feeding system may include more than one subsystem, for example, it not only includes the second clean water cavity for supplying clean water, but also includes the waterway channel directly communicating to the cleaning system 9 and the outside. In addition, in case the base station is compatible with manual water feeding and automatic water feeding, sewage draining of the cleaning system 9 may be carried out only by the manual sewage draining system, only by the automatic sewage draining system (there are many manners), or compatible with the manual sewage draining system and the automatic sewage draining system (both or either one for sewage draining).

In the case the first water tank 1 is provided with both the first clean water cavity 11a for storing clean water and the first sewage cavity 11b for storing sewage, or the first water tank 1 includes the first clean water tank 1a and the first sewage tank 1b that are independent of each other, and the second waterway system includes the automatic water feeding system and the automatic drainage system, the base station may include the following usage states:

the first clean water cavity 11a supplies clean water to the cleaning system 9 and the first sewage cavity 11b receives the sewage generated by the cleaning system 9;

the first clean water cavity 11a supplies clean water to the cleaning system 9, and the automatic drainage system receives the sewage generated by the cleaning system 9;

the automatic water feeding system supplies clean water to the cleaning system 9, and the first sewage cavity 11b receives the sewage generated by the cleaning system 9; and the automatic water feeding system supplies clean water to the cleaning system 9, and the automatic drainage system receives the sewage generated by the cleaning system 9.

Based on the above technical solutions, the base station of the present disclosure can be used in multiple usage states, which may meet the requirements of different users, and meet different requirements of a user in different use environments.

Figure 11:
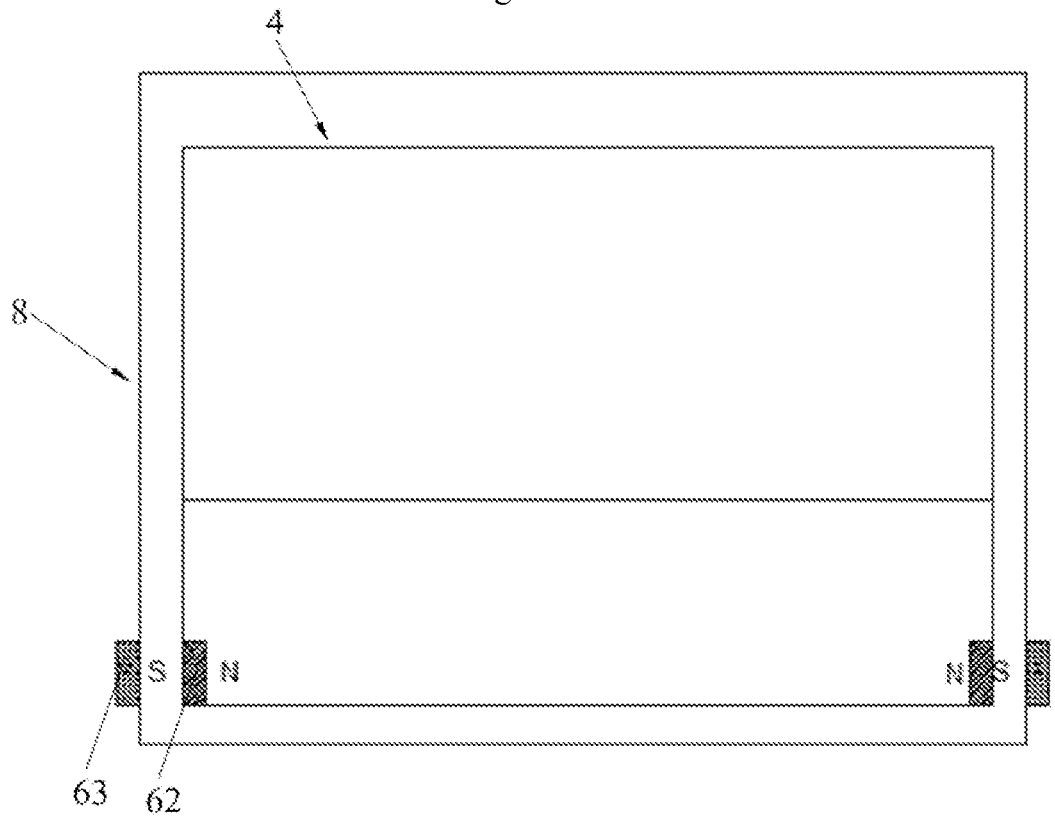
FIG. 11 shows a schematic diagram of detecting the second water tank by using a second magnetic member and the Hall sensor according to an embodiment of the present disclosure.

Referring to FIGS. 10 and 11, in some embodiments, the first water tank 1 is provided with a first magnetic member 61, the second water tank 4 is provided with a second magnetic member 62, and the base station body 8 is provided with a Hall sensor 63; either the first water tank 1 or the second water tank 4 is installed at a same position in the base station body 8. In case the first water tank 1 is installed in the base station body 8, a first magnetic pole of the first magnetic member 61 faces towards the Hall sensor 63, and the Hall sensor 63 generates a first electrical signal based on the magnetic field the Hall sensor 63 sensed; in case the second water tank 4 is installed in the base station body 8, a second magnetic pole of the second magnetic member 62 faces towards the Hall sensor 63, and the Hall sensor 63 generates a second electrical signal different from the first electrical signal based on the magnetic field the Hall sensor 63 sensed; the second magnetic pole is opposite in polarity to the first magnetic pole. As the first magnetic pole of the first magnetic member 61 and the second magnetic pole of the second magnetic member 62 both face the Hall sensor 63 and have opposite polarities when the first water tank 1 and the second water tank 4 are respectively installed in the base station body 8, the Hall sensor 63 can generate significantly different first and second electrical signals according to the different magnetic fields the Hall sensor 63 sensed, which is conducive to quickly and accurately identify whether the first water tank 1 or the second water tank 4 is installed without equipping each of the two water tanks with a Hall sensor 63, which is beneficial to reduce cost.

Of course, in case either the first water tank 1 or the second water tank 2 is installed at a same position in the base station body 8, identifying the type of the water tank is not limited to the above mentioned specific technical means.

In addition, with regards the first waterway system and the second waterway system of the present disclosure, a first marker may be provided to the first waterway system and a second marker may be provided to the second waterway system, and an identification sensor may be provided on the base station body, the identification sensor can identify the first marker or the second marker to determine whether the first waterway system or the second waterway system is connected to the cleaning system. The forms of the first marker, the second marker, and the identification sensor is not limited in this disclosure, for example, the first marker and the second marker may be identification codes, the identification sensor may be a code reader; or the first marker and the second marker is a magnetic member, and the identification sensor is a Hall sensor, and so on.

In some embodiments, the base station body 8 is provided with a sensor; the first water tank 1 is provided with a first signal member, and the second water tank 4 is provided with a second signal member; the first signal member is different from the second signal member, or the first signal member sends signals different from the signals sent by the second signal member; in case the first water tank 1 is installed in the water tank accommodating space 82, the first signal member or the signal sent by the first signal member will be detected by the sensor and the sensor generates a first detection signal; in case the second water tank 4 is installed in the water tank accommodating space 82, the second signal member or the signal sent by the second signal member will be detected by the sensor and the sensor generates a second detection signal; the first detection signal is different from the second detection signal. By means of the above-mentioned technical means, the present disclosure can accurately identify whether the first water tank 1 or the second water tank 2 is installed in the water tank accommodating space 82, so as to carry out corresponding configurations.

Referring to FIGS. 1A to 7B and FIGS. 37 to 44, the present disclosure discloses a base station for cleaning members of a cleaning robot (not shown) when the cleaning robot drives into the base station, wherein the cleaning members include but not limited to: mopping members, rolling brushes. Wherein, the mopping member may be rotatably or movably arranged on the main body of the cleaning robot, or may be fixed on the main body of the cleaning robot. The base station may include a base station body 8 and a cleaning system 9. The base station is provided with a clean water input channel 30a and a sewage output channel 30b, the clean water input channel 30a is configured to receive clean water delivered by an external waterway from the outside of the base station and supply it to the cleaning system 9, and the sewage output channel 30b is configured to discharge the sewage generated by the cleaning system 9 out of the base station.

The base station of the present disclosure when being used, the clean water input channel 30a may input clean water from the external waterway from the outside of the base station to the cleaning system 9, and the sewage generated by the cleaning system 9 may be discharged to the outside of the base station through the sewage output channel 30b, thereby realizing automatic water feeding and automatic sewage draining. As such, it does not require users to manually replenish clean water and pour out sewage, which is convenient for users to use the base station.

Referring to FIGS. 7A-7B and FIGS. 41 to 44, regarding whether arranging a second clean water cavity 41a and/or a second sewage cavity 41b on the base station, and how to arrange them, there may be various ways, as long as the clean water transported by the clean water input channel 30a can finally be fed to the cleaning system 9, and the sewage generated by the cleaning system 9 can finally be discharged to the outside of the base station through the sewage output channel 30b, which is not limited herein. For example, any one of the following first to third situations can be combined with any one of the following fourth to sixth situations:

First, the clean water input channel 30a transports clean water to the cleaning system 9, a second clean water cavity 41a is not included.

Second, the base station is arranged with the second clean water cavity 41a, the second clean water cavity 41a is communicated with the cleaning system 9 for supplying clean water to the cleaning system 9, and the second clean water cavity 41a is communicated with the clean water input channel 30a to receive clean water transported by the clean water input channel 30a from outside of the base station. The second clean water cavity 41a may be defined in the base station body of the base station, or in a special water tank, and the second clean water cavity 41a can supply water to the cleaning system 9 of the base station body once the water tank is installed in the base station body, in this case, the clean water input channel 30a can be arranged on the water tank only, or arranged on both the water tank and the base station body.

Third, the first and second situations are integrated on the base station, that is, the clean water input channel includes a first clean water branch and a second clean water branch, the first clean water branch is communicated to the clean water cavity, and the second clean water branch is communicated to the cleaning system. In this way, when clean water needs to be supplied to the cleaning system, according to the situation, for example, both or either one of the branches may supply clean water to the cleaning system; or, the second clean water branch supplies clean water to the cleaning system, and the first clean water branch supplements clean water to the clean water cavity which is not configured to supply clean water to the cleaning system at that time, etc.

Fourth, the sewage generated by the cleaning system 9 is sent to the sewage output channel 30b for discharge without passing through the second sewage cavity 41b.

Fifth, the base station is provided with a second sewage cavity 41b, the second sewage cavity 41b is communicated with the cleaning system 9 to receive the sewage generated by the cleaning system 9, and the second sewage cavity 41b is communicated with the sewage output channel 30b for allowing the sewage to pass through the sewage output channel 30b to be discharged out of the base station; wherein, the second sewage cavity 41b may be defined in the base station body, or in a special water tank. The second sewage cavity 41b receives the sewage generated by the cleaning system 9 once the water tank is installed in the base station body, in this case, the sewage output channel 30b may be only arranged on the water tank, or arranged on both the water tank and the base station body.

Sixth, the fourth and fifth situations are integrated on the base station, that is, the sewage output channel includes a first sewage branch and a second sewage branch, the first sewage branch is communicated to the sewage cavity, and the second sewage branch is communicated to the cleaning system. In this way, when the sewage is need to be discharged out of the cleaning system, according to the situation, for example, both or either one of the branches may discharge the sewage; or, the second sewage water branch receives sewage, and the first sewage branch discharges the sewage in the sewage cavity which is not configured to receive sewage at that time, etc.

It should be noted that, in some embodiments, the second clean water cavity 41a may be defined by a plurality of walls of the base station body, and similarly, the second sewage cavity 41b may be defined by a plurality of walls of the base station body.

It should be noted that in case both the second clean water cavity 41a and the second sewage cavity 41b are defined in the water tank, they may be defined in the same water tank, or may be defined in separate water tanks, which is not limited herein.

According to various embodiments, no matter the clean water input channel 30a is defined only on the base station body (the second clean water cavity 41a is defined in the base station body or the second clean water cavity 41a is not included), or only defined in the water tank, or defined in both the water tank and the base station body, or in other cases, there may be various methods, as long as clean water from external waterway outside of the base station can be input to the second clean water cavity 41a or directly input to the cleaning system 9. That is to say, according to different embodiments, the clean water input channel 30a may be defined only on the base station body, only on the water tank, or on both the water tank and the base station body, or in other manners. The clean water may be input into the second clean water cavity 41a first and then into the cleaning system 9, or directly into the cleaning system 9, as long as the clean water from external waterway outside the base station can be transported to the cleaning system 9.

In addition, the clean water input channel 30a may only include a through hole or an interface defined on the water tank or the base station body, the through hole or the interface communicates the external waterway with the second clean water cavity 41a (e.g., an end of the external waterway may pass through the through hole or the interface to directly penetrate the second clean water cavity 41a, in this way, fluid will not flow directly through the through hole or the interface; of course, the end of the external waterway can also be coupled with the through hole or the interface through other ways); or the clean water input channel 30a may include structures such as pipes arranged on the water tank and/or the base station body; or, the clean water input channel 30a may include structures such as check valves or joints arranged in the through holes, the interfaces, or the pipes, and the clean water input channel 30a communicates with external pipeline through the check valves or joints.

According to various embodiments, the sewage output channel 30b may be defined only on the base station body (the second sewage cavity 41b is defined in the base station body or the second sewage cavity 41b is not included), or defined only on the water tank, or defined on both the water tank and the base station body, there may be various manners, as long as the sewage generated by the cleaning system 9 can be discharged to the outside of the base station, no matter the sewage comes from the cleaning system 9 directly, or comes from the second sewage cavity 41b. That is to say: the sewage output channel 30b may be defined only on the base station body, or only on the water tank, or defined on both the water tank and the base station body, or in other manners. No matter sewage received is directly outputted from the cleaning system 9 or the second sewage cavity 41b, as long as the sewage generated by the cleaning system 9 can be discharged to the outside of the base station.

For details, reference may be made to the above-mentioned descriptions about the clean water input channel 30a. Of course, based on the different functions of the sewage output channel 30b and the clean water input channel 30a, targeted arrangements may be set accordingly.

Further, a first pump (namely, the second power device 36) may be provided to the clean water input channel 30a for realizing water inputting; similarly, a second pump 34 may be provided to the sewage output channel 30b to provide power for the sewage discharge, especially for the situation of sewage being discharged to the sewage output channel 30b through the second sewage cavity 41b. Specifically, as shown in FIGS. 40, and 45A-46B, the sewage output channel 30b is provided with a valve body 705 located on the downstream side of the second pump 34, and the valve body 705 has a first state and a second state. When the valve body 705 is in the first state, the second sewage cavity 41b is ventilated and communicated with the outside, and the valve body 705 restricts outflow of the sewage; when the second pump 34 is turned on, the valve body 705 is opened to the second state under water pressure, and sewage is discharged from the valve body 705.

It should be noted that the valve body 705 being located on the downstream side of the second pump 34 means that along the direction of the sewage flowing through the sewage output channel 30b, the sewage first passes through the second pump 34 and then passes through the valve body 705.

When the air pressure at the downstream side of the valve body 705 is greater than the air pressure at the upstream side of the valve body 75, the valve body 705 may change from the first state to a third state, the valve body 75 is closed in the third state (i.e., neither gas passes through nor fluid flows through).

It should be noted that the upstream side of the valve body refers to the side where the sewage flows through first in the direction of the sewage flowing through, and the downstream side of the valve body refers to the side where the sewage flows through later in the direction of the sewage flowing through.

The above-mentioned the first pump and/or the second pump may be connected with a controller (not shown) arranged on the base station body for controlling the pumps operating. In case the first pump and/or the second pump is power driven, the first pump and/or the second pump may also be connected to a power supply module (not shown) in the base station body, so that the power supply module can be used to provide power required for the operation to the pump.

Referring to FIGS. 1A-7B, and 44, the base station disclosed in the present disclosure includes a base station body, and an automatic water feeding and drainage tank (i.e., the second water tank 4 described above). The base station body is provided with a cleaning system 9, and the water tank is installed in the base station body. The water tank is defined with a second clean water cavity 41a, a second sewage cavity 41b, a clean water input channel 30a, a clean water output channel (i.e., the second clean water channel described above), a sewage input channel (i.e., the second sewage channel described above), and a sewage output channel 30b. The second clean water cavity 41a receives clean water transported by an external waterway from the outside of the base station through the clean water input channel 30a, and the second clean water cavity 41a is communicated with the cleaning system 9 in the base station body through the clean water output channel to supply clean water to the cleaning system 9; the second sewage cavity 41b is communicated with the cleaning system 9 in the base station body through the sewage input channel to receive the sewage generated by the cleaning system 9, and discharge the sewage to the outside of the base station through the sewage output channel 30b.

The base station of the present disclosure when being used, the clean water input channel 30a may deliver clean water from external waterway outside the base station to the second clean water cavity 41a, and the sewage in the second sewage cavity 41b may be discharged out of the base station through the sewage output channel 30b, thereby realizing automatic water feeding and automatic sewage draining, such that users do not need to manually replenish clean water and pour out sewage, which is convenient for users to use the base station. Moreover, the present disclosure still utilizes the second clean water cavity 41a and the second sewage cavity 41b for temporary storing water while achieving the automatic water feeding and sewage drainage, which effectively guarantees the reliability of water supplying to the base station of the present disclosure, and is also conducive to improve the convenience for using the base station.

With regards the clean water output channel and the sewage input channel, there are also various implementation measures, as long as they can be communicated with the cleaning system 9. In the embodiments as shown in FIGS. 1A-1H, 2, and 7A-7B, the clean water output channel includes a clean water interface 42a provided on the water tank, and the cleaning system 9 includes a clean water interface 81a provided on the base station body, when the water tank is installed on the base station body, the clean water interfaces 42a and 81a are coupled to realize a communication between the clean water output channel and the cleaning system 9. The sewage input channel includes a sewage interface 42b arranged on the water tank, and the cleaning system 9 includes a sewage interface 81b arranged on the base station body, when the water tank is installed on the base station body, the sewage interfaces 42b and 81b are coupled to realize a communication between the sewage input channel with the cleaning system 9. It should be understood that there are different ways for the clean water interfaces 42a and 81a to be coupled, and different ways for the sewage interfaces 42b and 81b to be coupled. Illustratively, the clean water interface 81a on the base station body is penetrated into the second clean water cavity 41a through the clean water interface 42a on the water tank, the sewage interface 81b on the base station body is penetrated into the second sewage cavity 41b through the sewage interface 42b on the water tank. By such a way, clean water will not directly flow through the clean water interface 42a which acts as a clean water output channel on the water tank, and the sewage will not directly flow through the sewage interface 42b which acts as a sewage input channel on the water tank. In addition, the clean water output channel and the sewage input channel may also include structures such as pipes arranged on the water tank, and so on, which is not limited herein.

In addition, in order to make the sewage enter the second sewage cavity 41b from the cleaning system 9 smoothly, the water tank may be provided with an gas hole 49 communicating with the second sewage cavity 41b and the outside (as shown in FIGS. 7A and 7B).

Figure 40:
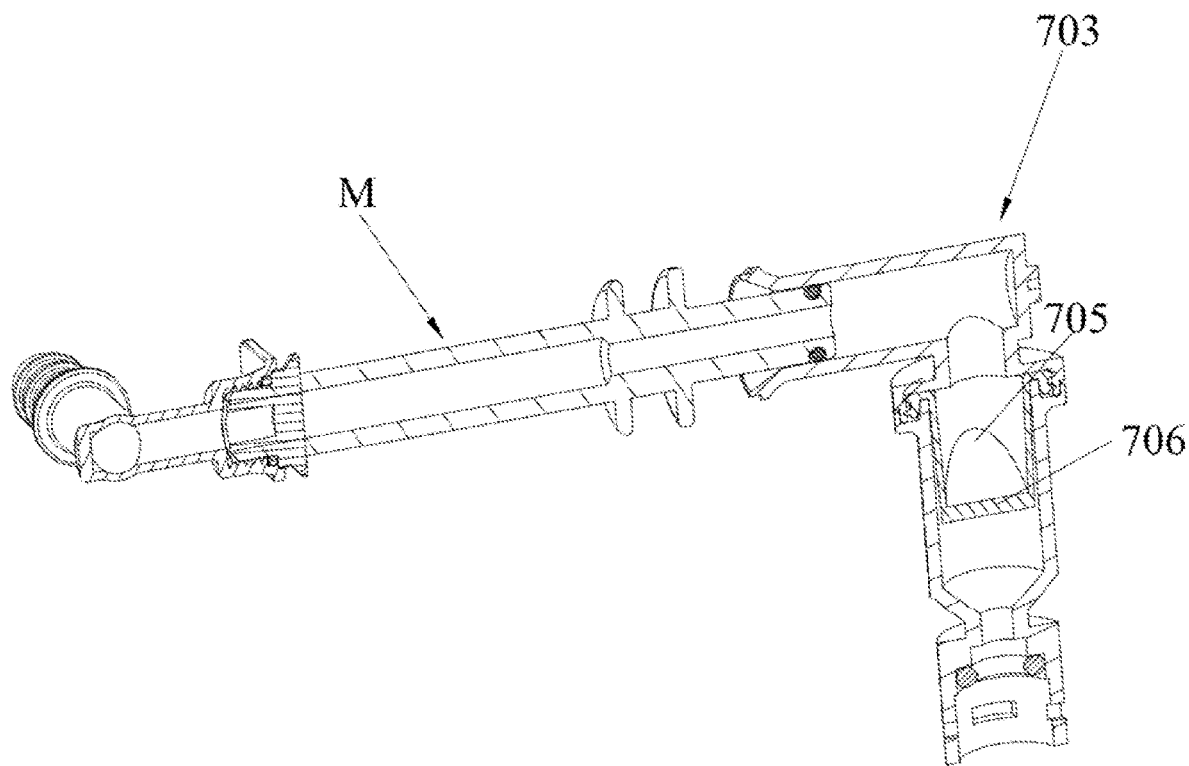
FIG. 40 shows a perspective view of a sewage adapting pipe, a sewage connecting pipe, and a valve body according to an embodiment of the present disclosure.
Figure 41:
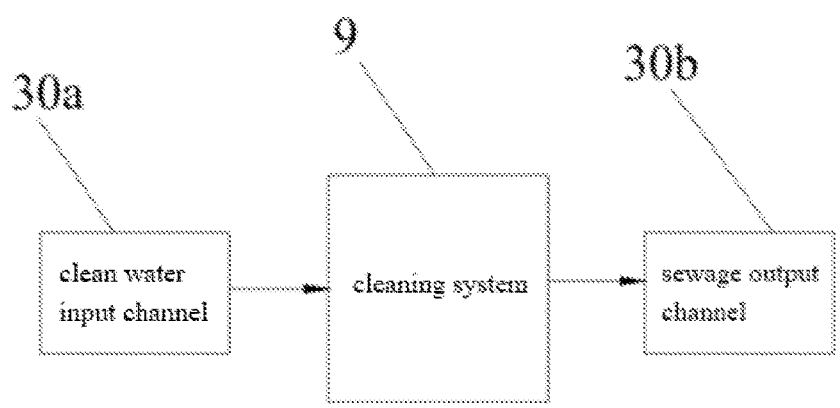
FIGS. 41 to 44 show schematic block diagrams showing a waterway connection relationship between a clean water system with a clean water input channel and a sewage output channel according to an embodiment of the present disclosure.
Figure 42:
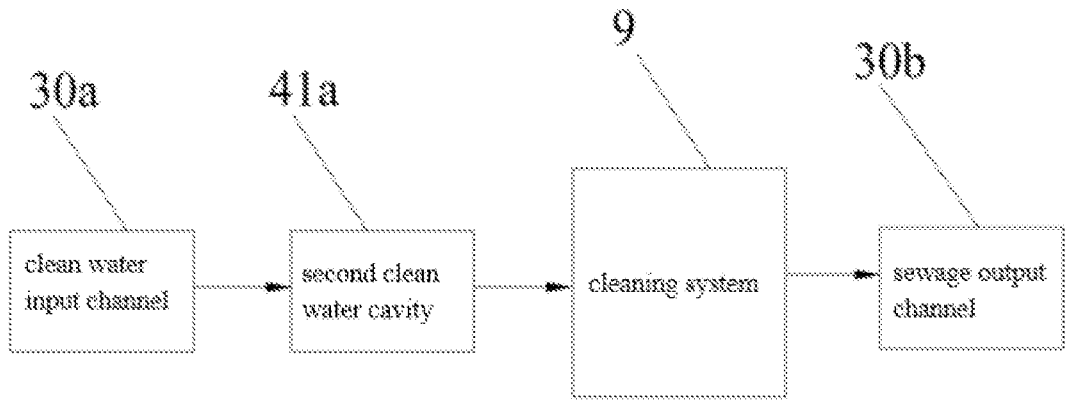
Figure 43:
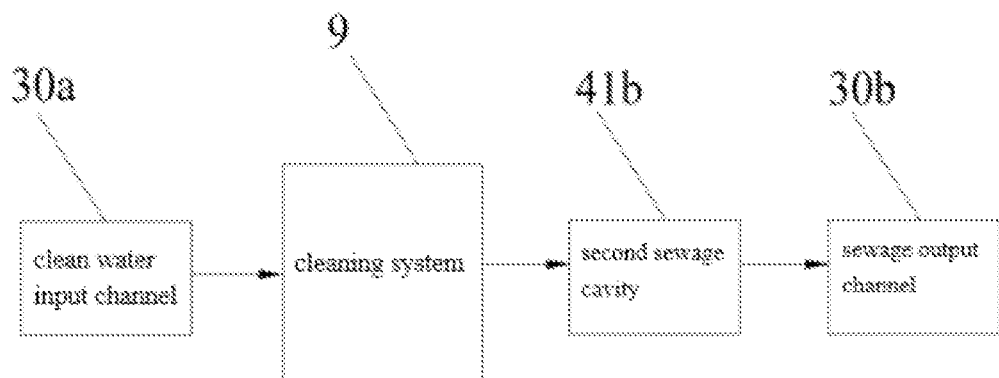
Figure 44:
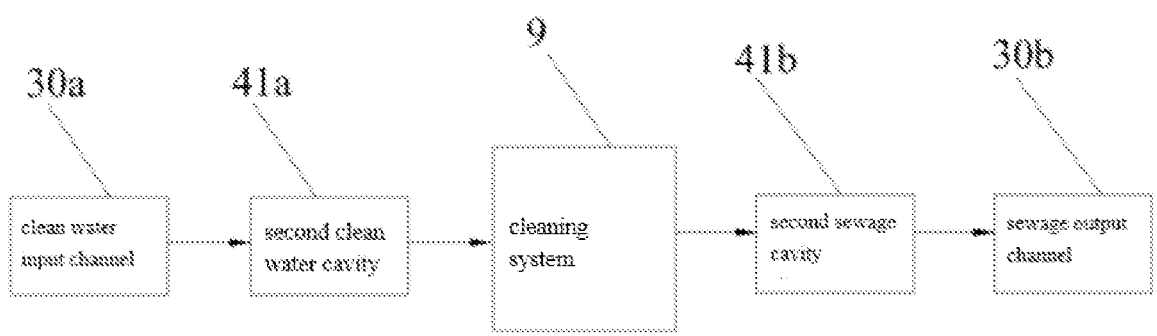

In some embodiments, a negative pressure pump (not shown) may be provided at the gas hole 49 to evacuate the second sewage cavity 41b. In the case the second sewage cavity 41b is in a negative pressure state, the sewage from the cleaning system 9 may flow into the second sewage cavity 41b. In order to cooperate with the negative pressure pump to perform the evacuating, the valve body 705 (as shown in FIG. 40) is provided to the sewage output channel 30b. In a first state, the valve body 705 is slightly opened (for example, slightly splayed) to communicate to the outside and restrict the sewage flowing out. When the negative pressure pump performs evacuating, the valve body 705 will be closed under the action of the negative pressure pump, such that the second sewage cavity 41b is capable of being evacuated to a negative pressure state. When the pressure from the sewage reaches a certain level, the valve body 705 will be opened (e.g., splayed) to discharge the sewage. It should be noted that, during the second sewage cavity 41b is evacuated, in case there is sewage in the channel between the valve body 705 and the second sewage cavity 41b, the valve body 705 may not be closed and remain communicating to the outside to restrict the sewage flowing out. Alternatively, the valve body 705 may not have a closed state. Specifically, when the sewage output channel 30b is provided with the second pump 34, the valve body 705 is preferably arranged downstream of the second pump 34.

It should be noted that "slightly opened" means that the valve body 705 has a small gap or a small hole. Due to the existence of the small gap or the small hole, the valve body 705 is capable of allowing gas to pass through at normal conditions, but cannot allow fluid to flow out. The maximum slit width of the small gap or the maximum aperture of the small hole may be 0.2 millimeter (mm)-0.8 mm, and in the embodiment of the present disclosure, the maximum slit width or the maximum aperture may be 0.5 mm. Of course, in other embodiments, those skilled in the art may design according to actual needs, as long as the above effects can be achieved.

Preferably, the valve body 705 has a slightly opened and retractable channel 706 in normal state. When being evacuated, the channel 706 can correspondingly contract and then close due to its own retractable characteristics, thereby enables the second sewage cavity 41b to be evacuated to a vacuum or negative pressure state, and, due to the retractable characteristics of the channel 706, when the sewage pressure increases to a certain extent, the channel 706 is opened (larger than normal state) to discharge the sewage. The valve body 705 is not limited to a duckbill valve, as long as it has a retractable channel.

If the valve body 705 is closed (not slightly opened) in normal state, in the case the second pump 34 is not turned on, the pipe section between the second pump 34 and the valve body 705 defines an gas section that no sewage flows into due to the negative pressure. After the second pump 34 is turned on, it needs a long time for the pipe section between the second pump 34 and the valve body 705 to reach a certain water pressure to open the valve body 705 to discharge sewage, such that it will result in a delay for discharging sewage. In this embodiment, the valve body 705 may communicates the second sewage cavity 41b and the outside (for example, the valve body 705 is in a slightly open state in normal state), once there is sewage in the second sewage cavity 41b, the sewage will flow to the valve body 705 but not flow out due to the water tension, such that the sewage can flow out directly from the valve body 705 after the second pump 34 is turned on.

It should be understood that in the first state (normal state), the valve body 705 is not limited to be in a slightly open state, as long as it can communicate to the outside and restrict outflow of the sewage. In addition, the valve body 705 is not limited to be cooperatively used with the negative pressure pump.

Of course, in the case the second sewage cavity 41b is formed in a special sewage tank or the base station body, structures such as gas holes, valve bodies, and pumps can also be used for carrying out evacuating operations.

Referring to FIGS. 1A-1H, 2, 7A and 7B, in an exemplary embodiment, the base station body includes a base station bracket 80, the clean water interface 81a and the sewage interface 81b of the cleaning system 9 are arranged on the base station bracket 80, and the base station bracket 80 is further provided with an interface 84 through which the gas hole 49 communicates to the outside.

Referring to FIG. 7A, the water tank of the present disclosure further includes a first control valve 50 which is configured to close or open the clean water input channel 30a according to a water level in the second clean water cavity 41a. As such, the water tank may automatically supply water to the second clean water cavity 41a according to the water level in the second clean water cavity 41a, and in case the water level is too high, water supply channel will be automatically cut off to prevent the water level in the second clean water cavity 41a being too high, or prevent water from overflowing.

In some embodiments, the first control valve 50 may be a floating ball valve which is configured to close or open the clean water input channel 30a according to a water level in the second clean water cavity 41a. In the case the water level in the second clean water cavity 41a is low, water may enter the clean water input channel 30a normally, and the floating ball valve will not interfere with the clean water input channel 30a. As the water level rises, the floating ball valve moves due to the buoyancy of the water, and when the water level in the second clean water cavity 41a reaches a certain height, the floating ball valve blocks the clean water input channel 30a. At this time, the clean water in the clean water input channel 30a can no longer enter the second clean water cavity 41a, so as to prevent the water level being too high. In some embodiments, a valve body structure 35 is fixed at the outlet end of the clean water input channel 30a, the floating ball valve includes a floating ball 51 and a valve core structure 52, a connecting member 53 is connected between the floating ball 51 and the valve core structure 52, and a point of the connecting member 53 between the floating ball 51 and the valve core structure 52 is hinged to the valve body structure 35 or hinged to other structures. When the water level rises or falls, the float ball 51 floats up or down, causing the entire floating ball valve 50 to rotate up and down around the hinged point, and when the water level reaches a certain height, the rising of the float ball 51 causes the valve core structure 52 downwards to block the passage of the valve body structure 35, so as to close the clean water input channel 30a.

In other embodiments, the floating ball valve may be replaced by other devices. Illustratively, other liquid level detecting devices (not shown in the Figure) are provided in the second clean water cavity 41a, the first control valve is electrically connected to the liquid level detecting device, and the first control valve is configured for closing or opening the clean water input channel according to the water level detected by the liquid level detecting device in the clean water cavity. In particular, the liquid level detecting device may include, but is not limited to, at least one of the following: a photoelectric liquid level detecting device, a capacitive liquid level detecting device, a static pressure liquid level detecting device, and the like.

In some embodiments, the clean water input channel 30a may be provided with a first pump (first), and the first pump is configured to provide a power for the second clean water cavity 41a to receive clean water from external waterway. The arrangement of the first pump facilitates the smooth input of clean water to the second clean water cavity 41a through the clean water input channel 30a of the water tank. The sewage output channel 30b may be provided with a second pump 34, and the second pump 34 is configured to provide a power for sewage being discharged from the second sewage cavity 41b. The arrangement of the second pump 34 is beneficial to smooth sewage discharge from the second sewage cavity 41b to the outside of the base station through the sewage output channel 30b of the water tank.

In an exemplary embodiment, the sewage output channel 30b is provided with the second pump 34, while the clean water input channel 30a is not provided with a pump.

Referring to FIG. 4 and FIGS. 38 to 40, in some embodiments, the water tank includes a water tank body 4 (i.e., the second water tank 4) and an adapter 70 detachably connected to the water tank body 4, the water tank receives clean water delivered from the outside of the base station and discharges sewage to the outside of the base station through the adapter 70. The second clean water cavity 41a, the second sewage cavity 41b, the clean water output channel, and the sewage input channel are arranged on the water tank body 4, and the clean water input channel 30a and the sewage output channel 30b are defined in the water tank body 4 and the adapter 70 (that is, the clean water input channel 30a includes a third clean water channel 3a defined in the water tank body 4 and a channel defined in the adapter 70, the sewage output channel 30b includes a third sewage channel 3b defined in the water tank body 4 and a channel defined in the adapter 70. In the case the water tank only includes the water tank body 4, the clean water input channel 30a is the third clean water channel 3a and the sewage output channel 30b is the third sewage channel 3b). By the arrangement of the adapter 70, it is convenient for the clean water input channel 30a to be connected to the external waterway and for the sewage output channel 30b to discharge sewage to the outside of the base station. It should be noted that the connection of the water tank to the external water source through the adapter 70 is only an optional manner, and the water tank may also not include the adapter 70. In addition, it is not excluded that the base station body is provided with an extension section of the clean water input channel 30a and an extension section of the sewage output channel 30b. When the water tank is installed on the base station body, the clean water input channel 30a and the sewage output channel 30b of the water tank are connected to corresponding extension sections to receive clean water from outside the base station and discharge sewage to the outside of the base station.

In particular, the adapter 70 includes a main body 701, a clean water adapting pipe 702 which serves as a part of the clean water input channel 30a, and a sewage adapting pipe 703 which serves as a part of the sewage output channel 30b. The clean water adapting pipe 702 is connected to the part of the clean water input channel 30a located in the water tank body 4 through a clean water connecting pipe L, and the sewage adapting pipe 703 is connected to the part of the sewage output channel 30b located in the water tank body 4 through a sewage connecting pipe M. A check valve 704 is provided at one end of the clean water adapting pipe 702 connected with the clean water connecting pipe L, the check valve 704 is configured to be in a closed state at normal conditions, and is pushed to convert to an open state when the clean water connecting pipe L is inserted into the clean water adapting pipe 702. By the arrangement of the clean water connecting pipe L and the sewage connecting pipe M, it is convenient to install the water tank body 4 on the base station body. After the water tank body 4 is installed, the clean water connecting pipe L and the sewage connecting pipe M are arranged to connect the adapter 70; in addition, by means of the check valve 704 provided in the clean water adapting pipe 702 of the adapter 70, clean water in the clean water adapting pipe 702 can be prevented from flowing out when the adapter 70 is separated from the clean water connecting pipe L.

In this embodiment, the valve body 705 is provided in the sewage adapting pipe 703, so that it is unnecessary to set it on the water tank body 4, which is beneficial to the structural layout of the water tank body.

Referring to FIGS. 5, and 7A-7B, in some embodiments, the water tank includes a first tank body 45 and a second tank body 46 which can be separated from each other; the second clean water cavity 41a, the second sewage cavity 41b, the clean water output channel, and the sewage input channel are arranged in the first tank body 45. The clean water input channel 30a includes a first interface 31a arranged on the first tank body 45, a clean water input pipeline 33a and a second interface 32a which are arranged in the second tank body 46. The first interface 31a is communicated with the second clean water cavity 41a, and the second interface 32a is arranged at the outlet end of the clean water input pipeline 33a. The sewage output channel 30b includes a third interface 31b arranged in the first tank body 45, a sewage output pipeline 33b and a fourth interface 32b arranged in the second tank body 46. The third interface 31b is communicated with the second sewage cavity 41b, and the fourth interface 32b is arranged at the inlet end of the sewage output pipeline 33b. When the first tank body 45 is docked with the second tank body 46, the first interface 31a is coupled with the second interface 32a, and the third interface 31b is coupled with the fourth interface 32b. By virtue of the separable design of the first tank body 45 and the second tank body 46, it is convenient to arrange the main structures such as the composition pipes of the clean water input channel 30a and the sewage output channel 30b on the second tank body 46, as well as convenient to take out the first tank body 45 which defines the second clean water cavity 41a and the second sewage cavity 41b for cleaning, while the second tank body 46 does not need to be taken out to maintain the connection with relevant waterway structures, avoiding re-establishing a connection with the relevant waterway structures every time the water tank is taken out, which is conducive to providing users a better use experience. Of course, the above-mentioned split-type water tank is only an optional manner, and the water tank is not limited to the above-mentioned split-type design.

Figure 37:
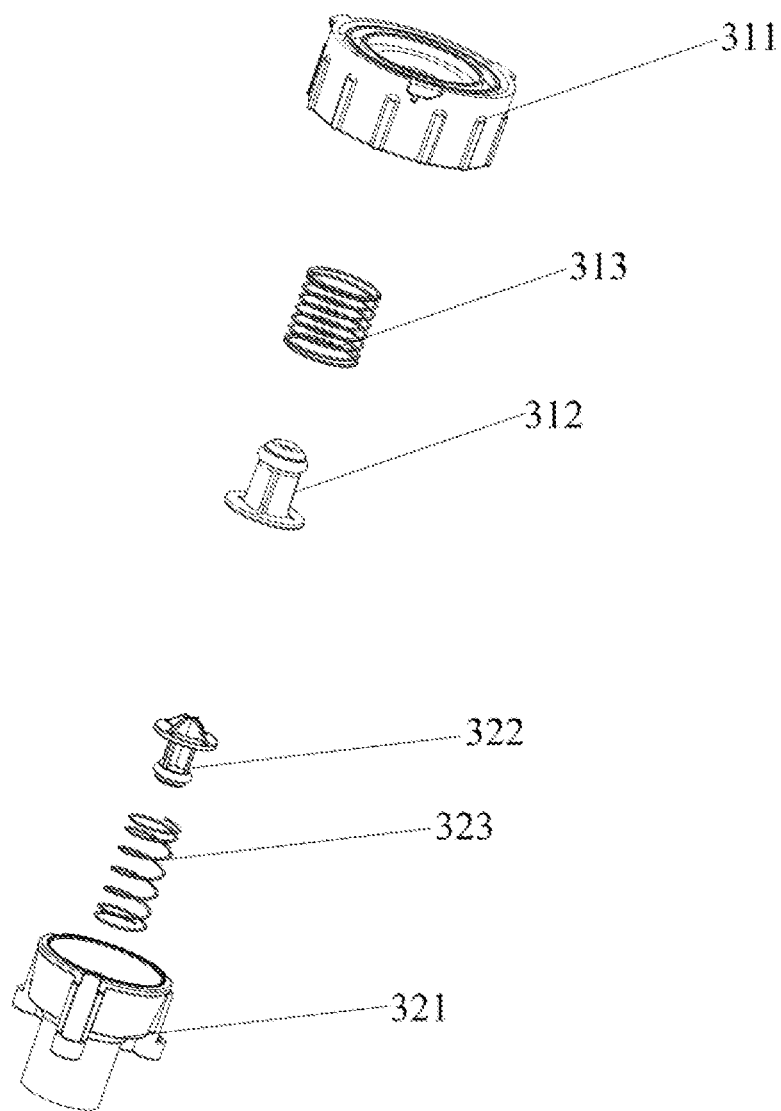
FIG. 37 shows an exploded view of a first check valve structure and a second check valve structure according to an embodiment of the present disclosure.
Figure 38:
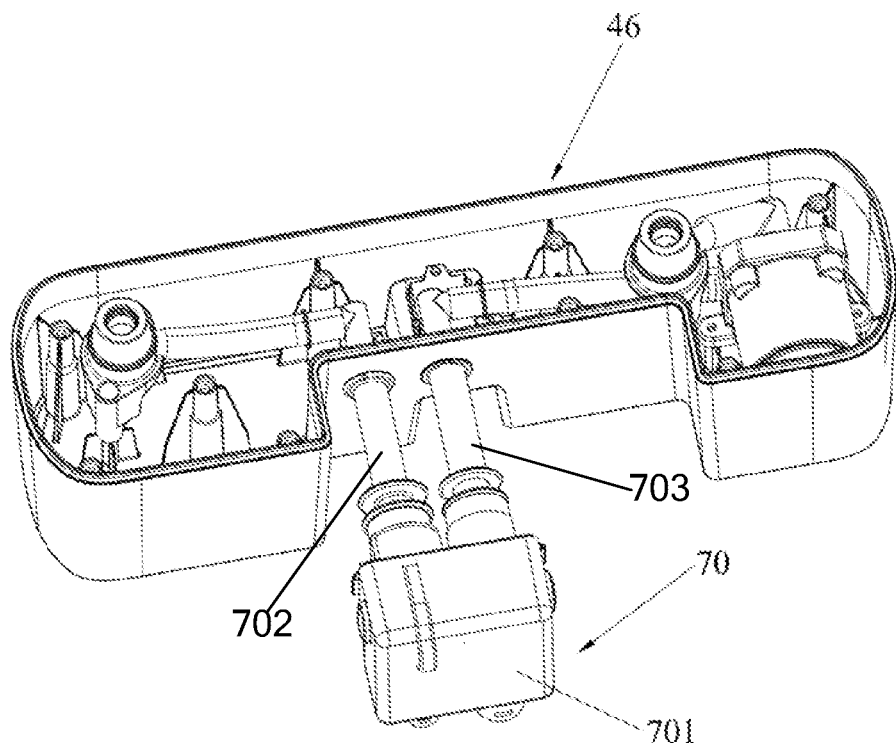
FIG. 38 shows a perspective view of a second tank body and the adapter according to an embodiment of the present disclosure.
Figure 39:
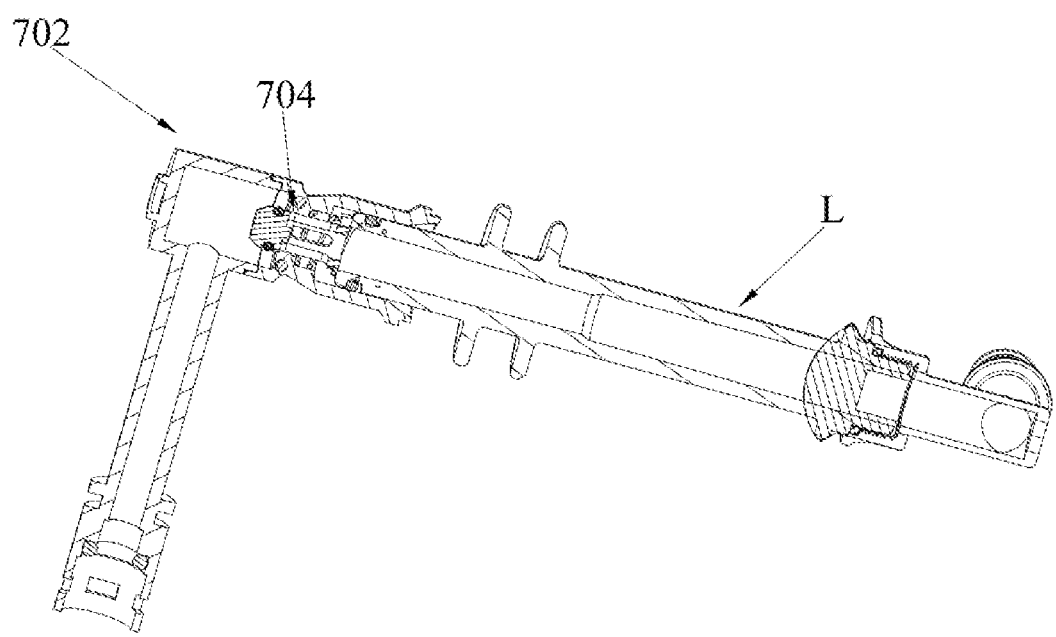
FIG. 39 shows a perspective view of a clean water adapting pipe, a clean water connecting pipe, and a check valve according to an embodiment of the present disclosure.

Referring to FIGS. 6, 7A, and 37, in particular, the first interface 31a may include a first check valve structure 310a, the second interface 32a may include a second check valve structure 320a, the first check valve structure 310a and the second check valve structure 320a are configured to: when the first tank body 45 is docked to the second tank body 46, the first check valve structure 310a and the second check valve structure 320a are coupled and pushed with each other to an open state, and when the first tank body 45 is separated from the second tank body 46, the first check valve structure 310a and the second check valve structure 320a are automatically reset to a closed state. The third interface 31b may include a third check valve structure 430, when the first tank body 45 is docked to the second tank body 46, the third check valve structure 310b and the fourth interface 32b are coupled and the third check valve structure 310b is pushed to an open state, when the first tank body 45 is separated from the second tank body 46, the third check valve structure 310b automatically resets to a closed state. By virtue of the two-way check valve arranged between the first interface 31a and the second interface 32a, it can basically avoid outflow of the clean water when the first tank body 45 and the second tank body 46 are separated; by virtue of the third check valve structure 310b, it can basically prevent outflow of sewage when the first tank body 45 and the second tank body 46 are separated.

Further, the fourth interface 32b may include a fourth check valve structure 320b, and the third check valve structure 430 and the fourth check valve structure 320b are configured to: when the first tank body 45 is docked to the second tank body 46, the third check valve structure 430 and the fourth check valve structure 320b are coupled and pushed with each other to an open state, and when the first tank body 45 and the second tank body 46 are separated, the third check valve structure 430 and the fourth check valve structure 320b automatically reset to a closed state.

In an exemplary embodiment, the first check valve structure 310a includes a valve body 311, a valve core 312, and an elastic member 313. The valve core 312 is movably passed through the valve body 311, and the elastic member 313 is disposed between the valve body 311 and the valve core 312. The second check valve structure 320 includes a valve body 321, a valve core 322, and an elastic member 323; the valve core 322 is movably passed through the valve body 321, and the elastic member 323 is disposed between the valve body 321 and the valve core 322. When there is no external force, the valve core 312 blocks the passage in the valve body 311, and the valve core 322 blocks the passage in the valve body 321; when the first tank body 45 is docked to the second tank body 46, the valve core 312 and the valve core 322 pushes with each other to open the passages in the two valve bodies 311 and 321, thereby realizing a communication between the clean water input channel 30a and the second clean water cavity 41a; at the same time, the two elastic members 313 and 323 are compressed by the movement of the valve cores 312 and 322 to store elastic potential energy; when the first tank body 45 and the second tank body 46 are separated, the elastic members 313 and 323 cause the two valve cores 312 and 322 to automatically reset to close the passages in the valve bodies 311 and 321, which facilitates the clean water to flow out.

With regards the specific designs of the third check valve structure 430 and the fourth check valve structure 320b, reference may be made to the above description of the first check valve structure 310a and the second check valve structure 320a, which will not be repeated here.

It should be understood that, the first interface 31a and the second interface 32a are not limited to the above mentioned specific situations.

In an exemplary embodiment, the first tank body 45 is placed on top of the second tank body 46, but it is not limited thereto, for example, the first tank body 45 can also be placed beside the second tank body 46.

A first pump may be provided on the clean water input pipeline 33a to provide power for the clean water delivery. A second pump 34 may be provided on the sewage output pipeline 33b to provide power for the sewage discharge.

In an exemplary embodiment, the sewage output pipeline 33b is provided with an impeller pump serving as the second pump 34, and the clean water input pipeline 33a is not provided with a pump to provide power for the clean water delivery.

Referring to FIGS. 1A-1H, 2, and 4, in some embodiments, the base station includes the base station bracket 80, and the base station bracket 80a is defined with the water tank accommodating space 82 for receiving a water tank.

Figure 45A:
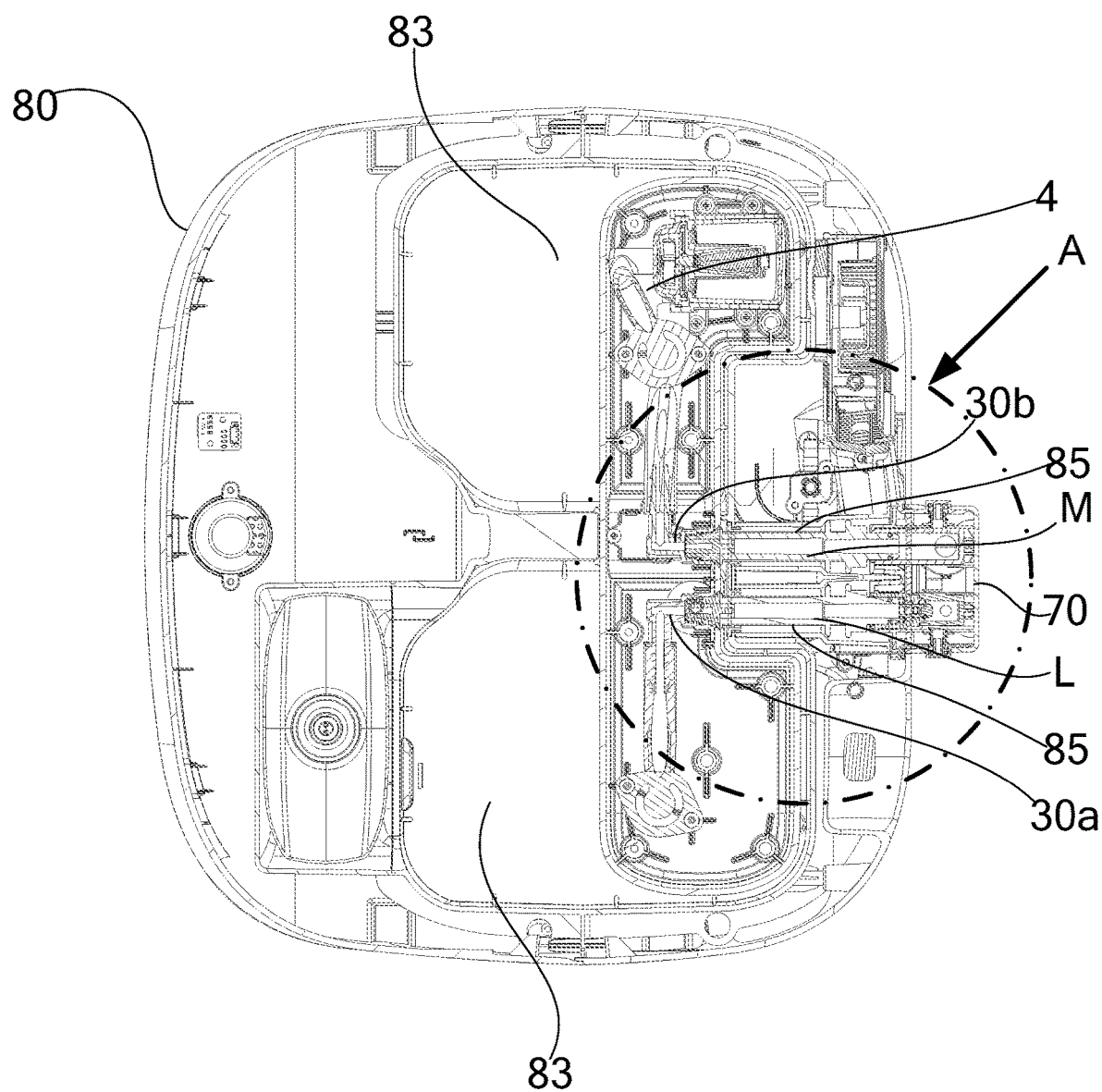
FIG. 45A shows a cross-sectional view of the base station according to an embodiment of the present disclosure.
Figure 45B:
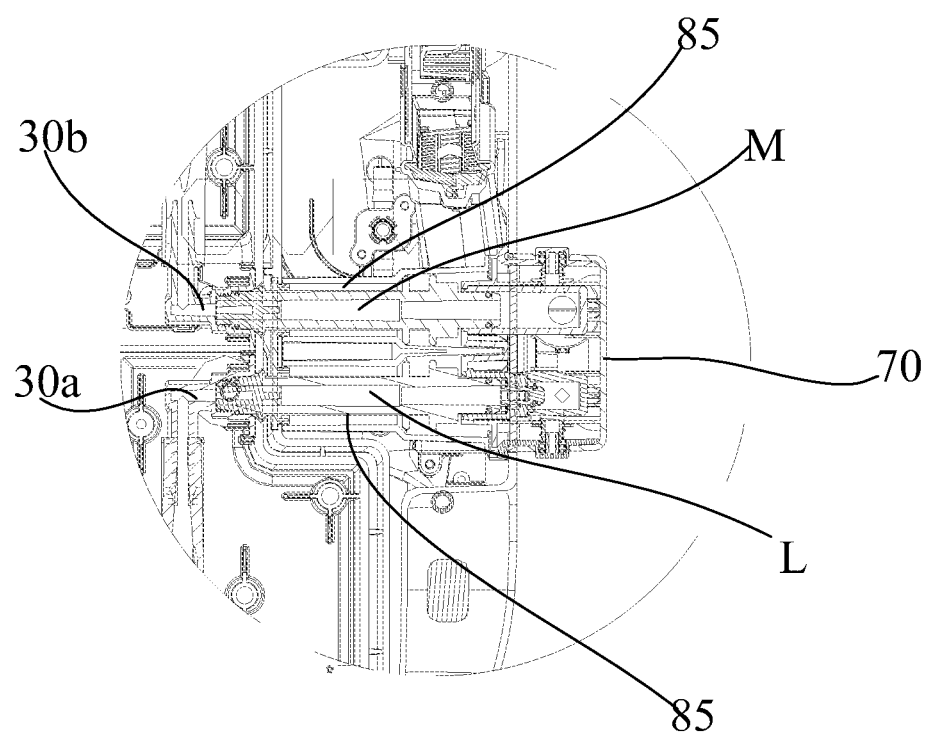
FIG. 45B shows an enlarged view of portion A in FIG. 45A.
Figure 46A:
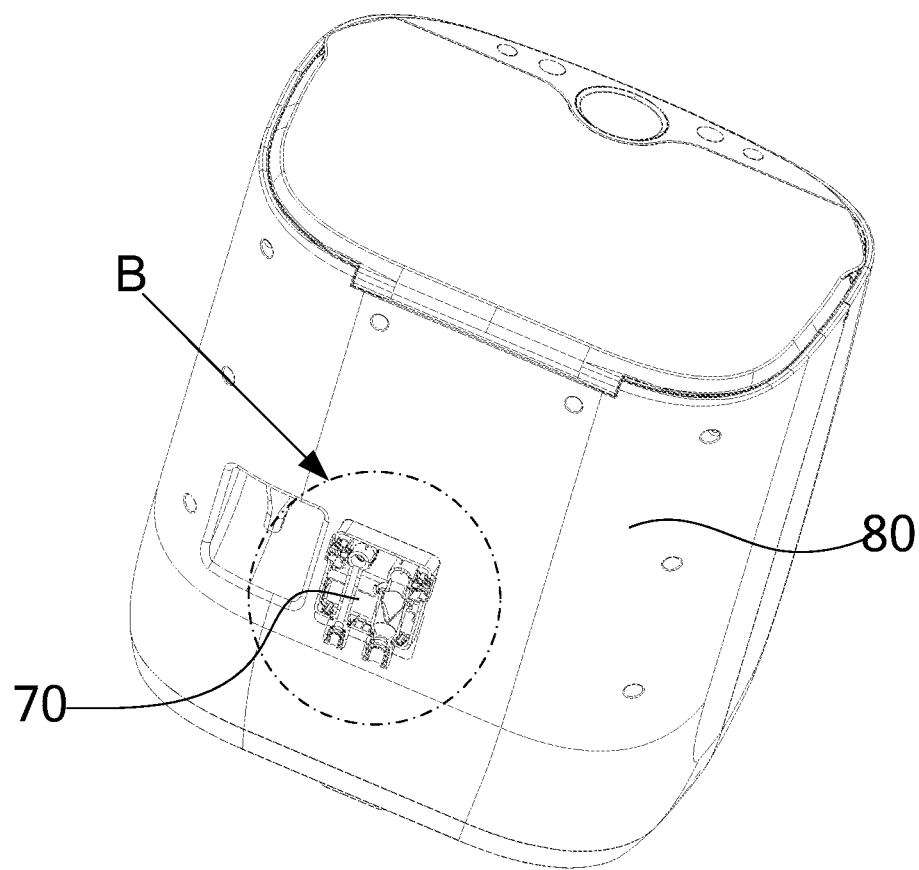
FIG. 46A shows a longitudinal cross-sectional view of the base station at the location of the adapter according to an embodiment of the present disclosure.
Figure 46B:
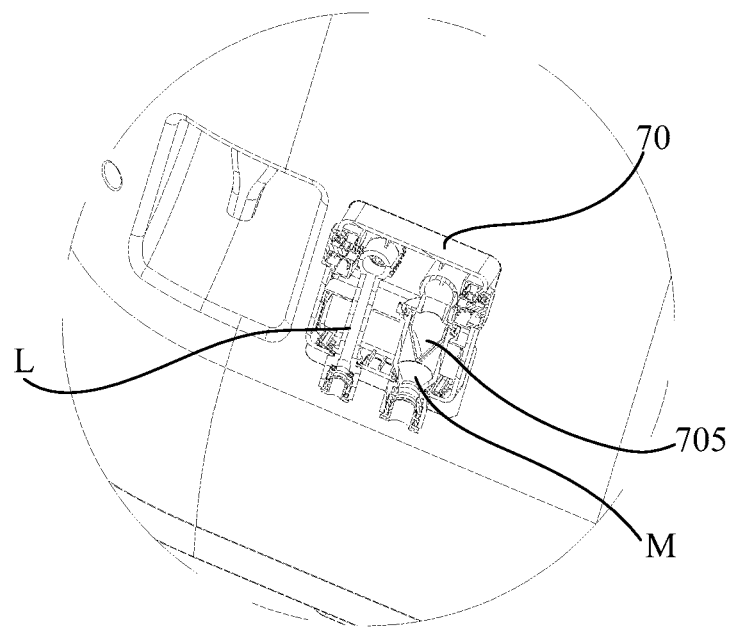
FIG. 46B shows an enlarged view of point B in FIG. 46A.

In an exemplary embodiment, as shown in FIGS. 45A and 45B, the base station bracket 80 is provided with two through holes 85. When the water tank body 4 of the water tank is installed in the water tank accommodating space 82, the part of the clean water input channel 30a located in the water tank body 4 and the part of the sewage output channel 30b located in the water tank body 4 are corresponded to the two through holes 85 respectively, to connect to the adapter 70 through the clean water connecting pipe L and the sewage connecting pipe M.

What has been disclosed above is only a preferred embodiment of the present disclosure, which is to facilitate the understanding and implementation for those skilled in the art. Of course, the scope of the present disclosure cannot be limited by this. Equivalent changes made according to the present disclosure still fall within the scope of the present disclosure.

What is claimed is:

1. A water tank, configured for communicating with a cleaning system on a base station body of a base station and outside of the base station, the water tank comprising:
   a clean water cavity, configured to hold clean water;
   a clean water input channel, configured to be communicated with the clean water cavity and an external water source outside the base station, allowing clean water to be input to the clean water cavity from the external water source outside of the base station;
   a clean water output channel, configured to be communicated with the clean water cavity and the cleaning system on the base station body, allowing clean water to be output from the clean water cavity to the cleaning system on the base station body;
   a sewage cavity, configured to hold sewage;
   a sewage input channel, configured to be communicated with the cleaning system on the base station body and the sewage cavity, allowing sewage generated by the cleaning system on the base station body to be input to sewage cavity; and
   a sewage output channel, configured to be communicated with the sewage cavity and outside of the base station, allowing sewage to be discharged from the sewage cavity to the outside of the base station;
   wherein the water tank comprises a water tank body and an adapter detachably connected to the water tank body, and the water tank receives clean water delivered from the outside of the base station and discharges the sewage to the outside of the base station through the adapter;
   the clean water cavity, the sewage cavity, the clean water output channel, and the sewage input channel are arranged on the water tank body of the water tank, and the clean water input channel and the sewage output channel are defined on the water tank body and the adapter.

2. The water tank according to claim 1, further comprising:
   a first control valve;
   wherein the first control valve is configured for closing or opening the clean water input channel based on a water level in the clean water cavity.

3. The water tank according to claim 2, wherein the first control valve is a floating ball valve arranged in the clean water cavity; or
   a liquid level detecting device is provided in the clean water cavity, the first control valve is electrically connected to the liquid level detecting device, and the first control valve is configured for closing or opening the clean water input channel based on a water level in the clean water cavity detected by the liquid level detecting device.

4. The water tank according to claim 1, wherein
   the clean water input channel is provided with a first pump, and the first pump is configured to provide power for the clean water cavity to receive clean water from the external waterway; and/or
   the sewage output channel is provided with a second pump, and the second pump is configured to provide power for the sewage cavity to discharge sewage.

5. The water tank according to claim 4, wherein the sewage output channel is provided with a valve body, and the valve body is located at a downstream side of the second pump; the valve body has a first state and a second state, when the valve body is in the first state, the sewage cavity is ventilated and communicated to the outside and the valve body restricts outflow of the sewage; when the second pump is turned on, the valve body is opened to the second state under water pressure and sewage is discharged from the valve body.

6. The water tank according to claim 5, wherein when an air pressure at the downstream side of the valve body is greater than an air pressure at the upstream side, the valve body is capable of changing from the first state to a third state, and the valve body is closed when being in the third state.

7. The water tank according to claim 6, wherein the water tank is defined with a gas hole communicated to the sewage cavity and the outside, and a negative pressure pump is configured to evacuate the sewage cavity through the gas hole; in the first state, the valve body is slightly opened to communicate to the outside and restrict outflow of the sewage; the valve body is capable of being closed under the action of the negative pressure pump, allowing the sewage cavity to be pumped to a negative pressure state.

8. The water tank according to claim 1, wherein the water tank is defined with a gas hole communicated to the sewage cavity and outside atmosphere, and a negative pressure pump is configured to evacuate the sewage cavity through the gas hole, allowing sewage generated by the cleaning system to be input to the sewage cavity.

9. The water tank according to claim 1, wherein
the adapter comprises a main body, and a clean water adapting pipe and a sewage adapting pipe both arranged on the main body, the clean water adapting pipe serves as a part of the clean water input channel, and the sewage adapting pipe serves as a part of the sewage output channel;
the clean water adapting pipe is connected to a part of the clean water input channel located on the water tank body through a clean water connecting pipe, and the sewage adapting pipe is connected to a part of the sewage output channel located on the water tank body through a sewage connecting pipe.

10. The water tank according to claim 9, wherein a check valve is provided at an end of the clean water adapting pipe connected to the clean water connecting pipe, and the check valve is configured to be in a closed state at normal condition, and to be pushed to change to an open state when the clean water connecting pipe is inserted into the clean water adapting pipe.

11. The water tank according to claim 1, wherein
the water tank comprises a first tank body and a second tank body separable from each other;
the clean water cavity, the sewage cavity, the clean water output channel, and the sewage input channel are arranged in the first tank body;
the clean water input channel comprises a first interface arranged on the first tank body, and a clean water input pipeline and a second interface both arranged in the second tank body, the first interface is communicated with the clean water cavity, and the second interface is arranged at a water outlet end of the clean water input pipeline;
the sewage output channel comprises a third interface arranged on the first tank body, and a sewage output pipeline and a fourth interface both arranged in the second tank body, the third interface is communicated with the sewage cavity, and the fourth interface is arranged at a water inlet end of the sewage output pipeline;
when the first tank body is coupled to the second tank body, the first interface is coupled with the second interface, and the third interface is coupled with the fourth interface.

12. The water tank according to claim 11, wherein
the first interface comprises a first check valve structure, the second interface comprises a second check valve structure, and the first and second check valve structures are configured to: when the first tank body is coupled with the second tank body, the first check valve structure and the second check valve structure are coupled and pushed with each other to an open state, when the first tank body and the second tank body are separated, the first check valve structure and the second check valve structure are automatically reset to a closed state; and/or
the third interface comprises a third check valve structure, when the first tank body is coupled to the second tank body, the third check valve structure is coupled with the fourth interface and the third check valve structure is pushed to an open state, when the first tank body is separated from the second tank body, the third check valve structure is automatically reset to a closed state.

13. The water tank according to claim 1, wherein the water tank comprises a clean water tank and a sewage tank independent of each other, the clean water cavity, the clean water input channel and the clean water output channel are provided on the clean water tank, and the sewage cavity, the sewage input channel and the sewage output channel are provided on the sewage tank.

14. A base station, configured for cleaning a cleaning robot, wherein the base station comprises:
a base station body defined with a cleaning system, the cleaning system receiving clean water for cleaning a member to be cleaned of the cleaning robot and discharging sewage generated by the cleaning; and
a water tank configured for communicating with the cleaning system and outside of the base station, the water tank comprising:
a clean water cavity, configured to hold clean water;
a first clean water input channel, configured to be communicated with the clean water cavity and an external water source outside the base station, allowing clean water to be input to the clean water cavity from the external water source outside of the base station;
a clean water output channel, configured to be communicated with the clean water cavity and the cleaning system on the base station body, allowing clean water to be output from the clean water cavity to the cleaning system on the base station body;
a sewage cavity, configured to hold sewage;
a sewage input channel, configured to be communicated with the cleaning system on the base station body and the sewage cavity, allowing sewage generated by the cleaning system on the base station body to be input to sewage cavity; and
a first sewage output channel, configured to be communicated with the sewage cavity and outside of the base station, allowing sewage to be discharged from the sewage cavity to the outside of the base station;
wherein the base station further comprises an adapter detachably connected to the water tank, the adapter being further connected to an external water delivery pipe connected to a tap water end and/or an external sewage pipe connected to a sewer,
wherein the adapter comprises:
a third clean water input channel, configured to be communicated with the external water delivery pipe and the first clean water input channel of the water tank, clean water being input to the clean water cavity of the water tank from the tap water end through the external water delivery pipe, the third clean water input channel of the adapter and the first clean water input channel of the water tank; and/or
a third sewage output channel, configured to be communicated with the first sewage output channel of the water tank and the external sewage pipe, sewage being discharged from the sewage cavity to the sewer through the first sewage output channel of the water tank, the third sewage output channel of the adapter and the external sewage pipe.

15. The base station according to claim 14, wherein the base station body comprises:
a second clean water input channel, configured to be communicated with the first clean water input channel of the water tank and the external water source outside the base station, clean water being input to the clean water cavity of the water tank from the external water source outside of the base station through the second clean water input channel of the base station body and the first clean water input channel of the water tank; and/or a second sewage output channel, configured to be communicated with the first sewage output channel of the water tank and outside of the base station, sewage being discharged from the sewage cavity to the outside of the base station through the first sewage output channel of the water tank and the second sewage output channel of the base station body.

16. The base station according to claim 14, wherein
the first clean water input channel is provided with a first pump, and the first pump is configured to provide power for the clean water cavity to receive clean water from the external waterway; and/or the first sewage output channel is provided with a second pump, and the second pump is configured to provide power for the sewage cavity to discharge sewage.

17. The base station according to claim 14, wherein the water tank is defined with a gas hole communicated to the sewage cavity and outside atmosphere, and a negative pressure pump is configured to evacuate the sewage cavity through the gas hole, allowing sewage generated by the cleaning system to be input to the sewage cavity.

18. The base station according to claim 14, wherein the water tank comprises a clean water tank and a sewage tank independent of each other, the clean water cavity, the first clean water input channel and the clean water output channel are provided on the clean water tank, and the sewage cavity, the sewage input channel and the first sewage output channel are provided on the sewage tank.

\* \* \* \* \*